United States Patent
Prakash et al.

(10) Patent No.: US 12,061,957 B2
(45) Date of Patent: *Aug. 13, 2024

(54) TECHNOLOGIES FOR DISTRIBUTING GRADIENT DESCENT COMPUTATION IN A HETEROGENEOUS MULTI-ACCESS EDGE COMPUTING (MEC) NETWORKS

(71) Applicant: Intel Corporation, Santa Clara, CA (US)

(72) Inventors: Saurav Prakash, Los Angeles, CA (US); Sagar Dhakal, Los Altos, CA (US); Yair Yona, Cupertino, CA (US); Nageen Himayat, Fremont, CA (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/665,025

(22) Filed: Feb. 4, 2022

(65) Prior Publication Data
US 2022/0237515 A1 Jul. 28, 2022

Related U.S. Application Data

(63) Continuation of application No. 16/235,682, filed on Dec. 28, 2018, now Pat. No. 11,244,242.

(Continued)

(51) Int. Cl.
*G06N 20/00* (2019.01)
*G06F 9/50* (2006.01)
(Continued)

(52) U.S. Cl.
CPC .......... *G06N 20/00* (2019.01); *G06F 9/5072* (2013.01); *G06F 18/2148* (2023.01); *G06N 3/08* (2013.01);
(Continued)

(58) Field of Classification Search
None
See application file for complete search history.

(56) References Cited

U.S. PATENT DOCUMENTS 11,244,242 B2 2/2022 Prakash et al.
2014/0313908 A1 10/2014 Silva et al.
(Continued)

FOREIGN PATENT DOCUMENTS

| JP | 2019144642 A | 8/2019 |
|---|---|---|
| KR | 20190032433 A | 3/2019 |
| WO | 2020121045 A1 | 6/2020 |

OTHER PUBLICATIONS

Li, Songze, Qian Yu, Mohammad Ali Maddah-Ali, and A. Salman Avestimehr. "A scalable framework for wireless distributed computing." IEEE/ACM Transactions on Networking 25, No. 5 (2017): 2643-2654. (Year: 2017).*

(Continued)

*Primary Examiner* — Vincent Gonzales
(74) *Attorney, Agent, or Firm* — Alliance IP, LLC

(57) ABSTRACT

Systems, apparatuses, methods, and computer-readable media, are provided for distributed machine learning (ML) training using heterogeneous compute nodes in a heterogeneous computing environment, where the heterogeneous compute nodes are connected to a master node via respective wireless links. ML computations are performed by individual heterogeneous compute nodes on respective training datasets, and a master combines the outputs of the ML computations obtained from individual heterogeneous compute nodes. The ML computations are balanced across the heterogeneous compute nodes based on knowledge of network conditions and operational constraints experienced by the heterogeneous compute nodes. Other embodiments may be described and/or claimed.

25 Claims, 15 Drawing Sheets

Related U.S. Application Data

(60) Provisional application No. 62/728,640, filed on Sep. 7, 2018, provisional application No. 62/728,647, filed on Sep. 7, 2018.

(51) Int. Cl.
| | |
|---|---|
| *G06F 18/214* | (2023.01) |
| *G06N 3/08* | (2023.01) |
| *G06N 7/01* | (2023.01) |
| *G06N 7/08* | (2006.01) |
| *G06V 10/94* | (2022.01) |
| *H04L 43/08* | (2022.01) |
| *H04L 41/14* | (2022.01) |

(52) U.S. Cl.
CPC .............. *H04L 43/08* (2013.01); *G06N 7/01* (2023.01); *G06N 7/08* (2013.01); *H04L 41/145* (2013.01)

(56) References Cited

U.S. PATENT DOCUMENTS

| | | |
|---|---|---|
| 2017/0279839 A1 | 9/2017 | Vasseur et al. |
| 2019/0042934 A1 | 2/2019 | Arunachalam et al. |
| 2019/0138934 A1 | 5/2019 | Prakash et al. |
| 2019/0171978 A1 | 6/2019 | Bonawitz |
| 2019/0235940 A1 | 8/2019 | Kegel et al. |
| 2019/0340534 A1 | 11/2019 | McMahan et al. |
| 2020/0125926 A1 | 4/2020 | Choudhury et al. |
| 2022/0237515 A1 | 7/2022 | Prakash et al. |
| 2022/0377614 A1 | 11/2022 | Balakrishnan et al. |
| 2023/0068386 A1 | 3/2023 | Akdeniz et al. |

OTHER PUBLICATIONS

Mohammadi, Mehdi, Ala Al-Fuqaha, Sameh Sorour, and Mohsen Guizani. "Deep learning for IoT big data and streaming analytics: A survey." IEEE Communications Surveys & Tutorials 20, No. 4 (2018): 2923-2960. (Year: 2018).*
Verbraeken, Joost, Matthijs Wolting, Jonathan Katzy, Jeroen Kloppenburg, Tim Verbelen, and Jan S. Rellermeyer. "A survey on distributed machine learning." Acm computing surveys (csur) 53, No. 2 (2020): 1-33. (Year: 2020).*
"Mobile Edge Computing (MEC); Deployment of Mobile Edge Computing in an NFV environment", Feb. 2018, 32 pages, ETSI GR MEC 017 v1 .1.1.
"Mobile Edge Computing (MEC); Mobile Edge Management; Part 2: Application lifecycle, rules and requirements management", Jul. 2017, 48 pages, ETSI GS MEC 010-2 v1.1.1.
"Multi-access Edge Computing (MEC); Phase 2: Use Cases and Requirement", Oct. 2018, 66 pages, ETSI GS MEC 002 v2.1.1.
Chia-Yu Chang et al., "Analyzing MEC Architectural Implications for LTE/LTE-A", Feb. 2, 2016, 28 pages, EURECOM, RR-16-312, France.
Halbawi, Wael, et al. "Improving distributed gradient descent using reed-solomon codes." 2018 IEEE International Symposium onInformation Theory (ISIT). IEEE, Jun. 17-22, 2018. (Year: 2018).
Li, Songze, et al. "Near-optimal straggler mitigation for distributed gradient methods." 2018 IEEE International Parallel andDistributed Processing Symposium Workshops (IPDPSW). IEEE, 2018. (Year: 2018).
Min Ye et al., "Communication-Computation Efficient Gradient Coding", Feb. 9, 2018, 20 pages.
Mobile Edge Computing (MEC) Terminology, Mar. 2016, 7 pages, ETS GS MEC 001 v1.1.1.
Mobile Edge Computing (MEC); Framework and Reference Architecture, Mar. 2016, 18 pages, ETS GS MEC 003, 1.1.1.
Mobile Edge Computing (MEC); Mobile Edge Management; Part 1: System, host and platform management, Oct. 2017, 26 pages, ETSI GS MEC 010-1 v1.1.1.
Rashish Tandon et al., "Gradient Coding: Avoiding Stragglers in Distributed Learning", 2017, 9 pages.
Balakrishnan, Ravikumar et al.; "Resource Management and Fairness for Federated Learning over Wireless Edge Networks"; IEEE 21st International Workshop on Signal Processing Advances in Wireless Communications (SPAWC) (May 2020); 5 pages.
Banerjee, Arindam, et al.; "Clustering with Bregman Divergences," Journal of Machine Learning Research 6, published Oct. 2005; 45 pages.
Bordes, Antoine, et al., "Fast Kernel Classifiers with Online and Active Learning," Journal of Machine Learning Research 6 (2005), pp. 1579-1619; 41 pages.
Calabrese, Francesco Davide, et al.; "Learning Radio Resource Management in RANs: Framework, Opportunities, and Challenges," arXiv:1611.10253v3; May 20, 2018; 8 pages.
Chelsea Finn, Pieter Abbeel, Sergey Levine, "Model-Agnostic Meta-Learning for Fast Adaptation of Deep Networks", ICML 2017.
Dhakal, Sagar et al.; "Coded computing for distributed machine learning in wireless edge network"; IEEE VTC, 2019; 6 pages. Retrieved from https://ieeexplore.ieee.org/abstract/document/8891198.
Dhakal, Sagar et al.; "Coded Federated Learning"; IEEE Globecom Workship 2019; 6 pages. Retrieved from https://ieeexplore.ieee.org/abstract/document/9024521.
Dwork, Cynthia, et al.; "The Algorithmic Foundations of Differential Privacy"; Foundations & Trends, Theoretical Computer Science, v. 9, n. 3-4, pp. 211-407, 2014; 281 pages.
Eisen, Mark, et al.; "Optimal Wireless Resource Allocation with Random Edge Graph Neural Networks," accessed at https://arxiv.org/abs/1909.01865; Mar. 5, 2020; 15 pages.
Frey, Brendan J., et al.; "Clustering by Passing Messages Between Data Points," Science, vol. 315; Feb. 16, 2007; 23 pages.
Katharopoulos, Angelos, et al.; "Not All Samples Are Created Equal: Deep Learning with Importance Sampling," accessed at arXiv:1803.00942; Oct. 28, 2019; 13 pages.
Lecun, Yann, et al.; "Gradient-Based Learning Applied to Document Recognition," Proceedings of the IEEE, Nov. 1998; 46 pages.
Li, Tian, et al.; "Federated Optimization for Heterogeneous Networks"; Conference on Machine Learning and Systems (MLSys), Apr. 2020; 22 pages.
Li, Tian, et al.; "Federated Optimization in Heterogeneous Networks," accessed at arXiv:1812.06127; Apr. 21, 2020; 22 pages.
Mcmahan, Brendan et al., "Federated Learning: Collaborative Machine Learning Without Centralized Training Data," Google Research Blog, Apr. 6, 2017 (5 pages).
Mcmahan, H. Brendan, et al., "Communication-Efficient Learning of Deep Networks from Decentralized Data," Google, Inc., Seattle, Washington, United States; Feb. 28, 2017; 11 pages.
Pandey, Shashi Raj, et al.; "A Crowdsourcing Framework for On-Device Federated Learning," arXiv:1911.01046v2; Feb. 3, 2020; 15 pages.
PCT International Preliminary Report on Patentability issued in PCT/US2020/067068, dated Aug. 18, 2022; 10 pages.
PCT International Preliminary Report on Patentability issued in PCT/US2021/035042, dated Dec. 15, 2022; 13 pages.
PCT International Search Report and Written Opinion issued in PCT/US2020/067068, dated Apr. 15, 2021; 15 pages.
PCT International Search Report and Written Opinion issued in PCT/US2021/035042, dated Nov. 2, 2021; 18 pages.
PCT International Search Report and Written Opinion issued in PCT/US2021/039272, dated Oct. 15, 2021; 13 pages.
Rashid, Tabish, et al.; "QMIX: Monotonic Value Function Factorisation for Deep Multi-Agent Reinforcement Learning," International Conference on Machine Learning; Stockholm, Sweden; Jun. 6, 2018; 14 pages.
Ruder, S., "An overview of gradient descent optimization algorithms," Insight Centre for Data Analytics, Dublin; Jun. 15, 2017; arXiv preprint arXiv:1609.04747; 14 pages.
S. Prakash, S. Dhakal, M. Akdeniz, A. S. Avestimehr, and N. Himayat, "Coded computing for federated learning at the edge," International Workshop on Federated Learning for User Privacy and Data Confidentiality (FL-ICML 2020), Jul. 2020; 9 pages.

(56) References Cited

OTHER PUBLICATIONS

Sattler, Felix, et al.; "Clustered Federated Learning: Model-Agnostic Distributed Multi-Task Optimization under Privacy Constraints," retrieved from https://arxiv.org/abs/1910/01991v1; dated Oct. 2019; 17 pages.
Sattler, Felix, et al.; "Robust and Communication-Efficient Federated Learning from Non-IID Data," retrieved from https://arxiv.org/abs/1903.02891v1; dated Mar. 2019; 18 pages.
Schaul, Tom, et al.; "Prioritized Experience Replay"; ICLR, published 2016; 21 pages.
Showkatbakhsh, M., et al. "Privacy-Utility Trade-off of Linear Regression under Random Projections and Additive Noise", Arxiv 2019; https://arxiv.org/pdf/1902.04688.pdf; 7 pages.
Su, Han-I et al., "Quadratic Gaussian Gossiping," 2009 3rd IEEE International Workshop on Computational Advances in Multi-Sensor Adaptive Processing (2009) (4 pages).
Sunehag, Peter, et al.; "Value-Decomposition Networks for Cooperative Multi-Agent Learning," accessed at arXiv:1706.05296; Jun. 16, 2017; 17 pages.
Tandon, Rashish et al., "Gradient Coding: Avoiding Stragglers in Synchronous Gradient Descent," Department of Computer Science, UT Austin, Institute for Computational Engineering and Sciences, UT Austin, Department of Electrical and Computer Engineering, UT Austin, Microsoft, Mar. 9, 2017 (19 pages).
U.S. Appl. No. 17/920,839, filed Oct. 24, 2022.
U.S. Appl. No. 17/921,549, filed Oct. 26, 2022.
USPTO Notice of Allowance in U.S. Appl. No. 16/235,682 dated Oct. 4, 2021 (11 pages).
Wadu, Madhusanka Manimel, et al.; "Federated Learning under Channel Uncertainty: Joint Client Scheduling and Resource Allocation," arXiv:2002.00802v2; Feb. 6, 2020; 6 pages.
Wang, Shusen, et al.; "GIANT: Globally Improved Approximate Newton Method for Distributed Optimization," retrieved from https://arxiv.org/abs/1709.03528v5, dated Sep. 2018; 22 pages.
Y. Lecun, L. Bottou, Y. Bengio and P. Haffner, "Gradient-based learning applied to document recognition," in Proceedings of the IEEE, vol. 86, No. 11, pp. 2278-2324, Nov. 1998, doi: 10.1109/5.726791; 46 pages.
Yao, Xin, et al.; "Federated Learning with Unbiased Gradient Aggregation and Controllable Meta Updating," retrieved from https://arxiv.org/abs/1910.08234v1, dated Oct. 2019; 8 pages.
Zhao, Yue, et al.; "Federated Learning with Non-IID Data," accessed at arXiv:1806.00582; Jun. 2, 2018; 13 pages.
Zhou, Shuheng, et al.; "Differential Privacy with Compression"; arXiv, 0901.1365v1, Jan. 2009; 14 pages.
D. Moming et al. : "Astraea: Self-Balancing Federated Learning for Improving Classification Accuracy of Mobile Deep Learning Applications", 2019 IEEE 37th International Conference On Computer Design (ICCD), Nov. 17, 2019 (Nov. 17, 2019), pp. 246-254, XP033710037, DOI: 10.1109/ICCD46524.2019.00038 [retrieved on Feb. 7, 2020] * section III*.
EESR European Search Report issued in EP Patent Application No. 20917584.3 issued on Feb. 9, 2024 (13 pages).
L. Huang et al.: "LoAdaBoost:Loss-Based AdaBoost Federated Machine Learning on medical Data",arxiv.org, Cornell University Library, 201 Olin Library Cornell University Ithaca, NY 14853, Nov. 30, 2018 (Nov. 30, 2018), XP081463644,* section LoAdaBoost FedAvg on p. 7-9 *.
T. Tuor et al. : "Data Selection for Federated Learning with Relevant and Irrelevant Data at Clients", arxiv.org, Cornell University Library, 201 Olin Library Cornell University Ithaca, NY 14853, Jan. 22, 2020 (Jan. 22, 2020), XP081584192, * section 4 *.
Y. Jiao et al. : "Toward an Automated Auction Framework for Wireless Federated Learning Services Market", arxiv.org, Cornell University Library, 201 Olin Library Cornell University Ithaca, NY 14853, Dec. 13, 2019 (Dec. 13, 2019), XP081558562 * section I and III-A to D * figure 1 *.
EESR Notice of Extended European Search Report issued in EP Patent Application No. 21817091.8 issued on May 7, 2024 (11 pages).
Fallah, Alireza, et al. Personalized Federated Learning: A Meta-Learning Approach. arXiv:2002.07948, arXiv, Oct. 22, 2020. arXiv.org, https://doi.org/10.48550/arXiv.2002.07948, 26 Pages.
Nishio, Takayuki, and Ryo Yonetani. "Client Selection for Federated Learning with Heterogeneous Resources in Mobile Edge." ICC 2019—2019 IEEE International Conference on Communications (ICC), 2019, pp. 1-7, Apr. 2018, arXiv.org, https://doi.org/10.1109/ICC.2019.8761315, 7 Pages.

* cited by examiner

TECHNOLOGIES FOR DISTRIBUTING GRADIENT DESCENT COMPUTATION IN A HETEROGENEOUS MULTI-ACCESS EDGE COMPUTING (MEC) NETWORKS

RELATED APPLICATIONS

The present application is a continuation of U.S. application Ser. No. 16/235,682 filed on Dec. 28, 2018, which claims priority under 35 U.S.C. § 119 to U.S. Provisional App. No. 62/728,640 filed on Sep. 7, 2018 and U.S. Provisional App. No. 62/728,647 filed on Sep. 7, 2018, the contents of each of which are hereby incorporated by reference in their entireties.

FIELD

Various embodiments generally relate to the fields of computing, and in particular, relate to MEC ("Multi-access Edge Computing" or "Mobile Edge Computing") technologies.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many forms of machine learning (ML), such as supervised learning, perform a training process on a relatively large dataset to estimate an underlying ML model. Linear regression is one type of supervised ML algorithm that is used for classification, stock market analysis, weather prediction, and the like. Gradient descent (GD) algorithms are often used in linear regression. Given a function defined by a set of parameters, a GD algorithm starts with an initial set of parameter values, and iteratively moves toward a set of parameter values that minimize the function. This iterative minimization is achieved by taking steps in the negative direction of the function gradient. Example use cases for GD algorithms include localization in wireless sensor networks and distributed path-planning for drones.

In typical GD implementations, a model is updated iteratively, where computing multiplication of large matrices and vectors are required in each epoch. Since the training phase for GD algorithms requires a large amount of iterative computations, running GD algorithms can be computationally intensive. Additionally, computation time bottlenecks rapidly as the model order grows in size.

Distributed computing has been used to reduce training time by offloading GD computations to multiple secondary computing nodes located in a server farm, for example. In this approach, during each training epoch (or iteration), partial gradients are computed by different secondary nodes and communicated to a master node for aggregation in order to obtain a complete gradient for that epoch. Since this approach involves duplicating the training dataset for each secondary node, it is limited to homogeneous computing environments included the same or similar computing systems that are connected to one another via deterministic wired links.

However, distributing GP computations to heterogeneous computing environments, such as those comprising multiple client or edge devices is difficult because, in most cases, the available edge devices have different configurations, capabilities, and operate under different conditions. Additionally, many of the edge devices communicate using wireless links, which have lower reliability (i.e., in terms of link quality and achievable data rates) when compared to wired links used in server farms. The heterogeneous nature of these computing environments may result in longer lag times at each training epoch due to slower computing devices and/or computing devices with low quality radio links. For these reasons, the conventional distributed ML training approach cannot be straightforwardly applied to heterogeneous computing environments.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 depicts an example distributed machine learning procedure according to a first embodiment, FIG. 3 depicts a load partitioning process according to the first embodiment, FIG. 4 depicts an example distributed machine learning procedure according to a second embodiment, and FIG. 5 depicts a load partitioning process according to the second embodiment.

DETAILED DESCRIPTION

Figure 1:
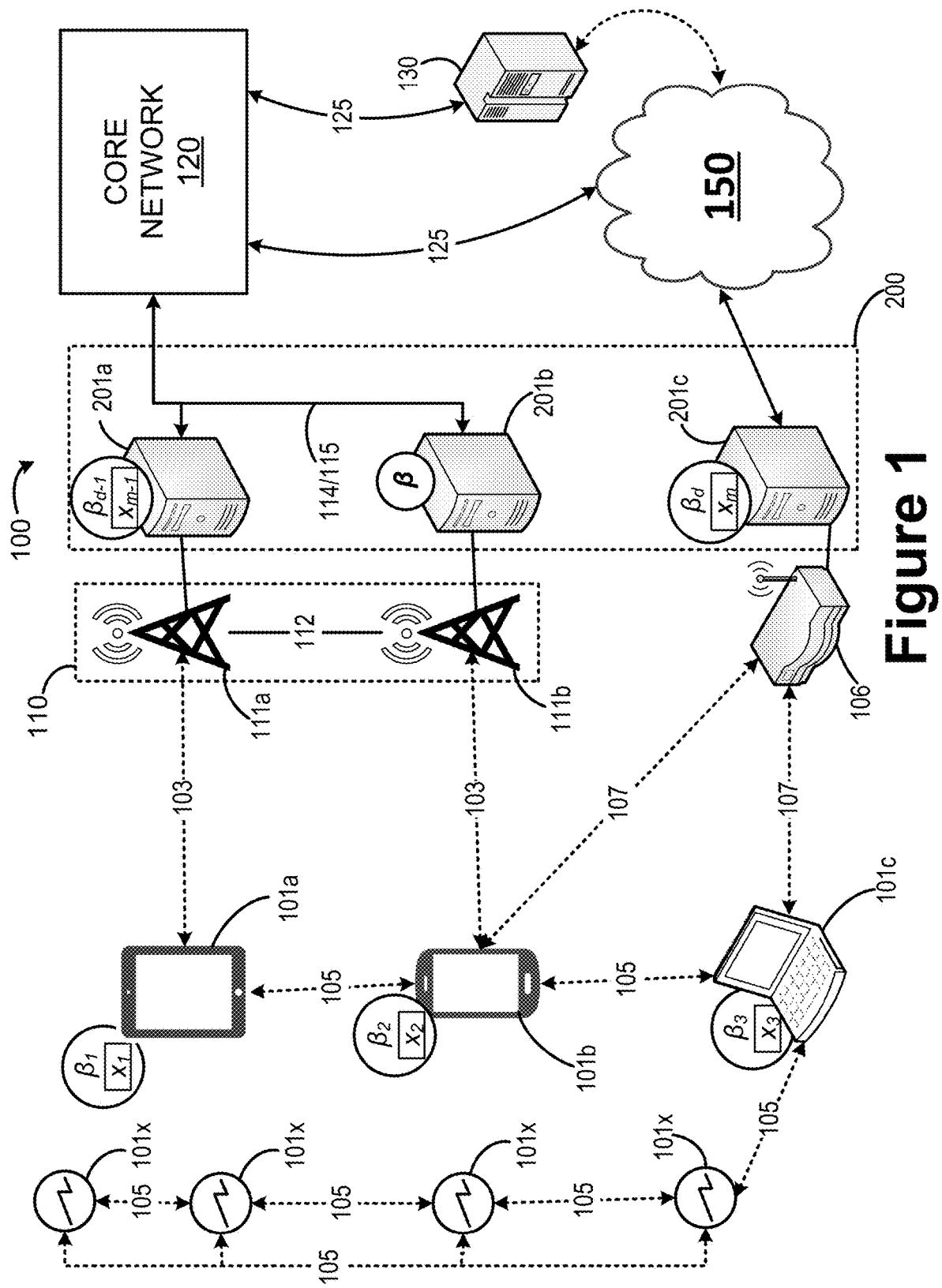
FIG. 1 depicts an example heterogeneous computing environment in which various example embodiments may be practiced.

The present disclosure is related to distributed machine learning (ML) in distributed heterogeneous computing environments, where computational resources of multiple edge compute nodes are utilized for collaborative learning for an underlying ML model. Distributed heterogeneous computing environments are computing environments where compute (processing) and storage resources are available at multiple edge compute nodes, with varying capabilities and operational constraints. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

Gradient Descent (GD) algorithms and/or its variants are one critical component of many ML algorithms where training is performed on a large amount of data to estimate an underlying ML model. Linear regression is one such method that is used for many use cases including, for example, classification, stock market analysis, weather prediction, localization in wireless sensor networks (WSNs), and distributed path-planning for drones and automated driving applications. As a first step towards training ML algorithms in heterogeneous computing environments, embodiments provide distributed training via GD algorithm to estimate the underlying model for linear regression. Although the embodiments herein are discussed in terms of GD algorithms for linear regression, the distributed training embodiments discussed herein are applicable to more complex ML algorithms such as deep neural networks and the like.

One of the key challenges in GD algorithms is the computational cost incurred during the training phase. In typical GD implementations, an ML reference model is updated iteratively, where multiplication of large matrices and vectors needs to be computed in each epoch. Thus, computation time rapidly becomes a bottleneck as the model order grows.

In recent years, distributed computing has been used as a solution for reducing training time by parallelizing the GD computations to multiple compute nodes in a homogeneous computing environment, such as a server farm, data center, or cloud computing services. In homogeneous computing environments, compute nodes (e.g., individual servers) are dedicated to computing the gradients. In these solutions, during each epoch, each compute node computes a partial gradient. The partial gradients are typically obtained by summing up the gradients corresponding to the data points assigned to a compute node. Each compute node communicates their partial gradient back to a master node after the partial gradients are computed. The master node computes a full or complete gradient by combining all of the partial gradients received from all worker compute nodes. The master compute node updates the reference model, and then communicates the updated reference model to all worker compute node for the next epoch.

However, these homogeneous computing environments usually include compute nodes that have a same or similar platform configuration and/or computing speed, which allows the training data to be uniformly divided among the worker compute nodes. Additionally, the worker compute nodes and the master node communicate with one another over high data rate wired links with little to no uncertainty in link quality or throughput. Due to the compute node uniformity and little to no link uncertainty in homogeneous computing environments, these solutions cannot be straightforwardly applied to heterogeneous computing environments that include wireless links with variable and/or fluctuating data rates and link quality. This is because in these solutions, the training data is usually duplicated across all or most of the worker compute nodes. However, blindly duplicating training data across multiple compute nodes in a heterogeneous computing environment, without accounting for relative processing speeds, link quality, available battery life, and/or other operational parameters creates large redundancy overhead where, in many cases, an uncoded system may outperform coded solutions.

Recently, there have been some attempts to distribute GD computations across heterogeneous computing environments. Unlike homogenous computing environments, the compute nodes in heterogeneous computing environments are non-dedicated computing devices running multiple processes concurrently. Distributed GD is challenging in heterogeneous computing environments because the compute nodes have different computing capabilities and are also connected to a master node via respective wireless links that exhibit dynamic variations in link quality and achievable data rates. In heterogeneous computing environments, the compute nodes still need to compute their partial gradients and communicate those partial gradients to a master node. In current distributed GD solutions, the wait time for each epoch at the master node is dominated by the time needed to receive the partial gradients from compute nodes with relatively slow computational capabilities and/or with weak or low quality links. For example, the wait time at the master node for one or more training epochs may be prolonged by compute nodes with weak or low quality links, which may require multiple retransmissions to overcome radio link failures. Compute nodes from which the master node has to wait due to, for example, low quality links or slow processing capabilities, are typically known as "stragglers." The issue of straggler nodes is especially relevant for computations that are distributed over wireless networks, where dynamic variations in wireless link quality can lead to loss of data. Accounting for such variations in distributed computing tasks is not well addressed by existing solutions.

In order to tackle straggler issues, some current solutions use repetition coding to duplicate data across different compute nodes. In these solutions, at each epoch, the master node needs to wait only for the first arriving unique set of partial gradients, which may reduce the delays from straggler nodes. However, in these solutions, there could be significant decoding complexity involved when aggregating the partial gradients at the master node, which leads to increased resource consumption and contributes to the full gradient computation delays.

The existing solutions described previously are either not applicable to heterogeneous computing environments and/or incur significant computational and signaling overhead when applies to heterogeneous computing environments. Furthermore, the existing solutions described previously also involve significant decoding complexity when aggregating partial gradients at the master node. The embodiments discussed herein make distributed gradient computing feasible for heterogeneous computing environments, by addressing the aforementioned issues and also addressing load balancing issues in distributing training data and computational tasks.

In order to utilize compute and storage resources of edge compute nodes, data needs to be communicated over an underlying communication network. With the emergence of ultra-dense wireless edge networks, it is increasingly likely that most data transmissions occur through wireless links. In order to minimize the overall training time, embodiments herein provide a data distribution policy that accounts for communication overhead associated with wireless data transmissions.

According to first embodiments, computing tasks of an underlying ML model are distributed to a plurality of edge compute nodes in a heterogeneous computing environment, where the plurality of edge compute nodes are connected to a wireless network via respective links with a master node, such as one or more application servers, one or more MEC servers, or some other suitable computing system. In one example, computational task of a GD algorithm are distributed to the plurality of edge compute nodes in the heterogeneous computing environment. In various embodiments, the master node exploits statistical knowledge of quality metrics related to communication links and processing delays (and/or processing capabilities of the edge compute nodes) when assigning ML tasks to individual edge compute nodes. In embodiments, random coding is used to encode the training data at an optimal (or near optimal) coding redundancy, and a load balancing policy is used to partition the computation load across the plurality of edge compute nodes. In embodiments, the master node obtains partial gradients computed by the plurality of edge compute nodes, and aggregates the partial gradients to obtain a full gradient with little to no decoding complexity. The computed full gradient is then sent back to the edge compute nodes to further refine the ML model until the ML model converges. These embodiments address heterogeneity in communication links and processing rates to enable distributed GD computation. These embodiments also provide minimal coding redundancy to minimize expected epoch time, which in turn reduces the total training time. These embodiments also outperform uncoded systems in heterogeneous computing environments, while providing little to no decoding complexity to aggregate partial gradients. Other embodiments may be described and/or claimed.

In these embodiments, a multi-access edge computing (MEC) framework may be used to implement collaborative learning for an underlying ML model. Application computation offloading is one of the use cases enabled by MEC technology. MEC is a network architecture that allows cloud computing capabilities and computing services to be performed at the edge of a cellular network. MEC provides mechanisms that allow applications to be run and to perform related processing tasks closer to network subscribers (also referred to as "edge users" or "edge nodes" and the like). In this way, network congestion may be reduced and applications may have better performance. MEC technology is designed to be implemented at the cellular base stations, and may enable flexible and rapid deployment of new applications and services for subscribers. Combining elements of information technology and telecommunications networking, MEC also allows cellular operators to open their radio access network (RAN) to authorized third-parties, such as application developers and content providers. In these embodiments, a MEC system offloads one or more computations or tasks for developing an ML model to various edge compute nodes during a training process. For example, a MEC system can offload training data for partial gradient computations to individual edge compute nodes. Additionally, in these embodiments, the central parameter system discussed previously may be a MEC system, and may include a MEC platform (MEP) manager, a selected MEC host, or some other suitable element of a MEC system. Other embodiments may be described and/or claimed.

According to second embodiments, rather than distributing data to individual edge compute nodes, the central parameter system may instruct individual edge compute nodes to perform ML training tasks using data already located at the edge compute nodes. In addition to the issues discussed previously for distributed ML in heterogeneous computing environments, user privacy becomes a major issue when implementing distributed ML training processes using data available at different edge compute nodes. Ensuring user privacy protections for users who collaborate in distributed ML model computations since some of these users may want to keep their raw data secure on their device. Failure to account for privacy concerns may result in underutilization of the processing capabilities of edge networks, including MEC networks, since some users may not opt-in to allowing their data to be used for collaborative unless these concerns can be alleviated.

A conventional strategy to carry out processing of data provided by edge compute nodes includes requiring each edge compute node to upload their entire dataset to a computing service, then utilizing dedicated servers to carry out the GD computations. Therefore, the issues discussed above are relevant to this conventional strategy. Furthermore, uploading client data to a computing service may become prohibitive due to communication cost as well as privacy concerns.

Another approach for decentralized distributed GD involves using gossip algorithms (or gossip protocols). In this approach, the compute nodes are connected to each other via a communication network, and each compute node updates its local model using its own data and using model updates obtained from neighbor compute nodes. This approach leads to relatively slow convergence since making update rules for gossip algorithms is difficult. Further, gossip protocol solutions lead to poor quality of models learnt by individual compute nodes since they do not take into account all updated generated by all compute nodes.

Recently, federated learning has been proposed for distributed GD computation, where learning takes place by a federation of client compute nodes that are coordinated by a central server. Each client compute node fetches a global model, updates the global model using its local data, and communicates the updated model to the central server. Thereafter, the central server selects a random set of client compute nodes in each epoch to provide additional updates and waits for the selected client compute nodes to return their updated models. The central server averages the received models to obtain the final global model. Federated learning is more efficient than asynchronous update methods as it avoids the prohibitive number of model updates both at the central server and worker compute nodes. By random selection of workers in each epoch, they offer speedups compared to full batch GD methods. However, federated learning based on random polling can become relatively slow since federated learning does not consider operational conditions of client compute nodes as discussed previously.

In sum, the existing approaches to distributed ML learning do not consider heterogeneity in processing capabilities, communication rates, channel quality, available battery life, and/or other operational parameters when allocating computations to individual compute nodes. The failure to account for different operational parameters when allocating computational tasks and/or for updating corresponding models causes bottlenecks in the overall execution of the ML training process. Furthermore, coded computing mechanisms have not been developed for distributed ML or GD workloads.

The disclosed embodiments enable coding on distributed datasets while ensuring user privacy of training data provided by each edge compute node. Embodiments herein provide coding mechanisms for federated learning based GD algorithms trained from decentralized data available at a plurality of edge compute nodes.

In the second embodiments, the individual edge compute nodes encode locally available data for ML training. At each epoch, the edge compute nodes locally compute partial gradients from local uncoded training data. The master node estimates or otherwise determines a size of a subset of the local data that individual edge compute nodes should process during the ML training process. The estimated or determined subset size is based on the operational parameters of the individual edge compute nodes. In some embodiments, random (en)coding is performed by each edge compute node to disjointly encode the training data at optimal or near-optimal coding redundancy. In some embodiments, the subset of the local data and/or the (en)coded training data at each edge compute node is weighted based on operational parameters, such as expected computing delay, signal quality for communicating raw data, computing (processing) power and/or budget, and/or other operational parameters, which allows the master node to combat the straggler effect.

The encoded data is uploaded or otherwise provided to the master node for partial gradient computation. In these embodiments, only corresponding partial gradients are shared with the master node; the edge compute nodes do not share their (en)coding coefficients (or keys) with each other or with the master node. Partial gradient computations are performed by the master node on the provided encoded data points, while a majority of gradient computation is done privately by each edge compute node on its local uncoded data points. In each epoch, partial gradients received from the edge compute nodes and partial gradients computed from (en)coded training data available at the master node are aggregated or combined such that little to no decoding complexity is incurred. The master node combines the partial gradients obtained from the encoded data points with the partial gradients obtained from the uncoded data points iteratively until the underlying ML model converges. Other embodiments may be described and/or claimed.

Similar to the previously described embodiments, the computations are balanced across the plurality of edge compute nodes based on statistical knowledge of various operational parameters including, but not limited to, link quality, processing speed, and battery life. Like the first embodiments discussed previously, these privacy based embodiments may also be implemented using a MEC framework, where the master node is a MEC system, including one or more MEC (or MEC hosts) or some other suitable MEC element/entity. In these embodiments, the MEC system (or one or more MEC servers/hosts designated as the master node) offloads ML computations to one or more MEC servers/hosts, while using coding to preserve privacy and improve reliability. The embodiments discussed herein exploit heterogeneity and stochastic behavior of computing and communication in heterogeneous computing environments to allocate optimal or near-optimal gradient computation tasks to edge compute nodes. Additionally, disjointed encoding of training data at each edge compute node, with the sharing of only (en)coded training data to the master node ensures data protection and alleviates privacy concerns. These embodiments also outperform uncoded systems in heterogeneous computing environments without incurring decoding complexity. Simulation results have shown that these embodiments reduce training time is reduced by approximately 50% when compared to uncoded federate learning mechanisms, and while ensuring data privacy is fully preserved. Other embodiments may be described and/or claimed.

1. Machine Learning in Distributed Heterogeneous Environments

Referring now to FIG. 1, where an example heterogeneous computing environment 100 in accordance with various embodiments, is shown. Environment 100 may be referred to as a heterogeneous environment because collaborating nodes have disparate operational parameters, including different device/system capabilities and different operational contexts and/or constraints. For example, environment 100 includes a plurality of heterogeneous compute nodes 101, 201 some of which may have different compute node capabilities and some of which operate under different operational contexts and/or constraints. The heterogeneous compute nodes 101, 201 (also referred to as "edge compute nodes 101, 201" or the like) includes user equipment (UEs) 101 (e.g., including UE 101a, UE 101b, UE 101c, and UEs 101x) and one or more multi-access edge computing (MEC) hosts 201 (sometimes referred to as MEC servers 201).

In environment 100, a MEC system 200 may execute machine learning (ML) functionalities, namely training process (model) β, and distributes different computational tasks $β_1$, $β_2$, $β_3$, $β_{d-1}$, and $β_d$ (where d is a number) of the training process (model) β to different heterogeneous compute nodes, including UE 101a, UE 101b, and UE 101c, and MEC server 201a and MEC server 201c. The MEC system 200 includes a collection of MEC servers 201 (including MEC server 201a, MEC server 201b, and MEC server 201c in FIG. 1) and MEC management systems (not shown by FIG. 1) necessary to run MEC applications (e.g., MEAs 636 of FIGS. 6-7 and MEAs 836 of FIG. 8) within an operator network or a subset of an operator network. The MEC servers 201a, 200b, 200c (collectively referred to as "MEC servers 201" or "MEC server 201") are physical computer systems (e.g., server compute nodes) that include a MEC platform (e.g., MEP 637 of FIGS. 6-7 and MEP-VNF 837 of FIG. 8) and a virtualization infrastructure (e.g., VI 638 of FIG. 7 and/or NFVI 804 of FIG. 8), and provide compute, storage, and network resources to MEC applications. The MEC servers 201 may also be referred to as "MEC hosts 201" or "edge servers." The virtualization infrastructure (VI) of the MEC servers 201 provide virtualized environments and virtualized resources (e.g., "virtualized infrastructure") for the MEC hosts 201, and the MEC applications may run as virtual machines (VMs) and/or application containers on top of the VI. The components and/or entities of the MEC system 200 are discussed in more detail infra with respect to FIGS. 6-8.

For edge-cloud ML or distributed learning, ML training is performed on a dataset to learn parameters of an underlying model β, where the dataset and computational tasks of the ML training process are distributed across a plurality of edge nodes 101, 201. In various embodiments, one or more MEC servers 201 execute computationally intensive tasks of an unknown model β (also referred to as a "training process") since the MEC servers 201 may have higher performance capabilities as compared to UEs 101. In the example of FIG. 1, MEC server 201b has been selected to execute computationally intensive tasks of the unknown model β, while less computationally intensive functionalities, namely tasks $β_1$, $β_2$, $β_3$, $β_{d-1}$, and $β_d$, are executed by edge compute nodes 101, 201. Additionally, the edge nodes 101, 201 may require training datasets $x_1, x_2, x_3, x_{m-1}$, and $x_m$ (where m is a number) to perform respective tasks $\beta_1, \beta_2, \beta_3, \beta_{d-1}$, and $\beta_d$. The training datasets $x_1, x_2, x_3, x_{m-1}$, and $x_m$ are subsets of a full training dataset X (i.e., where X equals a combination of training datasets $x_1, x_2, x_3, x_{m-1}$, and $x_m$), and the computational tasks $\beta_1, \beta_2, \beta_3, \beta_{d-1}$, and $\beta_d$ are subsets of the unknown model $\beta$ for the underlying ML model/algorithm. As discussed in more detail infra, the training datasets $x_1, x_2, x_3, x_{m-1}$, and $x_m$ may be provided to the edge nodes 101, 201 by the MEC servers 201, or may be user data already stored by, or otherwise accessible by the edge nodes 101, 201. By off-loading ML training tasks to individual edge nodes 101, 201, the ML training process may be accelerated and/or may provide a more efficient use of computational resources.

In embodiments, a new instance of training process (model) $\beta$ may be started on an appropriate MEC server 201 (e.g., MEC server 201b in the example of FIG. 1) in response to a request from a user (e.g., a UE 101, owner/operator of a service provider system including server(s) 130, etc.). In response to requests from various users, connectivity may be established between edge nodes 101, 201 and the instance of the already running training process (model) $\beta$. The training process (model) $\beta$ may have a set of requirements (e.g., latency, processing resources, storage resources, network resources, location, network capability, security conditions, etc.) that need to be fulfilled by individual edge nodes 101, 201, and the MEC system 200 may select one or more MEC servers 201 (e.g., MEC server 201b in the example of FIG. 1) that fulfills all of the requirements, and the selected MEC server(s) 201 may select individual edge nodes 101, 201 to perform particular tasks $\beta_1$-$\beta_d$ on a specific dataset $x_1$-$x_m$. When all selected edge nodes 101, 201 that were connected to a specific instance of the training process (model) P have disconnected, the instance of the training process (model) $\beta$ may be terminated.

As mentioned previously, computing tasks $\beta_1$-$\beta_d$ of the underlying ML model $\beta$ are distributed to the plurality of edge compute nodes 101, 201 in heterogeneous computing environment 100. where the plurality of edge compute nodes 101, 201 are connected to a wireless network via respective links 103, 105, 107 to the MEC system 200. As an example, the underlying ML model is a gradient descent (GD) algorithm and each of the computing tasks $\beta_1$-$\beta_d$ distributed to the plurality of edge compute nodes 101, 201 are related to computing respective partial gradients. In various embodiments, the MEC system 200 (or selected MEC server 201b in the example of FIG. 1) exploits statistical knowledge of operational parameters of each edge compute node 101, 201 when assigning ML tasks to each of the edge compute nodes 101, 201. In embodiments, the MEC system 200 may consult a load balancing policy (or multiple load balancing policies) to partition the computational load across the plurality of edge compute nodes 101, 201, and calculate a coding redundancy for encoding the training datasets $x_1$-$x_m$ for each edge node 101, 201. The load balancing policy may define one or more actions and the conditions under which the actions are executed. In these embodiments, the load balancing policy may include, for example, algorithms, weight factors for individual pieces of data, analysis techniques/functions, system rules, policy definitions, ML models to be solved or otherwise obtained, ML algorithms to use to obtain the ML models, etc. In some embodiments, the load balancing policy may include executable code, which can include software modules or computational logic which, when operated by the MEC system 200, executes various load balancing calculations based on the operational parameters of the edge nodes 101, 201, and partitions the training data X into the training datasets $x_1$-$x_m$ for respective edge nodes 101, 201 based on the load balancing calculations. As an example, the load balancing policy may define the particular type or types of operational parameters (discussed infra) that should be collected by the MEC system 200. In another example, the load balancing policy may define criteria to be used by the MEC system 200 for determining threshold criteria or a desired level of reliability for selecting a particular edge compute node 101, 201 to perform computational tasks $\beta$. In this example, the threshold criteria may be based on a desired epoch time for computing a full gradient from obtained partial gradients from each edge compute node 101, 201. In another example, the load balancing policy may define criteria (e.g., load allocation criteria) to be used by the MEC system 200 for determining how to partition the training data into different datasets $x_1$-$x_m$.

Different load balancing policies or configurations may be used by the MEC system 200 to select offloading targets and/or partition mechanisms based on the operational parameters. The policies/configurations may emphasize or prioritize different operational parameters and/or for different ML training applications. For example, the load balancing policy may indicate to select edge compute nodes 101, 201 based on latency budget minimization (e.g., selecting based on latency performance over computational capabilities/constraints and/or energy consumption); based on computation minimization (e.g., selecting based on computational capabilities/constraints over latency performance); based on a latency budget threshold; based on a computational capability/constraint budget; based on an energy consumption threshold; minimizing computational load while being within a latency threshold; minimizing latency while being within a computational load threshold; minimizing energy consumption while being within a latency threshold and/or a computational load threshold; minimizing latency while being within an energy consumption threshold and/or a computational load threshold; and/or the like. In some embodiments, a selection of edge compute nodes 101, 201 may be compiled into a shortlist of target nodes based on a first set of operational parameters, and a subset of the target nodes may be selected from the shortlist based on a second set of operational parameters. For example, a shortlist of candidate edge compute nodes 101, 201 having a threshold link quality measurement could be compiled, and a set of the candidate edge compute nodes 101, 201 having a best computational performance among the candidates may be selected from the shortlist as the optimum offloading candidate edge compute nodes 101, 201. In some embodiments, a suitable weighting algorithm may be used to emphasize some operational parameters over other operational parameters. Other weighting, ranking, prioritization, and selection mechanisms or methods may be used in various embodiments.

In some embodiments, the load balancing policy may indicate a load allocation criterion, which is used to partition the encoded training data. The load allocation criterion may be based on a desired computation time (e.g., a maximum amount of time) for computing the partial gradients. In one example, the load allocation criterion may be, or may be based on, a minimax criterion, which maximizes the number of partial gradients received from each edge compute node 101, 201 for a minimum epoch time.

The operational parameters of the edge compute nodes 101, 201 includes compute node capabilities and operational constraints or contexts. The compute node capabilities may include, for example, configuration information (e.g., a hardware platform make and model, hardware component types and arrangement within the hardware platform, associated peripheral and/or attached devices/systems, processor architecture, currently running operating systems and/or applications and/or their requirements, subscription data (e.g., data plan and permissions for network access), security levels or permissions (e.g., possible authentication and/or authorization required to access the edge compute node 101, 201), etc.); computational capacity (e.g., a total processor speed of one or more processors, a total number of VMs capable of being operated by the edge compute node 101, 201, a memory or storage size, an average computation time per workload, a reuse degree of computational resources, etc.); current or predicted computational load and/or computational resources (e.g., processor utilization or occupied processor resources, memory or storage utilization, etc.); current or predicted unoccupied computational resources (e.g., available or unused memory and/or processor resources, available VMs, etc.); network capabilities (e.g., link adaptation capabilities, configured and/or maximum transmit power, achievable data rate per channel usage, antenna configurations, supported radio technologies or functionalities of a device (e.g., whether a UE 101 supports Bluetooth/BLE; whether an (R)AN node 111 supports LTE-WLAN aggregation (LWA) and/or LTE/WLAN Radio Level Integration with IPsec Tunnel (LWIP), etc.), subscription information of particular UEs 101, etc.); energy budget (e.g., battery power budget); and/or other like capabilities.

The operational contexts and/or constraints may be any type of information about how a particular compute node is operating and/or the conditions under which the compute node is operating. The operational contexts and/or constraints include, for example, channel state conditions and/or quality of fronthaul links 103, 105, and/or 107, and state conditions and/or quality of backhaul links/interfaces 112, 114, 115, 125; overload conditions experienced by UEs 101 and/or (R)AN nodes 111 and 106; application parameters such as computational needs, input/output characteristics, and volume of exchanged data with an edge server, or the like; conditions of individual hardware components (e.g., temperature, load, utilization, current or predicted available power, energy consumption measurements, etc.); environmental information of an environment surrounding a compute node (e.g., temperature, ambient light, sound/volume, altitude, humidity, moisture, information/data related to geographic objects (e.g., mountains) and/or human-created objects (e.g., buildings, highways, etc.), weather data for a given location, the geolocation or other positioning information, and/or other like environmental measurements); OS and/or application parameters and requirements; and/or other like contextual information. In some embodiments, the operational contexts and/or constraints may be based on a pre-assessment of an operational state of the edge compute nodes 101, 102, which may be based on previously indicated operational contexts and/or constraints for different offloading opportunities. This may involve, for example, evaluating both computation and communication resources needed for different offloading opportunities. The threshold criteria or a desired level of reliability mentioned previously may be based on a certain amount or type of compute node capabilities (e.g., a certain processor speed) and/or a type of operational constraints under which the compute node is operating (e.g., a desired link quality, a desired surrounding temperature, a desired processor temperature, etc.).

The fronthaul and/or backhaul link conditions may include network performance information related to network traffic measurements (e.g., measurements of the amount and type of traffic flowing through or across one or more network nodes), as well as various performance measurements. The performance measurements may include information/data related to bandwidth, channel/link throughput and/or data rate, latency, jitter, error rate, a number of active UEs 101 and/or user sessions, packet delay, call and/or connection drops, loss rate, data volume measurements, round trip times (RTTs) and/or round-trip delay times (RTDs), QoS parameters, etc. The fronthaul link conditions may include the aforementioned traffic and performance measurements, as well as information/data related to signal strength measurements (e.g., reference signal received power (RSRP), received signal strength indicator (RSSI), etc.), signal quality measurements (e.g., reference signal received quality (RSRQ), energy per bit to noise power spectral density ratio (Eb/No), signal-to-noise ratio (SNR), signal-to-interference-plus-noise ratio (SINR), etc.), channel state information (CSI), channel or network access information (e.g., a number of radio resource control (RRC) connection/setup/reconfiguration attempts, a number of random access and/or random access channel (RACH) attempts, a number of radio link failures (RLFs), a number of handovers (HOs)/HO attempts/HO failures, etc.), and/or the like.

Any of the aforementioned operational parameters may be measured or otherwise determined stochastically or deterministically. The stochastic operational parameters (or stochastic components of the operational parameters) may be randomly determined or measured, or may have a random probability distribution or pattern that is analyzed statistically but may not be predicted precisely. The deterministic operational parameters (or deterministic components of the operational parameters) may be measurements or information produced without randomness. In other words, the deterministic operational parameters when measured or determined are likely to produce the same outcome given a particular situation and/or context.

As mentioned previously, in a first embodiment, the MEC system 200 distributes encoded training datasets $x_1$-$x_m$ to individual edge compute nodes 101, 201, and calculates a full gradient from the partial gradients computed by the edge compute nodes 101, 201 using the encoded training datasets $x_1$-$x_m$. In some such embodiments, the MEC system 200 may provide or indicate an identifier of remote resource(s) and/or remote memory/storage location(s) where the training datasets $x_1$-$x_m$ and/or respective computational tasks $\beta_1$-$\beta_d$ can be located and accessed. In various embodiments, the MEC system 200 determines a coding redundancy to encode the training datasets $x_1$-$x_m$. A redundancy is coded into the training datasets to avoid wait time and bottleneck issues due to straggler nodes as discussed previously. The MEC system 200 determines the coding redundancy based on the operational parameters of each edge compute node 101, 201, which is used to encode the respective training datasets $x_1$-$x_m$. In some embodiments, the coding redundancy is a function of the number of data points in the full training dataset X. In an example where the full training dataset X includes one thousand (1000) data points to be distributed among ten (10) edge compute nodes 101, 201, a redundancy for encoding the training dataset X may be determined to be eleven hundred (1100) data points based, for example, on the load balancing policy discussed previously. In this example, the coding redundancy is one hundred (100) additional data points, and each of the ten edge compute nodes 101, 201 may receive a training dataset $x_i$ with a portion of the additional one hundred (100) data points of the coding redundancy. Continuing with this example, if the training dataset X is to be equally divided among the ten edge compute nodes 101, 201, then the training dataset $x_i$ for each of the ten edge compute nodes 101, 201 may be encoded to include one hundred ten (110) data points. By encoding a redundancy into the training datasets for each edge compute node 101, 201, the MEC system 200 does not have to wait for each partial gradient to be obtained from each of the ten edge compute nodes 101, 201 to compute the full gradient. Instead, the MEC system 200 only has to wait computations performed on one thousand data points of the distributed training datasets. In this way, the MEC system 200 can avoid the wait time and bottleneck issues due to straggler compute nodes as discussed previously.

According to second embodiments, rather than distributing training datasets $x_1$-$x_m$ to individual edge compute nodes 101, 201, the training datasets $x_1$-$x_m$ may be locally available or accessible at each of the edge compute nodes 101, 201, and the MEC system 200 instructs the edge compute nodes 101, 201 to perform training tasks $\beta_1$-$\beta_d$ using the locally available/accessible training datasets $x_1$-$x_m$. The locally available/accessible datasets $x_1$-$x_m$ may be stored in local storage/memory circuitry of the edge compute nodes 101, 201; may be accessed via a direct link 105 from a remote sensor, IoT UE(s) 101x, or some other UE 101; and/or may be accessed from a remote storage system (e.g., cloud storage or via a platform provided by server(s) 130). As an example with reference to FIG. 1, the datasets $x_1$ and $x_2$ may be stored in local memory of UEs 101a and 101b, respectively, while the dataset $x_3$ may be accessed by UE 101c from individual UEs 101x over direct links 105. In this example, the dataset $x_3$ may include sensor data captured by IoT UEs 101x.

In these embodiments, the MEC system 200 determines a size of a subset of the local training datasets $x_1$-$x_m$ that the individual edge compute nodes 101, 201 should process, the particular tasks $\beta_1$-$\beta_d$ to be used to process the local training datasets $x_1$-$x_m$, and the coding redundancy to be used to encode the locally available data. In some such embodiments, the MEC system 200 may provide or indicate an identifier or remote resource(s) and/or remote memory/storage location(s) where the aforementioned information can be located and accessed. In various embodiments, the size of the local training datasets $x_1$-$x_m$ to be processed and/or the coding redundancy is based on the operational parameters of the individual edge compute nodes 101, 201. In some embodiments, the size of the local training datasets $x_1$-$x_m$ at each edge compute node 101, 201 is weighted based on operational parameters. The coding redundancy and the weights are used to reduce wait times and bottlenecks due to straggler nodes. In these embodiments, the individual edge compute nodes 101, 201 encode their locally available training datasets $x_1$-$x_m$ according to the coding redundancy indicated by the MEC system 200. At each epoch, the edge compute nodes 101, 201 locally perform tasks $\beta_1$-$\beta_d$ to compute partial gradients on local uncoded training datasets $x_1$-$x_m$. These and other aspects of the embodiments are discussed in more detail infra with respect to FIG. 2-5.

Referring back to FIG. 1, the environment 100 is shown to include a user equipment (UE) 101a, UE 101b, UE 101c, and individual UEs 101x (collectively referred to as "UE 101" or "UEs 101"). The UEs 101 may also be referred to as "edge devices," "compute nodes," "edge compute nodes," and/or the like. In this example, the UE 101a is illustrated as a smartphone, UE 101b is illustrated as a tablet computer (e.g., handheld touchscreen mobile computing device connectable to one or more cellular networks), and UE 101c is illustrated as a laptop computer. However, these UEs 101 may comprise any mobile or non-mobile computing device, such as Personal Data Assistants (PDAs), pagers, desktop computers, wireless handsets, vehicle-embedded systems or a vehicle-to-everything (V2X) devices, or any type of computing device including a wireless communications interface.

Environment 100 also includes IoT UEs 101x, which are uniquely identifiable embedded computing devices (e.g., within the Internet infrastructure) that comprise a network access layer designed for low-power IoT applications utilizing short-lived UE connections. An IoT UE 101x can utilize technologies such as M2M or MTC for exchanging data with an MTC server (e.g., a server 130), a MEC server 201 and/or MEC system, or device via a PLMN, ProSe or D2D communication, sensor networks, or IoT networks. The M2M or MTC exchange of data may be a machine-initiated exchange of data. An IoT network describes an interconnecting IoT UEs 102, such as the IoT UEs 102 in FIG. 1 being connected to one another over respective direct links 105. The IoT UEs 102 may execute background applications (e.g., keep-alive messages, status updates, etc.) to facilitate the connections of the IoT network. Where the IoT devices 102 are, or are embedded in, sensor devices, the IoT network may be a wireless sensor network (WSN).

The UEs 101 may be configured to connect, for example, communicatively couple, with RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize respective connections (or channels) 103, respectively, each of which comprises a physical communications interface or layer. In this example, the connections 103 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

In embodiments, the UEs 101 may further directly exchange communication data via respective direct interfaces 105. In some implementations the interface 105 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 105 may be an LTE Proximity Services (ProSe) link. The ProSe interface 105 may alternatively be referred to as a sidelink interface, and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101)

communicate with each other directly over the PC5/SL interface 105 and can take place when the UEs 101 are served by Access Nodes (ANs) 111 or when one or more UEs are outside a coverage area of a RAN. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, UEs 101, (R)AN nodes 111, application servers 130, and pedestrian UEs 101, may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101 may be implemented/employed as Vehicle Embedded Communications Systems (VECS) or the like.

The UEs 101*b* and 101*c* are shown to be configured to access an access point (AP) 106 via respective connections 107. The connections 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network 120 of the wireless system. In various embodiments, the UE 101*b*, RAN 110, and AP 106 may be configured to utilize LWA operation and/or LWIP operation. The LWA operation may involve the UE 101*b* in RRC_CONNECTED being configured by a RAN nodes 111*a-b* to utilize radio resources of LTE and WLAN. LWIP operation may involve the UE 101*b* using WLAN radio resources (e.g., connection 107) via IPsec protocol tunneling to authenticate and encrypt packets (e.g., IP packets) sent over the connection 107. IPsec tunneling includes encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs include one or more remote radio heads or RFEMs (see, e.g., FIG. 9), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN XR220 of Figure XR2) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UEs 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101*b* within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8). Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system (e.g., when CN 120 is an Evolved Packet Core (EPC) 120), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an Fifth Generation Core (5GC)) 120, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

The CN 120 includes various core network elements or application functions (AFs) such as those discussed previously. The CN 120 is shown to be communicatively coupled to an application server 130 and a network 150 via an IP communications interface 125, the one or more server(s) 130 comprise one or more physical and/or virtualized systems for providing functionality (or services) to one or more clients (e.g., UEs 101) over a network (e.g., network 150). The server(s) 130 may include various computer devices with rack computing architecture component(s), tower computing architecture component(s), blade computing architecture component(s), and/or the like. The server(s) 130 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 130 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 130 offer applications or services that use IP/network resources. As examples, the server(s) 130 may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) 130 can also be configured to support one or more communication services (e.g., Voice-over-Internet Protocol (VoIP) sessions, PTT sessions, group communication sessions, social networking services, etc.) for the UEs 101 via the CN 120.

In some embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In some embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

The network 150 comprises computers, network connections among the computers, and software routines to enable communication between the computers over network connections. In this regard, the network 150 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without radio frequency (RF) communications circuitry), routers, switches, hubs, radio beacons, base stations, picocell or small cell base stations, and/or any other like network device. Connection to the network 150 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 150 may require that the computers execute software routines which enable, for example, the seven layers of the OSI model of computer networking or equivalent in a wireless (cellular) phone network. Network 150 may be used to enable relatively long-range communication such as, for example, between the one or more server(s) 130 and one or more UEs 101. The network 150 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the network 150 may be associated with network operator who owns or controls equipment and other elements necessary to provide network-related services, such as one or more base stations or access points, one or more servers for routing digital data or telephone calls (for example, a core network or backbone network), etc.

As shown by FIG. 1, each of the (R)AN nodes 111 and AP 106 are co-located with MEC servers 201*a*, 200*b*, and 200*c*, respectively. These implementations may be small-cell clouds (SCCs) where a MEC server 201 is co-located with a small cell (e.g., pico-cell, femto-cell, etc.), or may be mobile micro clouds (MCCs) where a MEC server 201 is co-located with a macro-cell (e.g., an eNB, gNB, etc.). The MEC servers 201 may be deployed in a multitude of arrangements other than as shown by FIG. 1. In a first example, the MEC servers 201 may be co-located or operated by RNCs, which may be the case for legacy network deployments, such as 3G networks. In a second example, the MEC servers 201 may be deployed at cell aggregation sites or at multi-RAT aggregation points that can be located either within an enterprise or used in public coverage areas. In a third example, the MEC servers 201 may be deployed at the edge of Core Network (CN) 120. These implementations may be used in follow-me clouds (FMC), where cloud services running at distributed data centers follow the UEs 101 as they roam throughout the network.

The (R)AN nodes 111 are shown to be communicatively coupled to a CN 120—via interface 114 or 115. In embodiments, the CN 120 may be an evolved packet core (EPC) network, a NextGen Packet Core (NPC) network, a 5G core (5GC), or some other type of CN. The CN 120 may be associated with a network operator who owns or controls equipment and other elements necessary to provide network-related services, such as the (R)AN nodes 111, one or more servers and/or network function virtualization infrastructure (NFVI) for implementing the various elements of the CN 120 and various elements of the MEC system 200. In some embodiments, Network Functions Virtualization (NFV) is utilized to virtualize any or all of the above described network node functions via executable instructions stored in one or more computer readable storage mediums.

According to various embodiments, task offloading may be "opportunistic", wherein the MEC system 200 (or MEC server 201*b* selected as the master node in the example of FIG. 1) may offload ML training tasks $\beta_1$-$\beta_d$ and/or training datasets $x_1$-$x_m$ to a UE 101 taking into account the computational complexity of the ML training tasks $\beta_1$-$\beta_d$ and/or the amount of computational and network/signaling resources available at the UE 101. For example, a MEC server 201 may offload a certain number and/or type of tasks $\beta_1$-$\beta_d$, and/or a size and/or type of training data $X_1$-$X_n$ based on the quality or strength of its link 103, 105, 107, the strength or quality of the computational resources available at the UE 101, an amount of available memory or a current memory utilization of the UE 101, and/or based on other operational parameters of (or experienced by) the UE 101. For some identified tasks, the MEC system 200 may evaluate the offloading opportunity (e.g., the "tradeoff") with respect to available UEs 101, in which case the MEC system 200 may offload tasks $\beta_1$-$\beta_d$ and training datasets $x_1$-$x_m$ to certain UEs 101 that are capable of providing output data from performing their respective tasks $\beta_1$-$\beta_d$ (e.g., calculated partial gradients) back to the MEC server 201 in a desired period of time.

In a first example and with reference to FIG. 1, the first link 103 that communicatively couples UE 101*a* with (R)AN node 111*a* is a lower quality channel than the second link 103 that communicatively couples UE 101b with (R)AN node 111b. In one version of this first example, the MEC server 201b may partition the training data X such that the training dataset $x_2$ for UE 101b has more data points than the training dataset $x_1$ for UE 101a. By allowing the UE 101a with a lower quality link 103 to perform computations on fewer data points, the UE 101a may provide the output data to the MEC server 201 within the desired period of time. In another version of this first example, the MEC server 201b may balance the computational load of the underlying ML model y such that more tasks $\beta_2$ for UE 101b includes more computations or more complex computations than tasks $\beta_1$ for UE 101a. By allowing the UE 101a with a lower quality link 103 to perform fewer computations or less complex computations on its dataset $x_1$, the UE 101a may provide the output data to the MEC server 201 within the desired period of time. In another version of this first example, the training dataset $x_1$ is locally available at the UE 101a and the training dataset $x_2$ is locally available at the UE 101b, and the MEC server 201b may provide encoding criteria to the UE 101a to encode fewer data points within the training dataset $x_1$ than the number of data points of the training dataset $x_2$ to be encoded by UE 101b, such that the UE 101a and UE 101b provide their encoded datasets to the MEC server 201 within a same or similar amount of time.

In a second example and with reference to FIG. 1, the UE 101b is communicatively coupled with (R)AN node 111b via a low quality cellular link 103, and communicatively coupled with AP 106 with a better quality WiFi link 107. In this example, the MEC server 201b may offload tasks $\beta_2$ with training dataset $x_2$ or encoding criteria to UE 101b, and request the UE 101b to provide the output data to MEC server 201c co-located with, or implemented by, AP 106.

In a third example and with reference to FIG. 1, the UE 101b is communicatively coupled with (R)AN node 111b via relatively low quality link 103. In this example, the UE 101b may evaluate and request a relatively close or proximate UE 101c having better computation capabilities and a better communication link 107 to AP 106 than the link 103 with the (R)AN node 111b. In this example, the UE 101b may offload one or more computational tasks to the proximate UE 101c using a direct link 105 or via a direct, line of sight (LOS) link with a local small cell (e.g., AP 106 in the example of FIG. 1).

Based on the operational parameters discussed previously, offloading tradeoffs may be evaluated and optimal or best offloading opportunities may be determined based on the tradeoffs. In a first example, the MEC server 201b may evaluate tradeoffs and find an optimal offloading opportunity, and the MEC server 201b may send requests directly to one or more edge compute nodes 101, 102 to offload certain tasks $\beta_1$-$\beta_d$. In a second example, the MEC server 201b may request other MEC servers 201a and 201c to assign one or more tasks $\beta_1$-$\beta_d$ to various edge compute nodes 101. In a third example, the MEC server 201b may consider tasks $\beta_1$-$\beta_d$ at the application level (e.g., computational capabilities, etc.), and the MEC server 201b may request the other MEC servers 201a and 201c to consider link/channel criteria for offloading tasks $\beta_1$-$\beta_d$ to individual edge node 101.

As an example of the first embodiment, the MEC server 201b includes encoding circuitry coupled with processor circuitry, where the encoding circuitry is arranged to encode a raw dataset into an encoded training dataset X. The raw dataset may be collected from one or more edge compute nodes 101, 201 and/or from some other data source. The encoded training dataset X includes a number of extra data points based on the determined coding redundancy. The number of extra data points included in the encoded training dataset X may be the same number of data points as the number of data points in the raw dataset, or the number of extra data points in the encoded training dataset X may be greater than the number of data points in the raw dataset. The encoding circuitry may be arranged to encode the raw dataset using a random linear encoder. Operation of the random linear encoder enables to MEC server 201b to select each element of a random generator matrix independently from a normal distribution, a Bernoulli distribution, or some other suitable distribution. The random generator matrix has c number of rows and m number of columns such that any m subset of c rows is a near-orthogonal m×m matrix, where $c > m \geq 1$.

The processor circuitry is arranged to partition the encoded training dataset X into a set of training data partitions $x_1, x_2, x_3, x_{m-1}$, and $x_m$, and assigns each training data partition $x_1, x_2, x_3, x_{m-1}$, and $x_m$ to corresponding edge compute nodes 101, 201 that are available to perform computations for a distributed ML training process. The number of data points included in each training data partition $x_1, x_2, x_3, x_{m-1}$, and $x_m$ is based on one or more operational parameters of the corresponding edge compute nodes 101, 201. The MEC server 201b also includes communication circuitry communicatively coupled with the processor circuitry. The communication circuitry is arranged to transmit each training data partition $x_1, x_2, x_3, x_{m-1}$, and $x_m$ to corresponding edge compute nodes 101, 201, and receive computed partial gradients from a subset of the corresponding edge compute nodes 101, 201. The processor circuitry is arranged to determine updated ML training parameters (e.g., a full or complete gradient) based on an aggregation of the received computed partial gradients, and the communication circuitry is arranged to transmit the updated ML training parameters to the corresponding heterogeneous compute nodes.

In this example, the processor circuitry is arranged to determine the coding redundancy value based on the operational parameters and a load allocation criterion. The load allocation criterion may be based on a minimax criterion. The minimax criterion is a value that maximizes a number of partial gradients to be received from each heterogeneous compute node while minimizing the epoch time.

As an example of the second embodiment, the MEC server 201b includes processor circuitry arranged to determine a coding redundancy for each edge compute node 101, 201 available to perform computations for a distributed ML training process. The coding redundancy indicates a number of encoded data points, which are generated from uncoded data (or raw data) available at each edge compute node 101, 201 to be included in a respective encoded training data partition $x_1, x_2, x_3, x_{m-1}$, and $x_m$ based on operational parameters of each edge compute node 101, 201. The MEC server 201b also includes communication circuitry communicatively coupled with the processor circuitry. The communication circuitry is arranged to transmit an indication of the number of data points and the coding redundancy to each edge compute node 101, 201, receives encoded training data partitions $x_1, x_2, x_3, x_{m-1}$, and $x_m$ from a set of the edge compute nodes 101, 201, and also receives first partial gradients based on the uncoded (or raw) data from the set of the edge compute nodes 101, 201. In this example, the processor circuitry is arranged to determine second partial gradients based on the encoded training data partitions $x_1, x_2, x_3, x_{m-1}$, and $x_m$, and determine updated ML training parameters (e.g., a full or complete gradient) based on an aggregation of the first partial gradients with the second partial gradients. The communication circuitry is arranged to transmit the updated ML training parameters and/or the aggregated partial gradients to corresponding edge compute nodes 101, 201. The communication circuitry may also be arranged to transmit a probability value with the indication of the number of data points and the coding redundancy to each edge compute node 101, 201. The probability value indicates a probability that the first partial gradient will be received within a predetermined epoch time. Each edge compute node 101, 201 uses the probability value to weight the uncoded data before encoding is performed.

In this example, the processor circuitry is arranged to determine the coding redundancy based on the operational parameters and a load allocation criterion. The load allocation criterion may be, or may be based on, a minimax criterion. The minimax criterion is a value that maximizes a number of partial gradients to be received from each edge compute nodes 101, 201 while minimizing a desired epoch time. The desired epoch time is based on a computation time for computation of the partial gradients at each edge compute node 101, 201, and an amount of time for receiving the partial gradients from respective edge compute node 101, 201. The computation time may also be based on one or more deterministic components and/or one or more stochastic components of the operational parameters of each edge compute node 101, 201. The processor circuitry may also be arranged to determine the coding redundancy based on a desired number of encoded data points to be accepted for determination of the second partial gradients. Additionally, the number of data points to be included in the encoded training data partition, as indicated by the coding redundancy, may be a fraction of a total number of uncoded data points distributed across all computing nodes.

In this example, each edge compute node 101, 201 includes encoding circuitry arranged to encode their locally available or accessible uncoded (or raw) data into respective training data partitions $x_1$, $x_2$, $x_3$, $x_{m-1}$, and $x_m$. The encoding circuitry of each edge compute node 101, 201 may use a random linear encoder. In this example, the encoding circuitry of each edge compute node 101, 201 may operate a respective random linear encoder to select each element of a random generator matrix independently from a normal distribution, a Bernoulli distribution, or some other suitable distribution. The random generator matrix includes S number of rows and m number of columns such that any m subset of S rows is a near-orthogonal m×m matrix, where $\delta > m \geq 1$.

FIGS. 2-5 show example distributed ML procedures 200-500, respectively, in accordance with various embodiments. For illustrative purposes, the various operations of processes 200-500 is described as being performed by one or more data collector nodes 2102 (e.g., including UEs 101a-c and/or IoT UEs 101x of FIG. 1), one or more edge compute nodes 2101 (e.g., including UEs 101, one or more MEC servers/hosts 201, (R)AN nodes 111, AP 106, RSUs, relay nodes, distributed units, etc. FIG. 1), and a master node 2112 (e.g., the MEC system 200 or a selected MEC server 201b in FIG. 1). Additionally, the various messages/signaling communicated between the data collector nodes 2102, edge compute nodes 2101, and the master node 2112 may be sent and received over various interfaces discussed infra with respect to FIGS. 6-15, and using the various mechanisms discussed herein including those discussed infra with respect to FIGS. 6-15. While particular examples and orders of operations are illustrated FIGS. 2-5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 2:
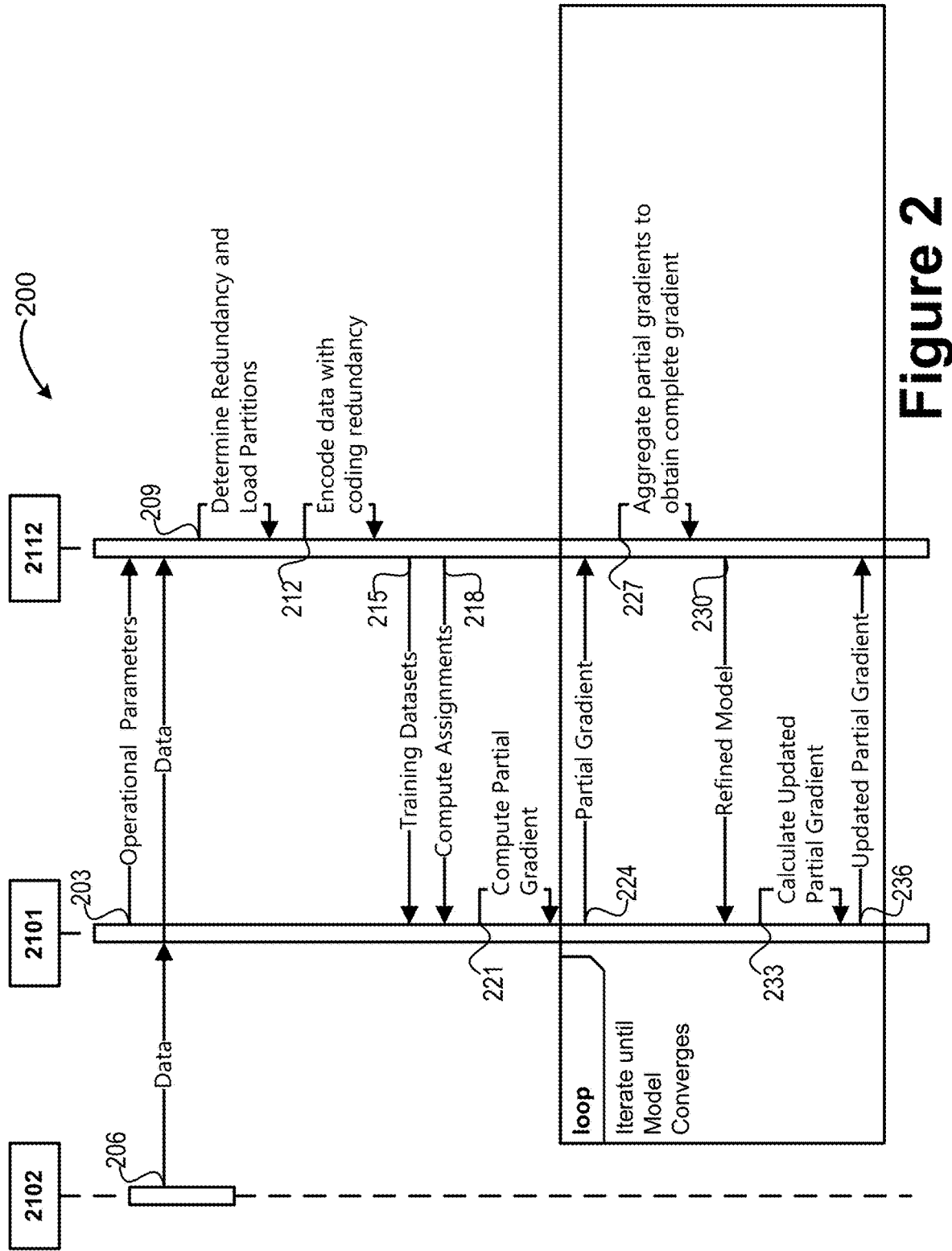
FIGS. 2-5 show example distributed ML procedures in accordance with various embodiments. In particular.

FIG. 2 depicts an example distributed machine learning procedure 200 according to a first embodiment. The distributed machine learning procedure 200 is used for embodiments where training dataset and computational tasks are distributed to one or more edge compute nodes 2101. Procedure 200 begins at operation 203 where edge compute nodes 2101 provide operational parameters to the master node 2112, which includes indications of compute node capabilities and operational constraints as discussed previously. The edge compute nodes 2101 may identify their operational parameters using suitable APIs and/or application binary interfaces (ABIs), middleware, drivers, configuration files, trusted application(s), RF measurement mechanisms, and/or other like mechanisms to obtain or identify their respective operational parameters. In some embodiments, the data collector nodes 2102 may also provide their operational parameters to the master node 2112 in a same or similar manner as the edge compute nodes 2101. The identified operational parameters may be packaged into appropriate messages for communication according to know mechanisms and protocols. Meanwhile, at operation 206, one or more data collector nodes 2102 and edge compute nodes 2101 provide data to the master node 2112, which may include raw sensor data or other suitable types of data. The data may be captured using and packaged into appropriate messages for communication according to know mechanisms and protocols, such as those discussed herein. Operations 203 and 206 may repeat as necessary, for example, on a periodic basis, during procedure 200 including during operation of the other operations of procedure 200 discussed infra.

At operation 209, the master node 2112 determines a redundancy and load partitions based on the operational parameters and a load balancing policy. At operation 212, the master node 2112 encodes the data with the coding redundancy to obtain individual training datasets. At operation 215, the master node 2112 provides the encoded training datasets to respective edge compute nodes 2101, and at operation 218, the master node 2112 provides computational tasks (compute assignments) to the respective edge compute nodes 2101 for calculating output data, such as partial gradients when the underlying ML algorithm is a GD algorithm. At operation 221, each edge compute node 2101 computes a partial gradient, and at operation 224, the edge compute nodes 2101 individually provide their respective partial gradients to the master node 2112 once they complete their local calculations. At operation 227, the master node 2112 aggregates the partial gradients to obtain a complete gradient. Note that, because the coding redundancy was encoded into the individual training datasets at operation 212, the master node 2112 does not have to wait for each compute node 2101 to provide their partial gradients in order to compute the complete gradient. In addition, the master node 2112 may update the underlying model, and at operation 230, the master node 2112 provides the updated or refined model back to the edge compute nodes 2101 for the next epoch in the iterative training process. In some embodiments, the complete gradient is provided to the edge compute nodes at operation 230. At operation 233, the edge compute nodes 2101 calculate an updated partial gradient, which is then provided to the master node 2112 at operation 236 for further aggregation similar to operation 227 (not shown by FIG. 2). Operations 224-236 repeat until the underlying model sufficiently converges.

In the example of FIG. 2, training is performed for a supervised machine learning problem (e.g., a GD algorithm) based on a dataset $\{(X_k, y_k)\}_{k=1,\ldots,m}$ to learn underlying model parameters $\beta \in R^d$, wherein $X_k$ is the total training data, k is a number of data points (or training symbols) in $X_k$ where k=k to m, and $y_k$ is an associated model level related to each of the data in $X_k$ (e.g., where the underlying model is a single or multi-level model). Each training label is a row vector of training symbols $X_k=[x_{k,1}, \ldots, x_{k,d}] \in R^{1 \times d}$ and $y_k \in R$ is an associated scalar measurement. Under the linear model, the training data can be represented by equation 0.

$$Y = X\beta + n \quad \text{(equation 0)}$$

In equation 0, $\beta$ is the model to be created, X is the input data, and Y is/are the output variables. In addition, for equation 0, $$X \triangleq \begin{pmatrix} X_1 \\ \vdots \\ X_m \end{pmatrix}$$

is an m×d training symbol matrix, $$\beta \triangleq \begin{pmatrix} \beta_1 \\ \vdots \\ \beta_d \end{pmatrix}$$

is a d×1 unknown model parameter matrix, $$n \triangleq \begin{pmatrix} n_1 \\ \vdots \\ n_m \end{pmatrix}$$

is an m×1 measurement noise (e.g., Gaussian) matrix, and $$Y \triangleq \begin{pmatrix} y_1 \\ \vdots \\ y_m \end{pmatrix}$$

is an m×1 measurement vector collected for training.

Gradient descent (GD) is an optimization algorithm used to minimize a target function by iteratively moving in the direction of a steepest descent as defined by a negative of the gradient. An objective of GD in machine learning (ML) is to utilize a training dataset D in order to accurately estimate the unknown model $\beta$ over one or more epochs r. In ML, GD is used to update the parameters of the unknown model $\beta$. Parameters refer to coefficients in linear regression and weights in a neural network. These objectives are realized in an iterative fashion by computing $\beta^{(r)}$ at the r-th epoch, and evaluating a gradient associated with the squared-error cost function defined by $f(\beta^{(r)}) = \|X\beta^{(r)} - Y\|^2$. The cost function indicates how accurate the model $\beta$ is at making predictions for a given set of parameters. The cost function has a corresponding curve and corresponding gradients, where the slope of the cost function curve indicates how the parameters should be changed to make the model $\beta$ more accurate. In other words, the model $\beta$ is used to make predictions, and the cost function is used to update the parameters for the model $\beta$. The gradient of the aforementioned squared-error cost function is given by equation 1, and $\beta^{(r)}$ is updated at each epoch r according to equation 2

$$\nabla_\beta f(\beta^{(r)}) = X'(X \beta^{(r)} - Y) \quad \text{(equation 1)}$$

$$\beta^{(r+1)} = \beta^{(r)} - \frac{\mu}{m}\nabla_\beta f(\beta^{(r)}) \quad \text{(equation 2)}$$

In equation 2, m is the total number of observations (i.e., data points), $\mu$ is a learning rate (also referred to as an update parameter or step size) for moving down a particular gradient, where $0 < \mu \leq 1$, and $\nabla_\beta f(\beta^{(r)})$ is a prediction based on the model $\beta(r)$ In general, $\mu$ is designed to be a relatively small value, such as 0.01 or 0.001 to improve precision and avoid overshot issues. However, using a low learning rate may be more time consuming when calculating the gradient. Additionally, $\beta^{(0)}$ may be initialized arbitrarily. GD involves computing equations 1 and 2 in tandem until the model parameters converge sufficiently. The gradient in equation 1 requires multiplications involving matrices and vectors of large sizes. Therefore, GD becomes computationally prohibitive as dataset and model parameters become massive.

In order to meet computation demand of equation 1 according to a first embodiment, one approach is to distribute the training dataset across many edge compute nodes 2101 that can locally compute partial gradients from respective data subsets (see e.g., operation 224 in FIG. 2) and communicate the computed partial gradients back to the master node 2112 for aggregation (see e.g., operation 227 in FIG. 2). More specifically, equation 1 can be decomposed into m partial sums as shown by equation 3.

$$\nabla_\beta f(\beta^{(r)}) = \sum_{k=1}^{m} X'_k(X_k \beta^{(r)} - y_k) \quad \text{(equation 3)}$$

In an uncoded distributed gradient computing, the training dataset D is uniformly distributed to edge compute nodes 2101. The edge compute nodes 2101 compute the partial sums corresponding to their respective data subsets in equation 3 to evaluate partial gradients and send them back to the master node 2112 for aggregation (see e.g., operation 227 in FIG. 2). The master node 2112 can then use equation 2 to update the model and communicate the updated model back to the working compute nodes 2101 (see e.g., operation 230 in FIG. 2), and this process is repeated at each epoch until the model converges.

In a heterogeneous computing environment (e.g., environment 100 of FIG. 1), non-dedicated compute nodes 2101 are used for on-demand distributed gradient computing. Therefore, each compute node 2101 may have different operational parameters (e.g., processing speeds/rates, memory constraints, active running processes, link/channel conditions, different operating environments, etc.). One way to statistically represent the heterogeneity of the heterogeneous computing environment 100 is to model the computation time at each compute node 2101 as a shifted exponential random variable $T_k$ given by equation 3.1.

$$T_k = T_{k,1} + T_{k,2} \quad \text{(equation 3.1)}$$

In equation 3.1, the deterministic component $T_{k,1}$ depends on the processing rate and the number of data points assigned to the k-th device (e.g., compute node 2101$_k$), and the random component $T_{k,2}$ models randomness coming from memory read/write cycles required during multiply-accumulate operations for computing the partial gradient at the k-th device (e.g., compute node 2101$_k$). As mentioned previously, the wireless communication links 103, 107 between the master node 2112 and worker nodes 2101 may have stochastic fluctuations in link quality. In order to maintain reliable service, link adaptation becomes imperative where wireless links are periodically measured and achievable data rates are adjusted. In particular, a wireless link between the master node 2112 and the k-th edge compute node 2101$_k$ may be given by $(r_k, p_k)$, where $r_k$ is the achievable bits per channel use in order to have an erasure probability smaller than $p_k$. In various embodiments, the rate $r_k$ is dynamically adapted with respect to the changing link quality in order to maintain a constant erasure probability p (or $p_k$) during the entire gradient computation (see e.g., operation 227 of FIG. 2). As alluded to previously, an uncoded gradient computation carried out according to equation 3 may perform poorly due to the straggler effect coming from either the computation time and/or the link quality or both. Therefore, in various embodiments, the training datasets are encoded with a suitable coding redundancy (see e.g., operations 209 and 2112 of FIG. 2). Examples of coding redundancy calculation and load balancing (partitioning) according to the first embodiment is discussed in more detail with respect to FIG. 12.

According to the first embodiment, the training data may be (en)coded to tackle the straggler effect described previously. In various embodiments, linear random coding is performed on a training dataset D. In particular, a random generator matrix G, with elements drawn independently from a standard normal distribution, applied at the master node on the training dataset to obtain a coded training dataset $\tilde{D}=(\tilde{X},\tilde{Y})$, where $\tilde{X}=G\,X$, and $\tilde{Y}=G\,Y$.

The dimension of G is a measure of coding redundancy. If G is a c×m matrix, then the fraction $$\frac{c}{m} \geq 1$$

is the coding overhead incurred. Here, c is the coding redundancy, and m is the number of data points that are used to calculate the gradient (i.e., the m partial sums discussed previously). In other words, m is the number of data points over which a partial gradient is calculated. The amount of redundancy depends on the operational parameter heterogeneities $\{(T_k, r_k)\}_{k=1,\ldots,n}$. The coded dataset is partitioned into n disjointed groups, $\{(\tilde{X}_k, \tilde{Y}_k)\}_{k=1,\ldots,n}$, where $\tilde{X}_k \in R^{l_k \times d}$ and $\tilde{Y}_k \in R^{l_k \times 1}$, such that $\Sigma_{k=1}^{n} l_k = c$. The n disjointed groups may be referred to as "partitions," and each partition is assigned to its respective edge compute node 2101 (see e.g., operation 209 of FIG. 2). In one example, encoding circuitry of the master node 2112 may encode each training dataset using a random linear encoder. In this example, the encoding circuitry may operate the random linear encoder to select each element of a random generator matrix independently from a normal distribution or from a Bernoulli distribution. The random generator matrix includes c number of rows and m number of columns such that any m subset of c rows is a near-orthogonal m×m matrix, where $c > m \geq 1$.

Figure 3:
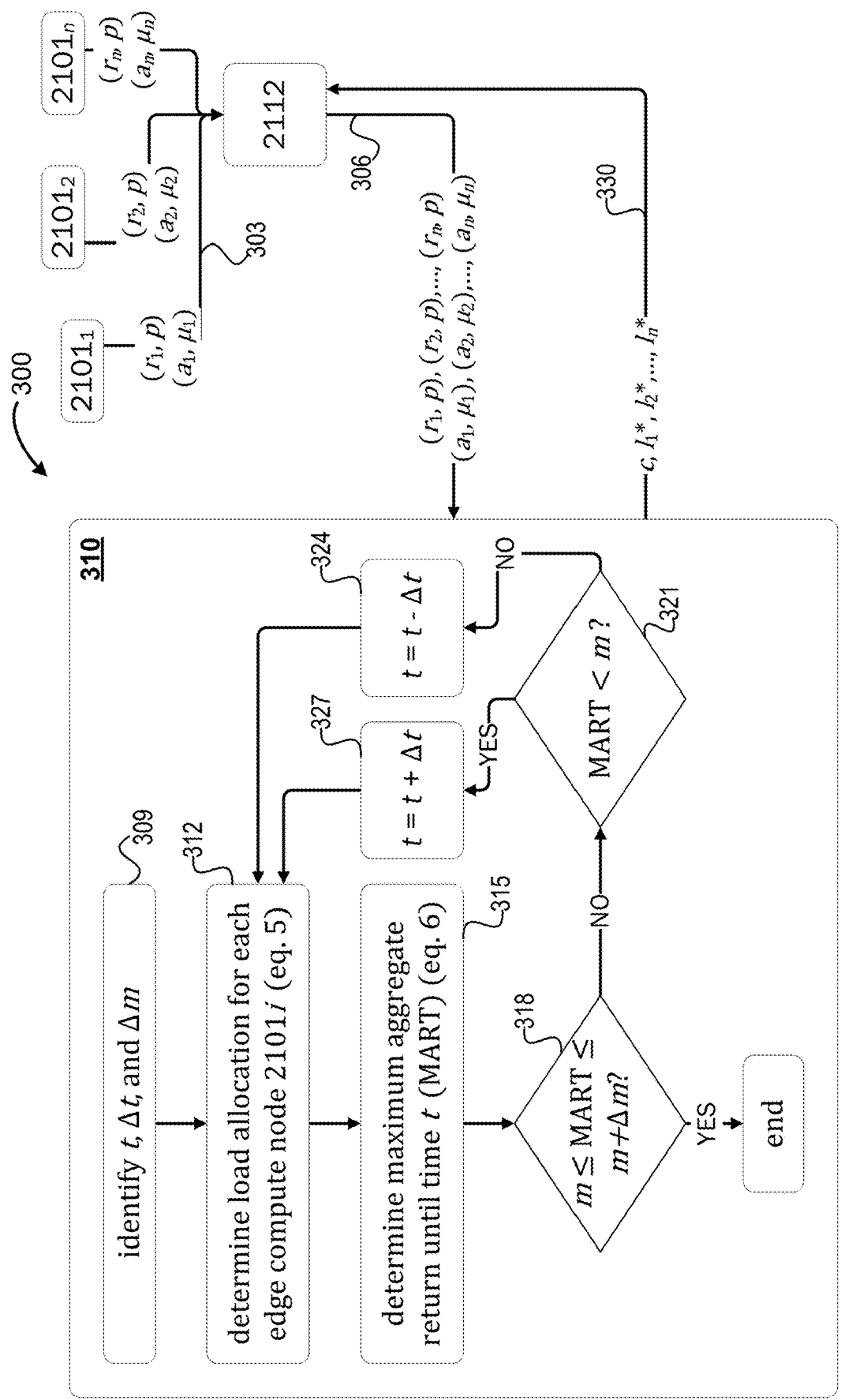

FIG. 3 depicts a load partitioning process 300 according to the first embodiment. Process 300 is used for computing a coding redundancy c and for performing load balancing or partitioning (see e.g., operation 209 of FIG. 2), which is eventually followed by decoding and aggregation of obtained partial gradients (see e.g., operation 227 of FIG. 2). Process 300 begins at operation 303 where individual edge compute nodes 2101 provide operational parameters to the master node 2112. In this example, the edge compute nodes 2101 provide a link/channel quality indication for their respective links 103, 107 (e.g., given as $(r_k, p_k)$, where k is a number from 1 to n), and a processing capabilities indication (e.g., given as $(a_k, \mu_k)$, where k is a number from 1 to n), which are then feed into a load balancing (or data partitioning) engine 310 at operation 306. The load balancing engine 310 is operated by the master node 2112 to execute the illustrated algorithm including operations 309-327.

At operation 309, the load balancing engine 310 identifies, determines, or reads in various parameters including a fixed time t, a unit time Δt (which may indicate a predicted processing time for an edge compute node 2101 for a given number of data points or some other suitable time value), and a tolerance parameter Δm. For the fixed time t, the aggregate return until time t for any epoch is defined as a random variable as shown by equation 4.

$$R(t; l) = \sum_{i=1}^{n} R(t; l_i) = \sum_{i=1}^{n} l_i 1_{\{T_i \leq t\}} \quad \text{(equation 4)}$$

In equation 4, for a load allocation l, the aggregate return denotes the total number of points in the (en)coded dataset that have been processed at the edge compute nodes 2101, and the corresponding partial gradients that have been (or will be) received at the master node until time t in any epoch r. At operation 312, the load balancing engine 310 determines a load allocation for each edge compute node 2101$_i$ where i is a number from 1 to n. For each edge compute node 2101$i$, $l_i^*(t)$ is defined by equation 5.

$$l_i^*(t) = \arg_{l_i} \max E(R_i(t, l_i)) \quad \text{(equation 5)}$$

Equation 5, in turn, maximizes the expectation of the aggregate return defined in equation 4. In equation 5, $l_i^*(t)$ is the load allocation (or partition) for a particular compute node 2101$_i$ at time t, where the sum of all of the load partitions $l_i^*(t)$ for all edge compute nodes 2101 is equal to the coding redundancy c. The coding redundancy c may be the total number of encoded data points to be distributed, where $l_i^*(t)$ is a certain portion of those encoded datapoints. At operation 315, the load balancing engine 310 determines a maximum aggregate return until time t (MART). Based on equation 5, the maximum expected aggregate return until time t (MART) is denoted by equation 6.

$$E(R(t; l^*(t))) = \sum_{i=1}^{n} E(R(t; l_i^*(t))) \quad \text{(equation 6)}$$

At operation 318, the load balancing engine 310 determines whether the MART is greater than or equal to the number of data points m and less than or equal to a combination of the number of data points m and the tolerance parameter Δm. In embodiments, t* (or Δt) may be obtained based on a solution to the optimization problem of equation 7. In equation 7, Δm is the tolerance parameter.

$$\min t \quad \text{(equation 7)}$$
$$\text{such that } m \leq E(R(t; l^*(t))) \leq m + \Delta m$$

If the determination at operation 318 (e.g., equation 7) is true, the load balancing engine 310 ends the load balancing/partitioning algorithm, and generates the coding redundancy c and the load partitions $l_i^*(t)$ for each edge compute node 2101. If the determination at operation 318 (e.g., equation 7)

is false, the load balancing engine 310 proceeds to operation 321 to determine whether the MART is less than the number of data points m. If the determination at operation 321 is true, then the load balancing engine 310 increments the fixed time t by the unit time Δt at operation 327. If the determination at operation 321 is true, then the load balancing engine 310 decrements the fixed time t by the unit time Δt at operation 324. This process repeats until operation 318 (e.g., equation 7) is determined to be true, at which point, the load balancing engine 310 ends the load balancing/partitioning algorithm, and generates the coding redundancy c and the load partitions $l_i^*(t)$ for each edge compute node 2101. Then the load balancing engine 310 provides the coding redundancy c and the load partitions $l_i^*(t)$ for each edge compute node 2101 to, for example, encoding circuitry of the master node 2112 to be encoded for each edge compute node 2101 at operation 330.

According to various embodiments, the master node 2112 decodes the partial gradients by aggregating the partial gradients. At each epoch, the master node receives partial gradients corresponding to the subsets of the coded dataset assigned to the working compute nodes 2101. Irrespective of the amount of coding redundancy c, it suffices to collect enough partial gradients that cover at least m coded data points. The k-th edge compute nodes 2101 computes the partial gradient corresponding to its assigned subset of the coded dataset as shown by equation 8.1, and sends the computed partial gradient back to the master node. The master node waits for coded partial gradients received from the first p edge compute nodes 2101 such that $\Sigma_{k=1}^{P} l_k \geq m$. After the master node receives coded partial gradients from the first p edge compute nodes 2101, the master node combines the received partial gradients to obtain a full or complete coded gradient according to equation 8.2.

$$\tilde{X}'_k(\tilde{X}_k \ \beta^{(r)} - \tilde{y}_k) \quad \text{(equation 8.1)}$$

$$\sum_{q=1}^{m} \tilde{X}'_q(\tilde{X}_q \ \beta^{(r)} - \tilde{y}_q) \quad \text{(equation 8.2)}$$

In equation 8.2, q represents the q-th row from the coded dataset $\tilde{D}$. When the random generator matrix G can be written as $$G \triangleq \begin{pmatrix} g_1 \\ \vdots \\ g_c \end{pmatrix},$$

wherein $g_k \in R^{1 \times m}$ is a row vector, equation 8 can be written as equation 9.

$$\sum_{q=1}^{m} X' g'_q (g_q X \ \beta^{(r)} - g_q Y) = \quad \text{(equation 9)}$$

$$\sum_{q=1}^{m} X' g'_q g_q (X \ \beta^{(r)} - Y) = X' \left( \sum_{q=1}^{m} g'_q g_q \right) (X \ \beta^{(r)} - Y)$$

From the weak law of large numbers, $$\frac{1}{m} \sum_{q=1}^{m} g'_q g_q$$

will be an identity matrix. Therefore, the combined coded gradient given by equation 8.2 can be normalized by m to obtain an approximation of the uncoded full gradient in equation 1, which is shown by equation 10.

$$\lim_{m \to \infty} \frac{1}{m} \sum_{q=1}^{m} \tilde{X}'_q (\tilde{X}_q \ \beta^{(r)} - \tilde{y}_q) = X'(X \ \beta^{(r)} - Y) \quad \text{(equation 10)}$$

Based on equation 10, the embodiments herein provide zero decoding complexity at the master node 2112.

A simulation was performed for the first embodiment, which included a simulation of a heterogeneous computing environment with 24 edge compute nodes 2101 and one master node 2112. The simulation used an LTE network, where each edge compute node 2101 was assigned 3 resource blocks with uplink and downlink channels having similar channel quality statistics. Furthermore, the link capacities (normalized) were generated using $\{1, \text{kFac1}, \text{kFac1}^2, \ldots, \text{kFac1}^{23}\}$ and a random permutation of the link capacities were assigned to the edge compute nodes 2101. Similarly, the processing capabilities/constraints (normalized) for the edge compute nodes 2101 were generated using $\{1, \text{kFac2}, \text{kFac2}^2, \ldots, \text{kFac2}^{23}\}$. The training dataset was m=7200 data points, and the dimension of the model was d=500. The training dataset was generated using the standard method, $y=X\beta^{true}+n$, where X and n were sampled from a standard normal distribution.

The results of the simulation compared the performance of the distributed ML scheme of the first embodiment with an uncoded scheme and a repetition scheme, where (kFac1, kFac2)=(0.9,0.9). The results of the simulation included a comparison of a least squares (LS) estimate of the true (uncoded) model, an uncoded error curve for the uncoded scheme with equal allocation, a coded LS estimate of the true (uncoded) model with a coded dataset, a coded error curve of the distributed ML scheme of the first embodiment, and repetition error curve corresponding to the repetition scheme. For the repetition scheme, each data point was processed at two edge compute nodes 2101, and thus, the coding overhead was c=2m. The coding overhead for the distributed ML scheme of the first embodiment was c=1.27m. Using the distributed ML scheme according to the first embodiment, the model β converges to the least squares solution with the coded dataset. Although the error in estimation of the true model β is larger in comparison to the uncoded and repetition schemes, the overall time for convergence is much less than the uncoded and repetition schemes.

The results of the simulation also included comparing the ratio of the mean convergence times for the distributed ML scheme of the first embodiment for different realizations of (kfac1, kFac2). The mean was obtained using twenty different datasets, and a stopping criterion was used for convergence, which is shown by equation 11.

$$\frac{\|\beta^{r+1} - \beta^r\|^2}{\|\beta^r\|^2} < 10^{-8} \quad \text{(equation 11)}$$

The simulation results show that the distributed ML scheme of the first embodiment has a superior performance in comparison to the uncoded scheme for all heterogeneity levels. When the system is homogeneous, for example, when (kFac1, kFac2)=(1,1), the distributed ML scheme of the first embodiment has similar performance as the uncoded scheme.

While the first embodiment is related to scenarios where the training dataset was centrally available at the master node 2112, a distributed ML scheme of a second embodiment is described infra where data resides with the edge compute nodes 2101, and the edge compute nodes 2101 perform the encoding computations themselves. In the second embodiment, the data collectors 2102 and the edge compute nodes 2101 may be considered identical, and the master node 2112 determines and distributes the appropriate level of redundant computations rather than performing load balancing across all nodes 2101, 2102, and completes the coordination and aggregation function of the partial gradients computed locally at the nodes 2101, 2102.

Figure 4:
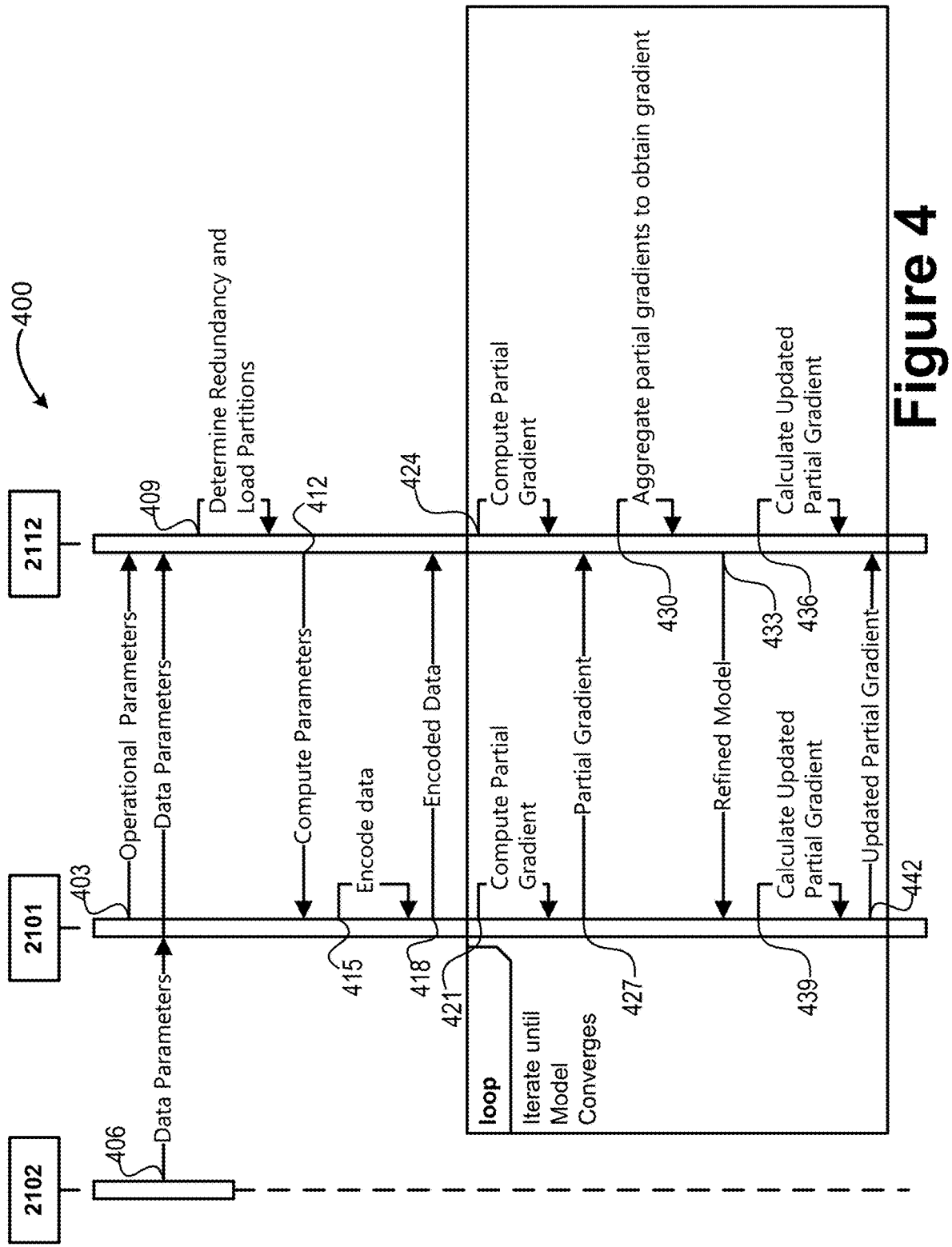

FIG. 4 depicts an example distributed machine learning procedure 400 according to a second embodiment. The distributed machine learning procedure 400 is used for embodiments where training data is locally accessible by one or more edge compute nodes 2101, and computational tasks and encoding parameters are distributed to those edge compute nodes 2101. Procedure 400 begins at operation 403 where edge compute nodes 2101 provide operational parameters to the master node 2112, which includes indications of compute node capabilities and operational constraints as discussed previously. In some embodiments, the data collector nodes 2102 may also provide their operational parameters to the master node 2112 in a same or similar manner as the edge compute nodes 2101. Meanwhile, at operation 406, one or more data collector nodes 2102 and/or edge compute nodes 2101 provide data parameters to the master node 2112, which may include information about the particular type of data locally accessible by the edge compute nodes 2101 and data collectors 2102 and an indication of the number of data points included in the locally accessible data. The operational parameters and data parameters may be identified using suitable APIs, ABIs, middleware, drivers, configuration files, trusted application(s), RF measurement mechanisms, etc. Additionally, the identified operational parameters and data parameters may be packaged into appropriate messages for communication according to know mechanisms and protocols, such as those discussed herein. Operations 403 and 406 may repeat as necessary, for example, on a periodic basis, during procedure 400 including during operation of the other operations of procedure 400 discussed infra.

At operation 409, the master node 2112 determines a redundancy and load partitions based on the operational parameters, data parameters, and a load balancing policy. At operation 412, the master node 2112 provides compute parameters to the edge compute nodes 2101. In this embodiment, the compute parameters may include information about the type of data to be processed by an edge compute node 2101, the number of data points to be processed by an edge compute node 2101 (e.g., a load partition for the edge compute node 2101), a coding redundancy for the edge compute node 2101, a particular encoding scheme to be used to encode the training data, computational tasks (compute assignments) for calculating output data such as partial gradients when the underlying ML algorithm is a GD algorithm, and other suitable information or parameters. At operation 415, the edge compute nodes 2101 individually encode their locally available data according to the received compute parameters to obtain individual training datasets, and at operation 418, the edge compute nodes 2101 individually provide their encoded training datasets to the master node 2112.

At operation 421, each edge compute node 2101 individually computes a partial gradient on the uncoded version of the encoded data provided to the master node 2112. Meanwhile at operation 424, master node 2112 computes partial gradients on the encoded datasets provided at operation 418. At operation 427, the edge compute nodes 2101 individually provide their respective partial gradients to the master node 2112 once they complete their local calculations. At operation 430, the master node 2112 aggregates the partial gradients, including the partial gradients calculated by the edge compute nodes 2101 and the partial gradients calculated by the master node 2112, to obtain a complete gradient. Note that, because the coding redundancy was encoded into the individual training datasets at operation 418, the master node 2112 does not have to wait for each compute node 2101 to provide their computed partial gradients in order to compute the complete gradient. In addition, the master node 2112 may update the underlying model, and at operation 433, the master node 2112 provides the updated or refined model back to the edge compute nodes 2101 for the next epoch in the iterative training process. In some embodiments, the complete or combined gradient is provided to the edge compute nodes at operation 433. At operations 436 and 439, the master node 2112 and the edge compute nodes 2101 calculate an updated partial gradient, respectively. The updated partial gradients computed by the edge compute nodes 2101 are then provided to the master node 2112 at operation 442 for further aggregation similar to operation 227 (not shown by FIG. 2). Operations 421-442 repeat until the underlying model sufficiently converges.

In the example of FIG. 4, training is performed for a supervised machine learning problem (e.g., a GD algorithm) based on a training dataset that is distributed across edge compute nodes 2101, where each edge compute node 2101 locally compute partial gradients and communicate those partial gradients to the master node 2112 (see e.g., operations 421 and 427 in FIG. 4). The master node 2112 aggregates the received partial gradients to update the model and communicates the updated model back to the edge compute nodes 2101 (see e.g., operations 424, 430, and 433 in FIG. 4). More specifically, it is straightforward to observe that equation 1 discussed previously with respect to FIG. 2 can be decomposed into n partial sums as shown by equation 12:

$$\nabla_\beta f(\beta^{(r)}) = \sum_{i=1}^{n} \sum_{k=1}^{l_i^{initial}} X_k^{(i)'} \left(X_k^{(i)} \beta^{(r)} - y_k^{(i)}\right) \quad \text{(equation 12)}$$

In equation 12, $(X_k^{(i)}, y_k^{(i)})$ is the k-th element of the training dataset stored at the i-th edge compute node 2101 (also referred to as "edge compute node 2101i" or the like), $l_i^{initial}$ is the number of training data elements available at the edge compute node 2101i, $$X^{(i)} = \begin{bmatrix} X_1^{(i)} \\ \vdots \\ X_{l_i^{initial}}^{(i)} \end{bmatrix},$$

-continued $$y^{(i)} = \begin{bmatrix} y_1^{(i)} \\ \vdots \\ y_{l_i^{initial}}^{(i)} \end{bmatrix},$$

$$\sum_{i=1}^{n} l_i^{initial} = m$$

is the total training data elements, and $$\left\{ X = \begin{bmatrix} X^{(1)} \\ \vdots \\ X^{(n)} \end{bmatrix}, y = \begin{bmatrix} y^{(1)} \\ \vdots \\ y^{(n)} \end{bmatrix} \right\} \stackrel{def}{=} D$$

is the entire training dataset distributed across n edge compute nodes 2101.

In an uncoded distributed gradient computing, the edge compute nodes 2101 compute the partial sums corresponding to their respective data subsets in equation 12 to evaluate partial gradients, and send them back to the master node 2112 for aggregation. The master node 2112 can then use equation 2 discussed previously to update the model and communicate the updated model back to the edge compute nodes 2101. This process (e.g., process 400) is iterated until sufficient convergence is achieved.

As mentioned previously, the heterogeneous computing environment 100 may be statistically represented as using a model of the computation time at each device as a shifted exponential random variable $T_k$ given as $T_k=T_{k,1}+T_{k,2}$, where the deterministic component $T_{k,1}$ depends on the processing rate and the number of data points assigned to the k-th device, and the random component $T_{k,2}$ models the randomness coming from memory read/write cycles required during multiply-accumulate operations for computing the partial gradient at the k-th device. In addition, the wireless communication links between the master node and the k-th edge compute node 2101 is given by $(r_k,q_k)$, where $r_k$ is the achievable bits per channel use in order to have an erasure probability smaller than $q_k$. It is a typical practice to dynamically adapt the rate $r_k$ with respect to the changing link quality in order to maintain a constant erasure probability q during the entire gradient computation. Examples of how the coding redundancy is calculated and how the load partitioning is achieved according to the second embodiment is discussed in more detail with respect to FIG. 5, which is used to address the straggler effect.

As alluded to previously, encoding the training data in the second embodiment involves use of the master node 2112 (e.g., a MEC system or one or more selected MEC servers 201) with relatively large processing and communication capabilities to aid the execution of ML algorithms, such as the GD algorithms as discussed herein, by executing partial gradients from encoded training data at each epoch to combat the straggling effects. In various embodiments, linear random coding is performed on an entire training dataset D that is distributed across all edge compute nodes 2101. In particular, the i-th edge compute node 2101 uses a random generator matrix $G_i$ of dimension $\delta \times l_i^{initial}$ with elements drawn independently from a standard normal distribution, applies the random generator matrix $G_i$ to the weighted local training dataset to obtain a (en)coded training dataset $(\tilde{X}^{(i)}, \tilde{Y}^{(i)})$, where $\tilde{X}^{(i)}=G_iW_iX^{(i)}$, $\tilde{Y}^{(i)}=G_iW_iY^{(i)}$, and $W_i$ is a weight matrix (see e.g., operation 415 in FIG. 4).

In the second embodiment, the coding redundancy $\delta$ depends on the heterogeneity in computing capabilities and constraints, communication capabilities and constraints, and power (energy) budget observed across the edge compute nodes 2101 (including UEs 101 and MEC servers 201). The coding redundancy $\delta$ may be explicitly computed using a load balancing algorithm discussed infra with respect to FIG. 5. The matrix $W_i$ is an $l_i^{initial} \times l_i^{initial}$ diagonal matrix that weighs each training data point differently. The weight computation is also discussed infra with respect to FIG. 5.

The locally (en)coded training dataset $(\tilde{X}^{(i)}, \tilde{Y}^{(i)})$ is transmitted to the master node 2112 (see e.g., operation 418 in FIG. 4), while the generator coefficients are not shared with the master node 2112 or other edge compute nodes 2101. In other words, the G and W are unknown at the master node 2112. The uncoded data (or raw data) and/or security keys are not shared with the master node 2112 or other edge compute nodes 2101 as well. In this way, the encoding mechanisms preserve the security of training data and user privacy for each edge compute node 2101. At the master node 2112, the locally (en)coded training dataset received from the edge compute nodes 2101 are combined to obtain the overall (en)coded dataset $(\tilde{X},\tilde{Y})$ (see e.g., operations 424-430 in FIG. 4). In particular, the master node 2112 may compute the complete (en)coded dataset $(\tilde{X},\tilde{Y})$ using equation 13, and compute the overall coded label set using equation 14.

$$\tilde{X} = \sum_{i=1}^{n} \tilde{X}^{(i)} = \sum_{i=1}^{n} G_iW_iX^{(i)} = GWX \quad \text{(equation 13)}$$

where, $G = [G_1, \ldots, G_n]$, and $W = \begin{bmatrix} W_1 & \cdots & 0 \\ \vdots & \ddots & \vdots \\ 0 & \cdots & W_n \end{bmatrix}$ $$\tilde{Y} = \sum_{i=1}^{n} \tilde{Y}^{(i)} = GWY \quad \text{(equation 14)}$$

The distributed encoding across the entire dataset may be achieved using equations 13 and 14. During each training epoch, each edge compute node 2101 computes a partial gradient from a subset of its locally available uncoded dataset (see e.g., operation 421 in FIG. 4). The size of the data subset is obtained from a load balancing algorithm (see e.g., load balancing algorithm of load balancer 510 of FIG. 5). In particular, a given edge compute node 2101i computes partial gradients from a number of uncoded data points $l_i^*$ that is/are available or accessible locally, where $l_i^* \leq l_i^{initial}$. The partial gradients are then sent to the master node 2112 (see e.g., operation 427 in FIG. 4).

Additionally, the master node 2112 also computes partial gradients from $\delta$ coded data points (see e.g., operation 424 in FIG. 4), which is available assuming computing power at the master node 2112 is much larger than at the edge compute nodes 2101. Therefore, in each training epoch, the master node 2112 waits for partial gradients corresponding to the first arriving (m−δ) number of uncoded data points received from one or more of the edge compute nodes 2101.

The master node 2112 also takes into account the complexity of encoding the locally accessible data points. The encoding complexity is in the order of $\delta$, where it has been observed during simulations that, at extreme heterogeneity, $\delta$ may become as large as 30% of the data size. For low complexity encoding using random linear codes, the generator matrix coefficients may be taken from equi-probable Bernoulli distribution of +1 and −1, which may help avoid multiplications during the encoding process.

Figure 5:
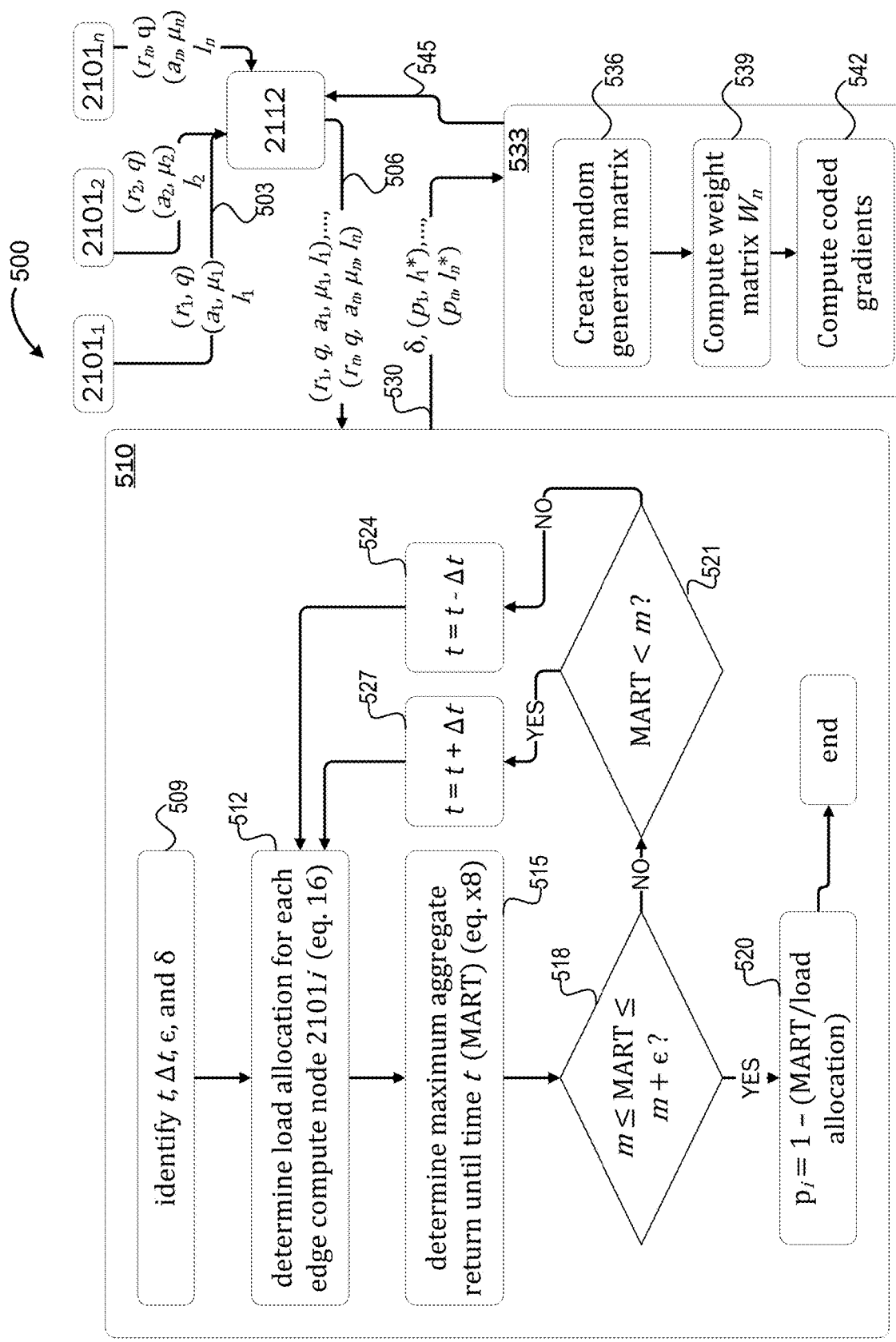

Referring now to FIG. 5, which depicts a load partitioning process 500 according to the second embodiment. Process 500 is used for computing an optimal coding redundancy $\delta$, performing load balancing or partitioning, and calculating weight matrices (see e.g., operation 409 of FIG. 4), which is eventually followed by decoding and aggregation of obtained partial gradients computed from uncoded portions of the training data with the partial gradient(s) computed from (en)coded portions of the training data (see e.g., operation 430 of FIG. 4). Process 500 begins at operation 503 where individual edge compute nodes 2101 provide operational parameters (including data parameters) to the master node 2112. In this example, the edge compute nodes 2101 provide a link/channel quality indication for their respective links 103, 107 (e.g., given as $(r_k, p_k)$, where k is a number from 1 to n), a processing capabilities indication (e.g., given as $(a_k, \mu_k)$, where k is a number from 1 to n), and a data parameter indication (e.g., given as $l_k$, where k is a number from 1 to n). These parameters are then feed into a load balancing (or data partitioning) engine 510 at operation 506. The load balancing engine 510 is operated by the master node 2112 to execute the illustrated algorithm including operations 509-527.

At operation 509, the load balancing engine 310 identifies, determines, or reads in various parameters including a fixed time t, a unit time $\Delta t$ (which may indicate a predicted processing time for an edge compute node 2101 for a given number of data points or some other suitable time value), a tolerance parameter E, and a coding redundancy S. For a fixed time t, the aggregate return received from all edge compute nodes 2101 including those computed at the master node 2112 until time t in any epoch is a random variable defined by equation 15.

$$R(t; l) = \sum_{i=1}^{n+1} R_i(t; l_i) = \sum_{i=1}^{n+1} l_i \mathbb{1}_{\{T_i \leq t\}} \quad \text{(equation 15)}$$

In equation 15, $l_{n+1}$ is the partial gradients locally computed by the master node 2112 using the coded training data (see e.g., operation 424 of FIG. 4), and the aggregate return $R_i(t; l_i)$, where i=1, . . . , n, denotes, for a load allocation l, the average number of uncoded data points that have been processed at the i-th edge compute node 2101 and corresponding partial gradient have been received by the master node 2112 until time t. During each epoch, partial gradient(s) computed from the (en)coded data is available at the master node 2101, which means $T_{n+1} < \min(T_1, \ldots, T_n)$.

At operation 512, the load balancing engine 510 determines a load allocation for each edge compute node 2101L. For each edge compute node 21011, where i=1, . . . , n, the load allocation $l_i^*(t)$ may be computed using equation 16, and the coding redundancy required for a given time t may be computed using equation 17.

$$l_i^*(t) = \arg_{l_i \leq l_i^{initial}} \max E(R_i(t, l_i)) \quad \text{(equation 16)}$$

$$l_{n+1}^*(t) = \arg_{l_{n+1} \leq \delta^{up}} \max E(R_{n+1}(t, l_{n+1})) \quad \text{(equation 17)}$$

In equation 17, $\delta^{up}$ denotes the maximum coded load the master node 2112 is willing to receive from edge compute node(s) 2101. Equation 17 maximizes the expectation of the aggregate return defined in equation 16.

At operation 515, the load balancing engine 510 determines a maximum aggregate return until time t (MART).

Based on equations 16 and 17, the maximum expected aggregate return until time t (MART) may be computed using equation 18.

$$E(R(t; l^*(t))) = \sum_{i=1}^{n+1} E(R_i(t; l_i^*(t))) \quad \text{(equation 18)}$$

At operation 518, the load balancing engine 510 determines whether the MART is greater than or equal to the number of data points m and less than or equal to a combination of the number of data points m and the tolerance parameter E. In embodiments, t* (or $\Delta t$) is obtained as the solution to the optimization problem of equation 19, where E is the tolerance parameter.

$$\min t \quad \text{(equation 19)}$$
$$\text{such that } m \leq E(R(t; l^*(t))) \leq m + \epsilon$$

If the determination at operation 518 (e.g., equation 19) is true, the load balancing engine 510 proceeds to operation 520 to set the value of the non-return probability $p_i$ based on the MART and the load partitions l*(t*) (discussed in more detail infra). Then the load balancing engine 510 proceeds to end the load balancing/partitioning algorithm, and generates the coding redundancy, the load partition information, weighting information, etc., for each edge compute node 2101. If the determination at operation 518 (e.g., equation 19) is false, the load balancing engine 510 proceeds to operation 521 to determine whether the MART is less than the number of data points m. If the determination at operation 521 is true, then the load balancing engine 510 increments the fixed time t by the unit time $\Delta t$ at operation 527. If the determination at operation 521 is false, then the load balancing engine 510 decrements the fixed time t by the unit time $\Delta t$ at operation 524. This process repeats until operation 518 (e.g., equation 19) is determined to be true, at which point, the load balancing engine 510 performs operation 520 and then ends the load balancing/partitioning algorithm, and generates the coding redundancy, load partition information, weighting information, etc., for each edge compute node 2101. Then the load balancing engine 510 provides the coding redundancy, load partition information, weighting information, etc., for each edge compute node 2101 to each edge compute node 2101 at operation 530. This information is then provided to an encoder 533 is operated by each edge compute node 2101 to execute the illustrated algorithm including operations 536-542

In this example, the near optimal load partitions l*(t*) and the minimal coding redundancy $\delta = l_{n+1}^*(t^*)$ are provided to the encoder 533 of each edge compute node 2101 with a probability $p_i$. At operation 536, the encoder 533 generates a random generator matrix $G_{\delta \times ln}$, and at operation 536, the encoder 533 generates a weight matrix $W_i$. In embodiments, the weight matrix $W_i$ applied at each edge compute node 2101 is a $l_i^{initial} \times l_i^{initial}$ diagonal matrix. The k-th diagonal coefficients is/are given by $w_{ik} = \sqrt{p_i}$, where $p_i$ is the probability that the edge compute node 2101 will not return the partial gradient associated with the $l_i^*(t^*)$ uncoded data points processed at the i-th edge compute node 2101 for k=1, . . . , $l_i^*(t^*)$. For example, the probability $p_i$ may be based on the link/channel quality and/or processing capabilities of the edge compute node 2101. In particular, $p_i = \Pr\{T_i \leq t^*\}$.

For a given load partition $l_i^*(t^*)$, the probability $p_i$ may be directly computed by the edge compute node 2101i using the statistical property of computation time and communication links. Further, there are $(1_i^{initial}-1_i^*(t^*))$ uncoded data points that are not processed at the edge compute node 2101i. The diagonal coefficients corresponding to such data points are given by $w_{ik}=1$, for $k=1, \ldots, (1_i^{initial}-1_i^*(t^*))$. In embodiments, the edge compute node 2101i can decide any subset of uncoded initial data to process locally and correspondingly apply the weights before encoding, which may provide another layer of data security and privacy.

At operation 542, the encoder 533 generates (computes) the (en)coded gradients (e.g., as $(\tilde{X}^{(i)}, \tilde{Y}^{(i)})$), which are then provided to the master node 2112 at operation 545. As alluded to previously, the encoder 533 of the edge compute node 2101i may compute its gradient $(\tilde{X}^{(i)}, \tilde{Y}^{(i)})$ as $\tilde{X}^{(i)} = G_i W_i X^{(i)}$, and $\tilde{Y}^{(i)} = G_i W_i Y^{(i)}$. In each epoch there may be a mixture of partial gradients available at the master node 2112. One set of partial gradients are computed entirely by the master node 2112 from $\delta$ (en)coded training dataset $(\tilde{X}, \tilde{Y})$ given by equations 13 and 14. In embodiments, the master node 2112 computes the partial gradient from the (en)coded dataset using equation 20.

$$\tilde{X}'(\tilde{X}\beta^{(r)}-\tilde{Y}) \quad \text{(equation 20)}$$

The other set of partial gradients are computed by the edge compute nodes 2101 on their local uncoded data at operation 542, and transmitted to the master node 2112 at operation 545. The master node 2112 only waits to receive partial gradients corresponding to the first $(m-\delta)$ datapoints. In particular, the master node 2112 waits for the first N edge compute nodes 2101 such that the allocated load satisfies $\sum_{k=1}^{N} l_k^*(t^*) \geq (m-\delta)$. The aggregated partial gradient from uncoded dataset is given by equation 21, and the master node 2112 then combines the two set of partial gradients using equation 22.

$$\sum_{k=1}^{N} X^{(k)'}\left(X^{(k)}\beta^{(r)} - y^{(k)}\right) \quad \text{(equation 21)}$$

$$\frac{1}{\delta}\tilde{X}'\left(\tilde{X}\beta^{(r)} - \tilde{y}\right) + \sum_{k=1}^{N} X^{(k)'}\left(X^{(k)}\beta^{(r)} - y^{(k)}\right) \quad \text{(equation 22)}$$

The normalized partial gradient corresponding to the coded data for sufficiently large $\delta$ can can be approximated (using weak law of large numbers) according to equation 23.

$$\frac{1}{\delta}\tilde{X}'\left(\tilde{X}\beta^{(r)} - \tilde{y}\right) = X'W'\left(\frac{1}{\delta}G'G\right)W\left(X\beta^{(r)} - y\right) \quad \text{(equation 23)}$$

$$\approx X'W'W\left(X\beta^{(r)} - y\right)$$

$$= \sum_{i=1}^{n}\sum_{k=1}^{l_i^{initial}} w_{ik}^2 X_k^{(i)'}\left(X_k^{(i)}\beta^{(r)} - y_k^{(i)}\right)$$

The above relation shows that for sufficiently large $\delta$, the aggregate gradient from the coded data points probabilistically weighs (e.g., equation 12) that provides the full gradient over the entire distributed dataset. Incorporating the partial gradients computed over the uncoded training data by the edge compute nodes 2101 along with the partial gradients computed over coded training data by the master node 2112 as presented in equation 22 can effectively be viewed as using a systematic code to encode the entire set of data, where the generator matrix is $$\begin{bmatrix} I \\ GW \end{bmatrix},$$

and performing full gradient computation on the entire coded set. The probabilistic weighing of the parity portion of the training data (e.g., $\delta$) compensates for the probability of systematic portion of the data being unavailable at the master node 2112 by time $t^*$ in each epoch. Due to the operational parameters (e.g., link delay and computing delay), each partial gradient computed from the uncoded dataset is available at time $t^*$ only with probability $(1-w_{ik}^2)$. Therefore, the weight matrix ensures, on average, that the aggregated gradients converges to the full gradient of uncoded data. Further, there is zero decoding complexity when combining the partial gradients.

A simulation was performed for the second embodiment, which included a simulation of a heterogeneous computing environment with 24 edge compute nodes 2101 and one master node 2112. The simulation used an LTE network, where each edge compute node 2101 was assigned 3 resource blocks, and the uplink and downlink channels had similar link/channel quality statistics. Furthermore, the link capacities (normalized) were generated using $\{1, kFac1, kFac1^2, \ldots, kFac1^{23}\}$ and a random permutation of the link capacities was assigned to the edge compute nodes 2101. Similarly, the processing capabilities/constraints (normalized) for the edge compute nodes 2101 were generated using $\{1, kFac2, kFac2^2, \ldots, kFac2^{23}\}$. The training dataset included $m=7200$ data points, with an equal number of points present at each edge compute node 2101, and the dimension of the model was $d=500$. Moreover, the maximum coded load that the master node 2112 was willing to process was $c^{up}=1800$. The training dataset was generated using the standard method, $y = X\beta^{true} + n$, where X and n are sampled from a standard normal distribution.

The results of the simulation compared the performance of the distributed ML scheme of the second embodiment with an uncoded scheme, where $(kFac1, kFac2) = (0.9, 0.9)$. The results of the simulation included a comparison of a least squares (LS) estimate of the true (uncoded) model, an uncoded error curve for the uncoded scheme, and a coded error curve of the distributed ML scheme of the second embodiment. Although the error in estimation of the true model $\beta$ is larger in comparison to the uncoded scheme, the overall time for convergence is much less than the uncoded scheme.

The results of the simulation also included comparing the ratio of the mean convergence times for the distributed ML scheme of the second embodiment and the uncoded scheme for different realizations of (kfac1, kfac2), where the stopping criterion for convergence of equation 24 was used:

$$\frac{\|\beta^{r+1} - \beta^r\|^2}{\|\beta^r\|^2} < 10^{-6} \quad \text{(equation 24)}$$

The simulation results show that the distributed ML scheme of the second embodiment has a superior performance in comparison to the uncoded scheme for all heterogeneity levels.

2. Example Framework, Device, and Infrastructure Implementations

Figure 6:
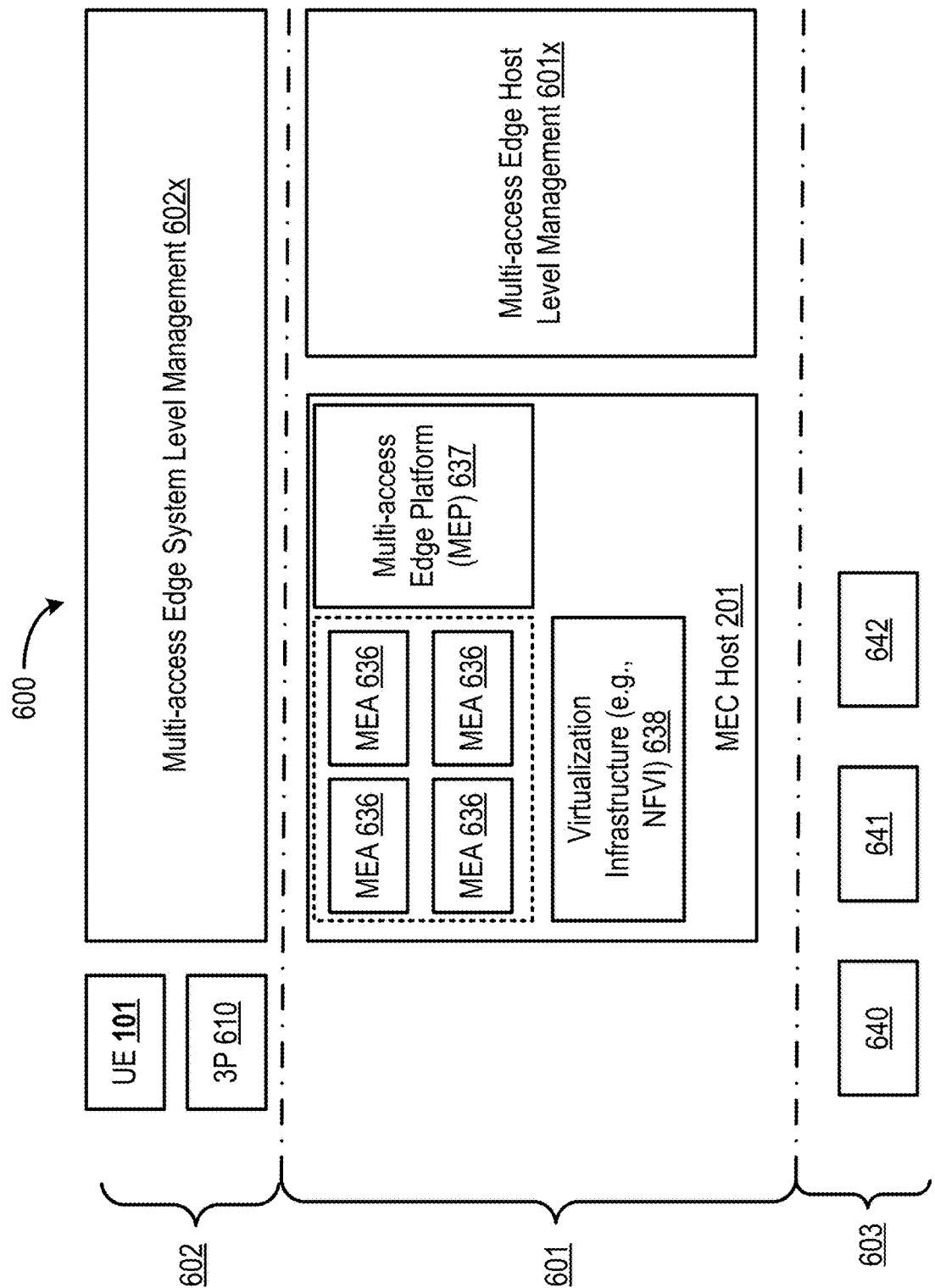
FIG. 6 depicts an example Multi-access edge Computing (MEC) framework in accordance with some embodiments.

FIG. 6 illustrates an example multi-access edge framework 600 in accordance with various embodiments. The multi-access edge framework 600 is an example structure of a MEC environment. MEC enables implementation of multi-access edge applications (ME apps) 636 as software-only entities that run on top of a Virtualization Infrastructure (VI) 638, which is located in or close to the network edge. The MEC framework 600 shows the general entities involved, and these entities can be grouped into system level 602, host level 601, and network level 603 entities.

The multi-access edge system level 602 includes multi-access edge system level management 402, UE 101 (which may be the same or similar to the other UEs or terminals discussed herein), and 3$^{rd}$ Party (3P) entities 610. The network level 603 includes various external network level entities, such as a 3GPP network 640, a local area network 641 (e.g., a LAN, WLAN, PAN, etc.), and an external network 642 (e.g., network 150). The multi-access edge host level 601 includes multi-access edge host level management 601x and MEC server 201. The multi-access edge host level management 601x may include various components that handle the management of the multi-access edge specific functionality of a particular MEP 637, MEC server 201, and the MEAs 636 to be run. The MEC server 201 includes the MEP 637, MEAs 636, and VI 638. These entities are discussed in more detail with regards to FIG. 7.

Figure 7:
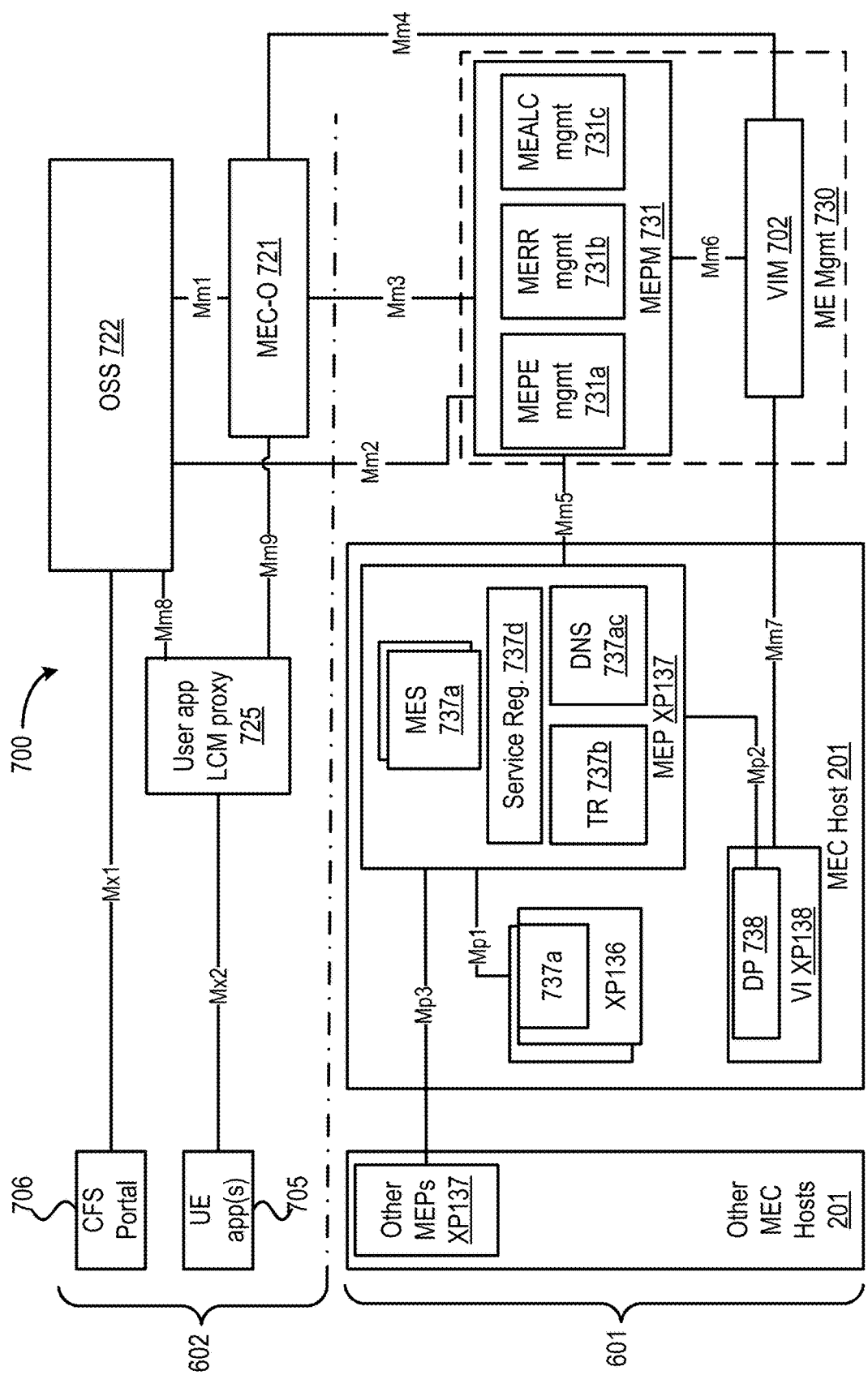
FIG. 7 depicts an example MEC system architecture according to various embodiments.

FIG. 7 illustrates an example multi-access edge system architecture 700 (or a mobile edge system architecture) in accordance with various embodiments. The MEC system 700 of FIG. 7 is a first embodiment of a system architecture of the MEC system 200 discussed previously. The MEC system 700 includes the multi-access edge host level 601 and the multi-access edge system level 602. The multi-access edge host level 601 includes MEC servers 201 and multi-access edge (ME) management (mgmt) 630, which provide functionality to run multi-access edge applications (MEAs) 636 within an operator network or a subset of an operator network.

The multi-access edge system 200 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 200 may include internet protocol (IP) based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 201 is an entity that contains an MEP 637 and VI 638 which provides compute, storage, and network resources for the purpose of running MEAs 636. The VI 638 includes a data plane (DP) 738 that executes the traffic rules (TR) 737b received by the MEP 637, and routes the traffic among applications (e.g., MEAs 636), ME services (MESs) 737a, DNS server/proxy (see e.g., via DNS handling entity 737c), 3GPP network 640, local networks 641, and external networks 642 (see e.g., FIG. 6). The MEC DP 738a may be connected with the (R)AN nodes 111 and CN 120 of FIG. 1 over interfaces 114/115, and/or may be connected with the AP 106 of FIG. 1 via a wider network 150, such as the internet, an enterprise network, or the like. The other entities depicted by FIG. 2 may be the same or similar as those discussed with regard to FIGS. 6-7.

The MEP 637 within the MEC server 201 may be a collection of essential functionality required to run MEAs 636 on a particular VI 638 and enable them to provide and consume MESs 737a. The MEP 637 can also provide various services and/or functions, such as offering an environment where the MEAs 636 can discover, advertise, consume and offer MESs 737a (discussed infra), including MESs 737a available via other platforms when supported. The MEP 637 may be able to allow authorized MEAs 636 to communicate with 3P 310 servers located in external networks. The MEP 637 may receive traffic rules from the multi-access edge platform manager (MEPM) 731, applications, or services, and instruct the data plane accordingly (see e.g., Traffic Rules Control 737b). The MEP 637 may send instructions to the DP 738 within the VI 638 via the Mp2 reference point. The Mp2 reference point between the MEP 637 and the DP 738 of the VI 638 may be used to instruct the DP 738 on how to route traffic among applications, networks, services, etc. In some implementations, the MEP 637 may translate tokens representing UEs XP01 in the traffic rules into specific internet protocol (IP) addresses. The MEP 637 also receives DNS records from the MEPM 731 and configures a DNS proxy/server accordingly. The MEP 637 hosts MESs 737a including the multi-access edge services discussed infra, and provide access to persistent storage and time of day information. Furthermore, the MEP 637 may communicate with other MEPs 637 of other MEC servers 201 via the Mp3 reference point.

The VI 638 may represent the totality of all hardware and software components which build up the environment in which MEAs 636 and/or MEP 637 are deployed, managed and executed. The VI 638 may span across several locations, and the network providing connectivity between these locations is regarded to be part of the VI 638. The physical hardware resources of the VI 638 includes computing, storage and network resources that provide processing, storage and connectivity to MEAs 636 and/or MEP 637 through a virtualization layer (e.g., a hypervisor, virtual machine monitor (VMM), or the like). The virtualization layer may abstract and/or logically partition the physical hardware resources of the MEC server 201 as a hardware abstraction layer. The virtualization layer may also enable the software that implements the MEAs 636 and/or MEP 637 to use the underlying VI 638, and may provide virtualized resources to the MEAs 636 and/or MEP 637, so that the MEAs 636 and/or MEP 637 can be executed.

The MEAs 636 may be applications that can be instantiated on a MEC server 201 within the MEC system 200 and can potentially provide or consume MESs 737a. MEAs 636 may run as virtual machines (VM) on top of the VI 638 provided by the MEC server 201, and can interact with the MEP 637 to consume and provide the MESs 737a. The MEAs 636 are instantiated on the VI 638 of the MEC server 201 based on configuration or requests validated by the ME management 730. In some embodiments, the MEAs 636 can also interact with the MEP 637 to perform certain support procedures related to the lifecycle of the MEAs 636, such as indicating availability, preparing relocation of user state, etc. The MEAs 636 may have a certain number of rules and requirements associated to them, such as required resources, maximum latency, required or useful services, etc. These requirements may be validated by the multi-access edge system level management 330, and can be assigned to default values if missing. MESs 737a may be services provided and consumed either by the MEP 637 or MEAs 636. When provided by an application, an MES 737a can be registered in a list of services 737d to the MEP 637 over the Mp1 reference point. Additionally, the MEAs 636 can subscribe to one or more services 737a for which it is authorized over the Mp1 reference point.

The MEC system 200 may support a feature called UserApps. When the MEC system 200 supports the feature UserApps, the multi-access edge management may support the instantiation of MEAs 636 on multiple MEC servers 201 following a single instantiation request, and when required by the operator in response to a request by the user. The application instance may need to fulfil a number of potential constraints predefined for the application. Once instantiated, connectivity may be established between the UE 101 and the application instance. Potential constraints may include latency, location, compute resources, storage resources, network capability, security conditions, and the like.

When the MEC system 200 supports the feature User-Apps, the system 700 may, in response to a request by a user, support the establishment of connectivity between a UE 101 and an instance of a specific MEA 636 fulfilling the requirements of the MEA 636 regarding the UE 101. If no instance of the MEA 636 fulfilling these requirements is currently running, the multi-access edge system management may create a new instance of the application on a multi-access edge host 200 that fulfils the requirements of the application. Once instantiated, connectivity shall be established between the UE 101 and the new MEA 636 instance. Requirements of the application can include latency, location, compute resources, storage resources, network capability, security conditions, and the like. When the MEC system 200 supports the feature UserApps, the system 400 may support the on-boarding of MEAs 636 during the execution of an instantiation request, may allow the establishment of connectivity between a UE 101 and a specific instance of an MEA 636, may support the capability to terminate the MEA 636 instance when no UE 101 is connected to it anymore, and may support the termination of the MEA 636 running on multiple MEC servers 201 following a single termination request.

As shown by FIG. 7, the Mp1 reference point is between the MEP 637 and the MEAs 636. The Mp1 reference point may provide service registration 737d, service discovery, and communication support for various services, such as the MESs 737a. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MESs 737a include Radio Network Information Service (RNIS), location services, and bandwidth management services. The RNIS, when available, provides authorized MEAs 636 with radio network related information, and expose appropriate up-to-date radio network information to the MEAs 636. The radio network information (RNI) may include, inter alia, radio network conditions, measurement and statistics information related to the user plane, information related to UEs served by the radio node(s) associated with the multi-access edge host (e.g., UE 101 context and radio access bearers), changes on information related to UEs served by the radio node(s) associated with the multi-access edge host, and/or the like. The RNI may be provided at the relevant granularity (e.g., per UE, per cell, per period of time).

The service consumers (e.g., MEAs 636 and MEP 637) may communicate with the RNIS over an RNI Application Programming Interface (API) to obtain contextual information from a corresponding radio access network, such as RAN 110 in FIG. 1. RNI may be provided to the service consumers via an access node (e.g., (R)AN nodes 111 or AP 106). The RNI API may support both query and subscription (e.g., a pub/sub) based mechanisms that are used over a Representational State Transfer (RESTful) API or over a message broker of the MEP 637 (not shown by FIG. 6 or 7). A MEA 636 may query information on a message broker via a transport information query procedure, wherein the transport information may be pre-provisioned to the MEA 636 via a suitable configuration mechanism. The various messages communicated via the RNI API may be in XML, JSON, Protobuf, or some other suitable format.

The RNI may be used by MEAs 636 and MEP 637 to optimize the existing services and to provide new types of services that are based on up to date information on radio conditions. As an example, a MEA 636 may use RNI to optimize current services such as video throughput guidance. In throughput guidance, a radio analytics MEA 636 may use MEC services to provide a backend video server (e.g., server(s) 130) with a near real-time indication on the throughput estimated to be available at the radio downlink interface in a next time instant. The throughput guidance radio analytics application 336 computes throughput guidance based on the required radio network information it obtains from a multi-access edge service running on the MEC server 201. RNI may be also used by the MEP 637 to optimize the mobility procedures required to support service continuity, such as when a certain MEA 636 requests a single piece of information using a simple request-response model (e.g., using RESTful mechanisms) while other MEAs 636 subscribe to multiple different notifications regarding information changes (e.g., using a pub/sub mechanism and/or message broker mechanisms).

In various embodiments, a MEC server 201 acting as a master node for distributed ML (e.g., the MEC server 201 in the example of FIG. 1) may access RNI of individual edge compute nodes 101, 201 via a MEA 636 and/or the MEP 637 using the RNI API for the purposes of evaluating the channel conditions and/or link quality for partitioning training datasets and/or for assigning computational tasks to the individual edge compute nodes 101, 201. In an example, an application implemented by a MEC entity (e.g., the MEC-O 721) may access RNI via a MEA 636 or the MEP 637 using the RNI API, which may be used to select a MEC server 201 to act as the master node for the distributed ML.

The location services (LS), when available, may provide authorized MEAs 636 with location-related information, and expose such information to the MEAs 636. With location related information, the MEP 637 or one or more MEAs 636 perform active device location tracking, location-based service recommendations, and/or other like services. The LS supports the location retrieval mechanism, i.e. the location is reported only once for each location information request. The LS supports a location subscribe mechanism, for example, the location is able to be reported multiple times for each location request, periodically or based on specific events, such as location change. The location information may include, inter alia, the location of specific UEs 101 currently served by the radio node(s) associated with the MEC server 201, information about the location of all UEs 101 currently served by the radio node(s) associated with the MEC server 201, information about the location of a certain category of UEs 101 currently served by the radio node(s) associated with the MEC server 201, a list of UEs 101 in a particular location, information about the location of all radio nodes currently associated with the MEC server 201, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 201, or a subset thereof, according to a desired deployment. In this regard, the OMA Zonal Presence API provides means for MEAs 636 to retrieve information about a zone, the access points associated to the zones and the users that are connected to the access points. In addition, the OMA Zonal Presence API, allows authorized application to subscribe to a notification mechanism, reporting about user activities within a zone. In various embodiments, a MEC server 201 acting as a master node for distributed ML (e.g., the MEC server 201 in the example of FIG. 1) may access location information or zonal presence information of individual edge compute nodes 101 using the OMA Zonal Presence API to identify the relative location or positions of the edge compute nodes 101. The location or zonal presence information may be used as a basis for selecting individual edge compute nodes 101 for offloading ML tasks, partitioning training data, specifying encoding criteria, or for determining other aspects of the embodiments discussed herein.

The bandwidth management services (BWMS) provides for the allocation of bandwidth to certain traffic routed to and from MEAs 636, and specify static/dynamic up/down bandwidth resources, including bandwidth size and bandwidth priority. MEAs 636 may use the BWMS to update/receive bandwidth information to/from the MEP 637. In some embodiments, different MEAs 636 running in parallel on the same MEC server 201 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

Figure 8:
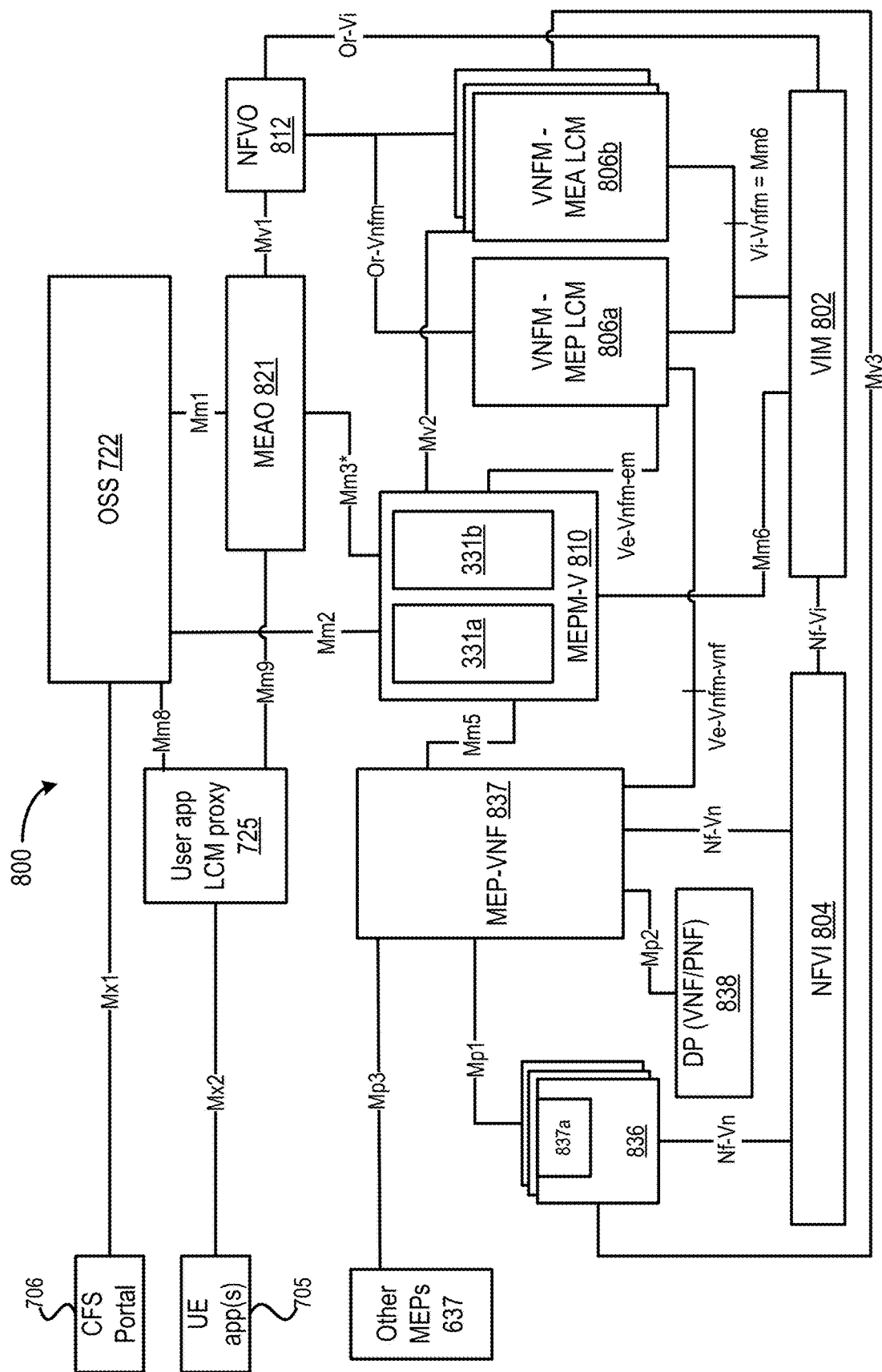
FIG. 8 depicts an example an example MEC system architecture in a Network Function Virtualization (NFV) environment according to various embodiments.

Referring back to FIG. 7, multi-access edge management comprises multi-access edge system level management and the multi-access edge host level management 330. The multi-access edge host level management 330 comprises the MEPM 731 and the VI manager (VIM) 702, and handles the management of the multi-access edge specific functionality of a particular MEC server 201 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure. An example NFV infrastructure is shown by FIG. 8.

The MEPM 731 is responsible for managing the life cycle of applications including informing the multi-access edge orchestrator (MEC-O) 721 of relevant application related events. The MEPM 731 may also provide MEP element management functions (MEPE mgmt 731a) to the MEP 637, manage MEA rules and requirements (MERR mgmt 731b) including service authorizations, traffic rules, DNS configuration and resolving conflicts, and manage MEA 636 lifecycles (MEALC mgmt 731). The multi-access edge platform manager 731 may also receive virtualized resources fault reports and performance measurements from the VIM 702 for further processing. The Mm5 reference point between the multi-access edge platform manager 731 and the MEP 637 is used to perform platform configuration, configuration of the MEPE mgmt 731a, the MERR mgmt 731b, the MEALC mgmt 731, management of application relocation, etc.

The VIM 702 may be an entity that allocates, manages and releases virtualized (compute, storage and networking) resources of the VI 638, and prepares the VI 638 to run a software image. To do so, the VIM 702 may communicate with the VI 638 over the Mm7 reference point between the VIM 702 and the VI 638. Preparing the VI 638 may include configuring the VI 638, and receiving/storing the software image. When supported, the VIM 702 may provide rapid provisioning of applications, such as described in "Openstack++ for Cloudlet Deployments", available at http://reports-archive.adm.cs.cmu.edu/anon/2015/CMU-CS-15-123.pdf. The VIM 702 may also collect and report performance and fault information about the virtualized resources, and perform application relocation when supported. For application relocation from/to external cloud environments, the VIM 702 may interact with an external cloud manager to perform the application relocation, for example using the mechanism described in "Adaptive VM Handoff Across Cloudlets", and/or possibly through a proxy. Furthermore, the VIM 702 may communicate with the multi-access edge platform manager 731 via the Mm6 reference point, which may be used to manage virtualized resources, for example, to realize the application lifecycle management. Moreover, the VIM 702 may communicate with the MEC-O 721 via the Mm4 reference point, which may be used to manage virtualized resources of the MEC server 201, and to manage application images. Managing the virtualized resources may include tracking available resource capacity, etc.

The multi-access edge system level management includes the MEC-O 721 as a core component, which has an overview of the complete MEC system 200. The MEC-O 721 may maintain an overall view of the MEC system 200 based on deployed multi-access edge hosts 200, available resources, available MESs 737a, and topology. The Mm3 reference point between the MEC-O 721 and the multi-access edge platform manager 330 may be used for the management of the application lifecycle, application rules and requirements and keeping track of available MESs 737a. The MEC-O 721 may communicate with the user application lifecycle management proxy (UALMP) 725 via the Mm9 reference point in order to manage MEAs 636 requested by UE application 705.

The MEC-O 721 may also be responsible for on-boarding of application packages, including checking the integrity and authenticity of the packages, validating application rules and requirements and if necessary adjusting them to comply with operator policies, keeping a record of on-boarded packages, and preparing the VIM(s) 702 to handle the applications. The MEC-O 721 may select appropriate MEC host(s) 200 for application instantiation based on constraints, such as latency, available resources, and available services. The MEC-O 721 may also trigger application instantiation and termination, as well as trigger application relocation as needed and when supported.

The Operations Support System (OSS) 722 refers to the OSS of an operator that receives requests via the Customer Facing Service (CFS) portal 706 (and over the Mx1 reference point) and from UE applications 705 for instantiation or termination of MEAs 636, and decides on the granting of these requests. The CFS portal 706 (and the Mx1 interface) may be used by third-parties to request the MEC system 200 to run applications 706 in the MEC system 200. Granted requests may be forwarded to the MEC-O 721 for further processing. When supported, the OSS 722 also receives requests from UE applications 705 for relocating applications between external clouds and the MEC system 200. The Mm2 reference point between the OSS 722 and the multi-access edge platform manager 330 is used for the multi-access edge platform 330 configuration, fault and performance management. The Mm1 reference point between the MEC-O 721 and the OSS 722 is used for triggering the instantiation and the termination of multi-access edge applications 336 in the MEC system 200.

The user application lifecycle management proxy ("user app LCM proxy") 725 may authorize requests from UE applications 705 in the UE 101 and interacts with the OSS 722 and the MEC-O 721 for further processing of these requests. The user app LCM proxy 725 may interact with the OSS 722 via the Mm8 reference point, and is used to handle UE applications 705 requests for running applications in the MEC system 200. A user application 705 may be an ME app 336 that is instantiated in the MEC system 200 in response to a request of a user via an application running in the UE 101 (e.g., UE application 705). The user app LCM proxy 725 allows UE applications 705 to request on-boarding, instantiation, termination of user applications and when supported, relocation of user applications in and out of the MEC system 200. It also allows informing the UE applications 705 about the state of the user applications 705. The user app LCM proxy 725 is only accessible from within the mobile network, and may only be available when supported by the MEC system 200. A UE application 705 may use the Mx2 reference point between the user app LCM proxy 725 and the UE application 705 to request the MEC system 200 to run an application in the MEC system 200, or to move an application in or out of the MEC system 200. The Mx2 reference point may only be accessible within the mobile network and may only be available when supported by the multi-access edge system.

In order to run an MEA 636 in the MEC system 700, the MEC-O 721 receives requests triggered by the OSS 722, a third-party 310, or a UE application 705. In response to receipt of such requests, the MEC-O 721 selects a MEC server 201 to host the MEA 636 for computational offloading. These requests may include information about the application to be run, and possibly other information, such as the location where the application needs to be active, other application rules and requirements, as well as the location of the application image if it is not yet on-boarded in the MEC system 700.

In various embodiments, the MEC-O 721 selects one or more MEC servers 201 for computational intensive tasks of an ML model β, such as the code redundancy, load partitioning, and gradient computations discussed previously. The selected one or more MEC servers 201 may offload computational tasks of the ML model β (e.g., which may be considered UE application 705) based on various operational parameters, such as network capabilities and conditions, computational capabilities and conditions, application requirements, and/or other like operational parameters, such as those discussed herein. The application requirements may be rules and requirements associated to/with one or more MEAs 636, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEAs 636 to be able to run; multi-access edge services that the MEAs 636 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's multi-access edge system deployment or mobile network deployment (e.g., topology, cost); requirements on access to user traffic; requirements on persistent storage; traffic rules; DNS rules, etc.

The MEC-O 721 considers the requirements and information listed above and information on the resources currently available in the MEC system 200 to select one or several MEC servers 201 within the MEC system 200 to host MEAs 636 and/or for computational offloading. After one or more MEC servers 201 are selected, the MEC-O 721 requests the selected MEC host(s) 200 to instantiate the application(s) or application tasks, such as tasks of the ML model β. The actual algorithm used to select the MEC servers 201 depends on the implementation, configuration, and/or operator deployment. In various embodiments, the selection algorithm may be based on the task offloading embodiments discussed herein, for example, by taking into account network, computational, and energy consumption requirements for performing tasks of the ML model β (e.g., application tasks) as well as network functionalities, processing, and offloading coding/encodings, or differentiating traffic between various RATs. Under certain circumstances (e.g., UE mobility events resulting in increased latency, load balancing decisions, etc.), and if supported, the MEC-O 721 may decide to select one or more new MEC servers 201 to act as a master node 2112, and initiates the transfer of an application instance or application-related state information from the one or more source MEC servers 201 to the one or more target MEC servers 201.

FIG. 8 illustrates an example multi-access edge system architecture 800 (or a multi-access edge system architecture) in accordance with various embodiments. MEC system 800 of FIG. 8 is a second embodiment of a system architecture of the MEC system 200 discussed previously. Like numbered elements in FIG. 8 are the same as discussed previously with respect to FIGS. 6-7. The MEC system 800 includes architectures and infrastructures that are used to virtualize one or more network functions (NFs) onto physical resources comprising a combination of industry-standard server hardware, storage hardware, or switches, or alternatively comprising proprietary hardware. Typically, mobile network operators virtualize their NFs using Network Functions Virtualization (NFV), and use virtualization infrastructure (VI) to consolidate various network elements, which are referred to as Virtualized Network Functions (VNFs). In other words, NFV can be used to execute virtual or reconfigurable implementations of one or more components/functions of a CN 120. As mentioned previously, the MEC system 200 (or individual MEC servers 201) may include VI to consolidate and virtualize various MEC components and MEC applications on top of the VI. In this regard, the system 800 is an architecture where MEC elements are deployed in an NFV environment, which may provide maximum utilization of the underlying VI. In particular, the system 800 is a MEC architecture that is deployed in NFV environments, wherein the MEP 637 is deployed as a VNF, the MEAs 636 appear as VNFs towards the NFV MANO components (MEAs 636 with specific NFV functionality are referred to as an "MEA-VNFs 836" or the like), and the VI 638 is deployed as an NFVI 804 and its virtualized resources are managed by a VIM 802.

In addition to elements discussed previously with respect to FIG. 7, the system 800 is illustrated as including a virtualized infrastructure manager (VIM) 802, a network function virtualization infrastructure (NFVI) 804, a VNF manager (VNFM) 806, virtualized network functions (VNFs) including, inter alia, MEPVNF 837 and MEA-VNFs 836, a MEC Edge Platform Manager-NFV (MEPM-V) 810, and an NFV Orchestrator (NFVO) 812. In embodiments, the MEP 637 is realized as a VNF (e.g., MEP-VNF 837 in FIG. 8) and is managed according to typical NFV procedures. In these embodiments, the MEPM 731 is transformed into the Multi-access Edge Platform Manager-NFV (MEPM-V) 810, where the MEPM-V 810 acts as an Element Manager (EM) of the MEP-VNF 837. The MEPM-V 810 delegates Life Cycle Management (LCM) parts/tasks to one or more VNFM(s) 806, including VNFM-MEP LCM 806A and VNFM-MEA LCM 806B. In particular, the VNFM 806 is used to perform LCM of the MEP-VNF including LCM of the MEP 637 performed by the VNFM-MEP LCM 806A and LCM of the MEAs 636 performed by the VNFM-MEA LCM 806B.

Additionally, the MEC-O 721 is transformed into a Multi-access Edge Application Orchestrator" (MEAO) 821 that uses the NFVO 812 for resource orchestration, and for orchestration of the set of MEA-VNFs as one or more NFV Network Services (NSs). The MEA-VNFs 836 are managed like individual VNFs, where certain orchestration and Life Cycle Management (LCM) tasks are delegated to the NFVO 812 and VNFM 806a,b functional blocks. In some embodiments, the MEP-VNF 837, the MEPM-V 810, and VNFM-MEA LCM 806B may be deployed as a single package or ensemble. In other embodiments, the VNFM-MEP LCM 806A and VNFM-MEA LCM 806B are part of a generic VNFM 806, and the MEP-VNF 837 and the MEPM-V 810 are provided by a single vendor.

The VIM 802 manages the resources of the NFVI 804. The NFVI 804 includes physical or virtual resources and applications (including hypervisors) used to execute the system 800. The VIM 802 manages the life cycle of virtual resources with the NFVI 804 (e.g., creation, maintenance, and tear down of virtual machines (VMs) associated with one or more physical resources); tracks VM instances; tracks performance, fault, and security of VM instances and associated physical resources; and exposes VM instances and associated physical resources to other management systems. The NFVO 812 coordinates, authorizes, releases, and engages resources of the NFVI 804 in order to provide requested services (e.g., to execute a core network function, component, or slice).

The VNFM 806 manages VNFs used to execute core network 120 components/functions. The VNFM 806 manages the life cycle of the VNFs and tracks performance, fault, and security of the virtual aspects of VNFs. The MEPM-V 810 tracks the performance, fault and security of the functional aspects of VNFs. The tracking data from the VNFM 806 and the MEPM-V 810 may comprise, for example, performance measurement (PM) data used by the VIM 802 or the NFVI 804. Both the VNFM 806 and the MEPM-V 810 can scale up/down the quantity of VNFs of the system 800.

The Mm3* reference point between MEAO 821 and the MEPM-V 810 is based on the Mm3 reference point discussed previously. The Mm3* reference point in this embodiment may be altered to account for the split between MEPM-V 810 and VNFM-MEA LCMs 806B. In addition to the reference points discussed previously with respect to FIG. 7, system 800 includes the reference points Mv1, Mv2 and Mv3 between elements of the MEC architecture and NFV architectures to support the management of MEA-VNFs 836 and respective MEC services 837a. The Mv1 reference point connects the MEAO 821 and the NFVO 812 and is the same or similar to the Os-Ma-nfvo reference point in NFV architectures. The Mv2 reference point connects the VNFM-MEA LCM 806B with the MEPM-V 810 to allow LCM related notifications to be exchanged between these entities. The Mv2 reference point is the same or similar to the Ve-Vnfm-em reference point in NFV architectures. The Mv3 reference point connects the VNFM-MEA LCM 806B with MEA-VNF 836 instance(s) to allow the exchange of messages related to, for example, MEA LCM or initial deployment-specific configurations. The Mv3 reference point is the same or similar to the Ve-Vnfm-vnf reference point in NFV architectures.

Furthermore, the following reference points are used as they are defined for NFV architectures: The Nf-Vn reference point that connects each MEA-VNF 836 with the NFVI 804; the Nf-Vi reference point that connects the NFVI 804 and the VIM 802; the Os-Ma-nfvo reference point that connects the OSS 722 and the NFVO 812, which is primarily used to manage NSs (e.g., a number of VNFs connected and orchestrated to deliver a service); the Or-Vnfm reference point that connects the NFVO 812 and the VNFM 806a,b, which is primarily used for the NFVO 812 to invoke VNF LCM operations; the Vi-Vnfm reference point that connects the VIM 802 and the VNFM 806a,b, which is primarily used by the VNFM 806a,b to invoke resource management operations to manage cloud resources that are needed by the VNF 837 and/or data plane (DP)-VNF 838 (where Vi-Vnfm reference point corresponds to the Mm6 reference point discussed previously); the Or-Vi reference point that connects the NFVO 812 and the VIM 802, which is primarily used by the NFVO 812 to manage cloud resources capacity; the Ve-Vnfm-em reference point that connects the VNFM 806a,b that manages the lifecycle of the MEP 637 with the MEPM-V 810; the Ve-Vnfm-vnf reference point that connects the VNFM 806a,b that manages the lifecycle of the MEP 637 with the MEP-VNF 837; the Nf-Vn reference point that connects the MEP-VNF 837 and the NFVI 804; the Nf-Vi reference point that connects the NFVI 804 and the VIM 802; the Os-Ma-nfvo reference point that connects the OSS 722 and the NFVO 812, which is primarily used to manage NSs, for example, a number of VNFs connected and orchestrated to deliver a service; the Or-Vnfm reference point that connects the NFVO 812 and the VNFM 806a,b that manages the lifecycle of the ME platform, which is primarily used for the NFVO 812 to invoke VNF LCM operations; the Vi-Vnfm reference point that connects the VIM 802 and the VNFM 806a,b that manages the lifecycle of the MEP 637, which is primarily used by the VNFM 806a,b to invoke resource management operations to manage the cloud resources that are needed by the VNF; and the Or-Vi reference point that connects the NFVO 812 and the VIM 802. It is primarily used by the NFVO 812 to manage cloud resources capacity.

When MEC is deployed in a NFV environment, the data plane (DP) 838 may be implemented as a Physical Network Function (PNF) (e.g., as DP-PNF 838), a VNF (e.g., as DP-VNF 838), or combination thereof. When implemented as a DP-PNF 838, the DP is connected to the NS that contains the MEA-VNFs 836, and the Mp2 reference point is kept as a MEC-internal reference point also in the NFV-based deployment of MEC. In another embodiment, for performance enhancements, the Service Function Chaining (SFC) functionality provided by the underlying NFVI 804 may be reused for traffic routing. In such a deployment, the DP 838 and the Mp2 reference point are omitted from the system 800. The SFC functionality in the NFVI 804 is configured by the NFVO 812 in the VIM 802 based on the NFP of the NFV NS, using the Or-Vi reference point. In these embodiments, the MEAO 821 translates the traffic rules into an NFP and sends it to the NFVO 812. The MEP 837 may not control the traffic redirection directly via the Mp2 reference point, but instead may pass requests to activate/deactivate/update traffic rules to the MEPM-V 810, which will then be forwarded to the MEAO 821. When receiving such a request, the MEAO 821 may request the NFVO 812 to update the NFP accordingly. Furthermore, although not shown by FIG. 8, the system 800 may also include a network manager (NM). The NM may provide a package of end-user functions with the responsibility for the management of a network, which may include network elements with VNFs, non-virtualized network functions, or both (e.g., management of the VNFs may occur via the MEPM-V 810).

Figure 9:
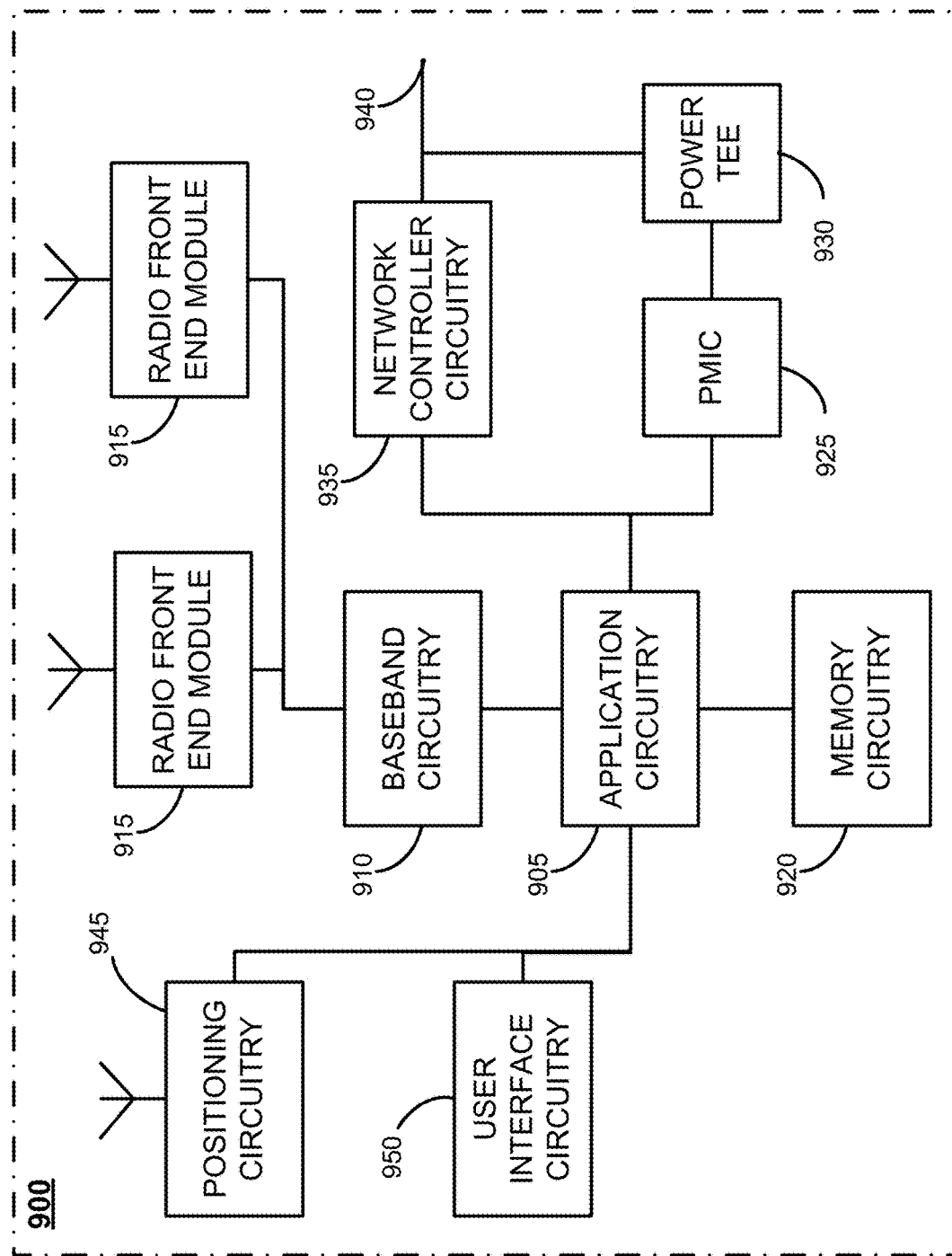
FIG. 9 depicts an example of infrastructure equipment according to various embodiments.

FIG. 9 illustrates an example of infrastructure equipment 900 in accordance with various embodiments. The infrastructure equipment 900 (or "system 900") may be implemented as a base station, radio head, access network node (e.g., the (R)AN nodes 111 and/or AP 106 shown and described previously), MEC servers 201, server(s) 130, and/or any other element/device discussed herein. In other examples, the system 900 could be implemented in or by a UE.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, positioning circuitry 945, and user interface 950. In some embodiments, the device 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge compute nodes 2101 and/or master node 2112 of FIGS. 2-5 (e.g., load balancing engine 310, load balancing engine 510, encoder 533, or other like subsystems/components) are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 905 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 910 may be implemented, for example, as a solder-down substrate including one or more integrated circuits, a single packaged integrated circuit soldered to a main circuit board or a multi-chip module containing two or more integrated circuits. The baseband circuitry 910 includes one or more processing devices (e.g., baseband processors) to carry out various protocol and radio control functions. Baseband circuitry 910 may interface with application circuitry of system 900 for generation and processing of baseband signals and for controlling operations of the RFEMs 915. The baseband circuitry 910 may handle various radio control functions that enable communication with one or more radio networks via the RFEMs 915. The baseband circuitry 910 may include circuitry such as, but not limited to, one or more single-core or multi-core processors (e.g., one or more baseband processors) or control logic to process baseband signals received from a receive signal path of the RFEMs 915, and to generate baseband signals to be provided to the RFEMs 915 via a transmit signal path. In various embodiments, the baseband circuitry 910 may implement a real-time OS (RTOS) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 9, in one embodiment, the baseband circuitry 910 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the RFEMs 915 are cellular radiofrequency communication system, such as millimeter wave (mmWave) communication circuitry or some other suitable cellular communication circuitry. In the first example, the protocol processing circuitry would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the RFEMs 915 are WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 910 and/or RFEMs 915. The baseband circuitry 910 may also support radio communications for more than one wireless protocol.

Continuing with the aforementioned embodiment, the baseband circuitry 910 includes individual processing device(s) to implement PHY including hybrid automatic repeat request (HARQ) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 915, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards. The memory circuitry 920 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 900, an operating system of infrastructure equipment 900, one or more applications, and/or for carrying out the embodiments discussed herein (such as one or more operations of depicted by FIGS. 2-5 and/or the like). The computational logic may be stored or loaded into memory circuitry 920 as instructions for execution by the processors of the application circuitry 905 to provide or perform the functions described herein. The various elements may be implemented by assembler instructions supported by processors of the application circuitry 905 or high-level languages that may be compiled into such instructions. The permanent copy of the programming instructions may be placed into persistent storage devices of memory circuitry 920 in the factory during manufacture, or in the field through, for example, a distribution medium (not shown), through a communication interface (e.g., from a distribution server), and/or over-the-air (OTA).

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols. In various embodiments, the network controller circuitry 935 enables communication with associated equipment and/or with a backend system (e.g., server(s) 130 of FIG. 1), which may take place via a suitable gateway device.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various other infrastructure equipment, or the like.

The components shown by FIG. 9 may communicate with one another using interface circuitry, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 10:
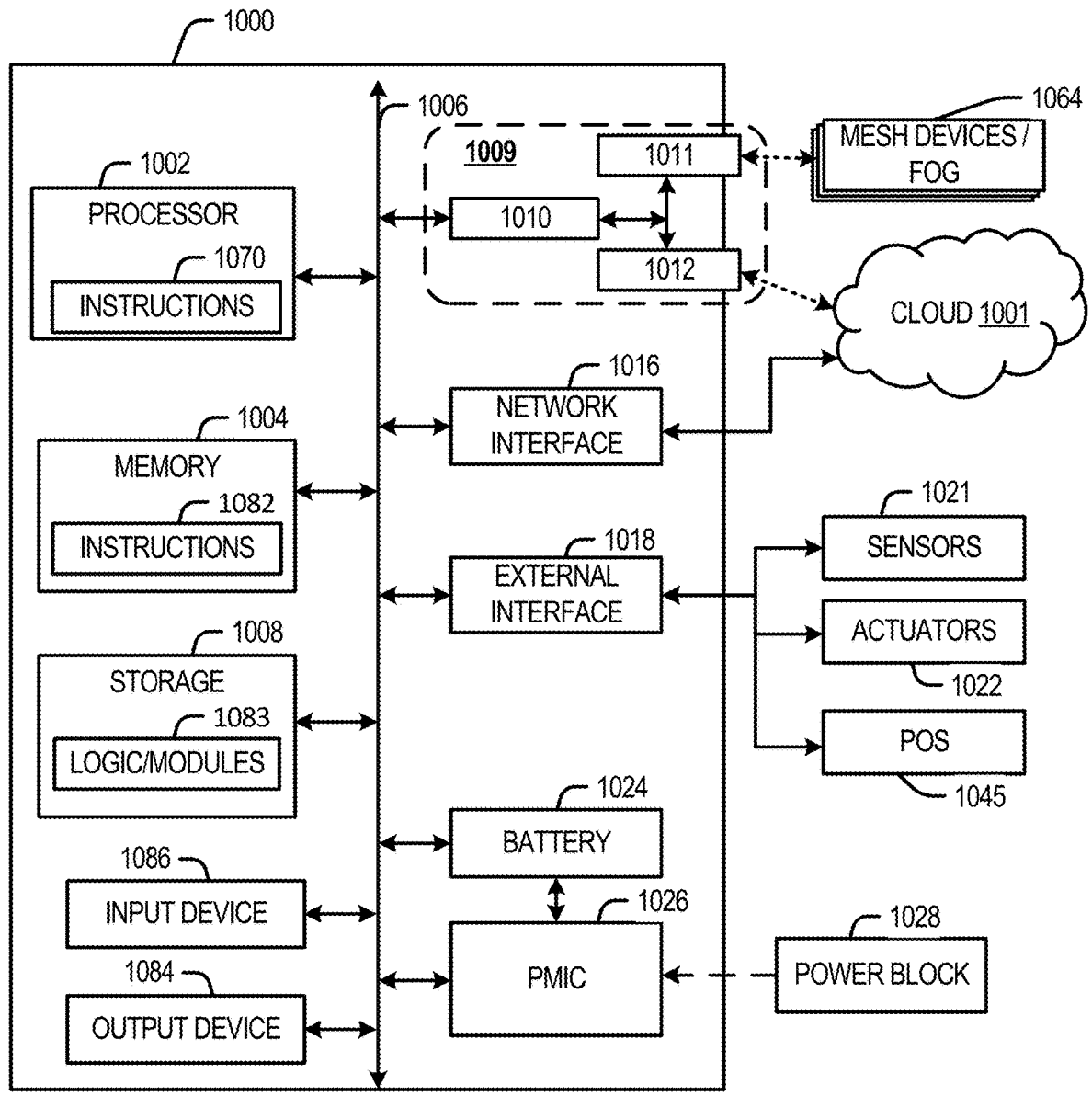
FIG. 10 depicts an example of a computer platform according to various embodiments.

FIG. 10 illustrates an example of an platform 1000 (also referred to as "system 1000," "device 1000," "appliance 1000," or the like) in accordance with various embodiments. In embodiments, the platform 1000 may be suitable for use as UEs 101, edge compute nodes 2101, data collector nodes 2102, IoT devices 1204-1504 of FIGS. 12-15, and/or any other element/device discussed herein with regard to FIGS. 1-15. Platform 1000 may also be implemented in or as a server computer system or some other element, device, or system discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The example of FIG. 10 is intended to show a high level view of components of the computer platform 1000. However, some of the components shown may be omitted, additional components may be present, and different arrangement of the components shown may occur in other implementations.

The platform 1000 includes processor circuitry 1002. The processor circuitry 1002 includes circuitry such as, but not limited to one or more processor cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1002 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1002 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1002 may be coupled with or may include memory/storage and may be configured to execute instructions stored in the memory/storage to enable various applications or operating systems to run on the platform 1000. In these embodiments, the processors (or cores) of the processor circuitry 1002 is configured to operate application software to provide a specific service to a user of the platform 1000. In some embodiments, the processor circuitry 1002 may be a special-purpose processor/controller to operate according to the various embodiments herein.

As examples, the processor circuitry 1002 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, California. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1002 may be a part of a system on a chip (SoC), System-in-Package (SiP), a multi-chip package (MCP), and/or the like, in which the processor circuitry 1002 and other components are formed into a single integrated circuit, or a single package, such as the Edison™ or Galileo™ SoC boards from Intel® Corporation. Other examples of the processor circuitry 1002 are mentioned elsewhere in the present disclosure.

Additionally or alternatively, processor circuitry 1002 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1002 may comprise logic blocks or logic fabric including and other interconnected resources that may be programmed to perform various functions, such as the procedures, methods, functions, etc. of the various embodiments discussed herein. In such embodiments, the circuitry of processor circuitry 1002 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1002 may communicate with system memory circuitry 1004 over an interconnect 1006 (e.g., a bus). Any number of memory devices may be used to provide for a given amount of system memory. As examples, the memory circuitry 1004 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1004 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1004 may also comprise persistent storage devices, which may be temporal and/or persistent storage of any type, including, but not limited to, non-volatile memory, optical, magnetic, and/or solid state mass storage, and so forth.

The individual memory devices of memory circuitry 1004 may be implemented as one or more of solder down packaged integrated circuits, socketed memory modules, and plug-in memory cards. The memory circuitry 1004 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1004. In embodiments, the memory circuitry 1004 may be disposed in or on a same die or package as the processor circuitry 1002 (e.g., a same SoC, a same SiP, or soldered on a same MCP as the processor circuitry 1002).

To provide for persistent storage of information such as data, applications, operating systems (OS), and so forth, a storage circuitry 1008 may also couple to the processor circuitry 1002 via the interconnect 1006. In an example, the storage circuitry 1008 may be implemented via a solid-state disk drive (SSDD). Other devices that may be used for the storage circuitry 1008 include flash memory cards, such as SD cards, microSD cards, xD picture cards, and the like, and USB flash drives. In low power implementations, the storage circuitry 1008 may be on-die memory or registers associated with the processor circuitry 1002. However, in some examples, the storage circuitry 1008 may be implemented using a micro hard disk drive (HDD). Further, any number of new technologies may be used for the storage circuitry 1008 in addition to, or instead of, the technologies described, such resistance change memories, phase change memories, holographic memories, or chemical memories, among others.

The storage circuitry 1008 store computational logic 1083 (or "modules 1083") in the form of software, firmware, or hardware commands to implement the techniques described herein. The computational logic 1083 may be employed to store working copies and/or permanent copies of computer programs, or data to create the computer programs, for the operation of various components of platform 1000 (e.g., drivers, etc.), an operating system of platform 1000, one or more applications, and/or for carrying out the embodiments discussed herein. The computational logic 1083 may be stored or loaded into memory circuitry 1004 as instructions 1082, or data to create the instructions 1082, for execution by the processor circuitry 1002 to provide the functions described herein. The various elements may be implemented by assembler instructions supported by processor circuitry 1002 or high-level languages that may be compiled into such instructions (e.g., instructions 1070, or data to create the instructions 1070). The permanent copy of the programming instructions may be placed into persistent storage devices of storage circuitry 1008 in the factory or in the field through, for example, a distribution medium (not shown), through a communication interface (e.g., from a distribution server (not shown)), or over-the-air (OTA).

In an example, the instructions 1082 provided via the memory circuitry 1004 and/or the storage circuitry 1008 of FIG. 10 are embodied as one or more non-transitory computer readable storage media (see e.g., NTCRSM 1102 of FIG. 11) including program code, a computer program product or data to create the computer program, with the computer program or data, to direct the processor circuitry 1002 of platform 1000 to perform electronic operations in the platform 1000, and/or to perform a specific sequence or flow of actions, for example, as described with respect to the flowchart(s) and block diagram(s) of operations and functionality depicted previously (see e.g., FIGS. 2-5). The processor circuitry 1002 accesses the one or more non-transitory computer readable storage media over the interconnect 1006.

Although the instructions 1082 are shown as code blocks included in the memory circuitry 1004 and the computational logic 1083 is shown as code blocks in the storage circuitry 1008, it should be understood that any of the code blocks may be replaced with hardwired circuits, for example, built into an FPGA, ASIC, or some other suitable circuitry. For example, where processor circuitry 1002 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1004 and/or storage circuitry 1008 may store program code of an operating system (OS), which may be a general purpose OS or an OS specifically written for and tailored to the computing platform 1000. For example, the OS may be Unix or a Unix-like OS such as Linux e.g., provided by Red Hat Enterprise, Windows 10™ provided by Microsoft Corp., macOS provided by Apple Inc.®, or the like. In another example, the OS may be a mobile OS, such as Android® provided by Google Inc.®, iOS© provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "p C/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1000, attached to the platform 1000, or otherwise communicatively coupled with the platform 1000. The drivers may include individual drivers allowing other components of the platform 1000 to interact or control various input/output (I/O) devices that may be present within, or connected to, the platform 1000. For example, the drivers may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, actuator drivers to obtain actuator positions of the actuators 1022 and/or control and allow access to the actuators 1022, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the platform 1000 (not shown).

The components may communicate over the interconnect 1006. The interconnect 1006 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1006 may be a proprietary bus, for example, used in a SoC based system. Other bus systems may be included, such as an I²C interface, an SPI interface, point-to-point interfaces, and a power bus, among others.

The interconnect 1006 couples the processor circuitry 1002 to the communication circuitry 1009 for communications with other devices. The communication circuitry 1009 is a hardware element, or collection of hardware elements, used to communicate over one or more networks (e.g., cloud 1001) and/or with other devices (e.g., mesh devices/fog 1064). The communication circuitry 1009 includes baseband circuitry 1010 (or "modem 1010") and radiofrequency (RF) circuitry 1011 and 1012.

The baseband circuitry 1010 includes one or more processing devices (e.g., baseband processors) to carry out various protocol and radio control functions. Baseband circuitry 1010 may interface with application circuitry of platform 1000 (e.g., a combination of processor circuitry 1002, memory circuitry 1004, and/or storage circuitry 1008) for generation and processing of baseband signals and for controlling operations of the RF circuitry 1011 or 1012. The baseband circuitry 1010 may handle various radio control functions that enable communication with one or more radio networks via the RF circuitry 1011 or 1012. The baseband circuitry 1010 may include circuitry such as, but not limited to, one or more single-core or multi-core processors (e.g., one or more baseband processors) or control logic to process baseband signals received from a receive signal path of the RF circuitry 1011 and/or 1012, and to generate baseband signals to be provided to the RF circuitry 1011 or 1012 via a transmit signal path. In various embodiments, the baseband circuitry 1010 may implement a real-time OS (RTOS) to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 10, in one embodiment, the baseband circuitry 1010 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the communication circuitry 1009 is a cellular radiofrequency communication system, such as millimeter wave (mmWave) communication circuitry or some other suitable cellular communication circuitry. In the first example, the protocol processing circuitry 1005 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 1009 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1010 and/or RF circuitry 1011 and 1012. The baseband circuitry 1010 may also support radio communications for more than one wireless protocol.

Continuing with the aforementioned embodiment, the baseband circuitry 1010 includes individual processing device(s) to implement PHY including hybrid automatic repeat request (HARQ) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1009 also includes RF circuitry 1011 and 1012 to enable communication with wireless networks using modulated electromagnetic radiation through a non-solid medium. Each of the RF circuitry 1011 and 1012 include a receive signal path, which may include circuitry to convert analog RF signals (e.g., an existing or received modulated waveform) into digital baseband signals to be provided to the baseband circuitry 1010. Each of the RF circuitry 1011 and 1012 also include a transmit signal path, which may include circuitry configured to convert digital baseband signals provided by the baseband circuitry 1010 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1011 or 1012 using metal transmission lines or the like.

The RF circuitry 1011 (also referred to as a "mesh transceiver") is used for communications with other mesh or fog devices 1064. The mesh transceiver 1011 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1011, configured for a particular wireless communication protocol, may be used for the connections to the mesh devices 1064. For example, a WLAN unit may be used to implement Wi-Fi™ communications in accordance with the IEEE 802.11 standard. In addition, wireless wide area communications, for example, according to a cellular or other wireless wide area protocol, may occur via a WWAN unit.

The mesh transceiver 1011 may communicate using multiple standards or radios for communications at different ranges. For example, the platform 1000 may communicate with close/proximate devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1012 (also referred to as a "wireless network transceiver," a "cloud transceiver," or the like) may be included to communicate with devices or services in the cloud 1001 via local or wide area network protocols. The wireless network transceiver 1012 includes one or more radios to communicate with devices in the cloud 1001. The cloud 1001 may be the same or similar to cloud 302 discussed previously. The wireless network transceiver 1012 may be a LPWA transceiver that follows the IEEE 802.15.4, or IEEE 802.15.4g standards, among others, such as those discussed herein. The platform 1000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1011 and wireless network transceiver 1012, as described herein. For example, the radio transceivers 1011 and 1012 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 1011 and 1012 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 1011, 1012 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 1016 may be included to provide wired communication to the cloud 1001 or to other devices, such as the mesh devices 1064 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1000 via NIC 1016 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1016 may include one or more dedicated processors and/or FPGAs to communicate using one or more of the aforementioned network interface protocols. In some implementations, the NIC 1016 may include multiple controllers to provide connectivity to other networks using the same or different protocols. For example, the platform 1000 may include a first NIC 1016 providing communications to the cloud over Ethernet and a second NIC 1016 providing communications to other devices over another type of network.

The interconnect 1006 may couple the processor circuitry 1002 to an external interface 1018 (also referred to as "I/O interface circuitry" or the like) that is used to connect external devices or subsystems. The external devices include, inter alia, sensor circuitry 1021, actuators 1022, and positioning circuitry 1045. The sensor circuitry 1021 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1018 connects the platform 1000 to actuators 1022, allow platform 1000 to change its state, position, and/or orientation, or move or control a mechanism or system. The actuators 1022 comprise electrical and/or mechanical devices for moving or controlling a mechanism or system, and converts energy (e.g., electric current or moving air and/or liquid) into some kind of motion. The actuators 1022 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1022 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 1022 based on one or more captured events and/or instructions or control signals received from a service provider and/or various client systems.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the communication circuitry 1009 to communicate with the nodes and components of the positioning network. The positioning circuitry 1045 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 1000, which are referred to as input device circuitry 1086 and output device circuitry 1084 in FIG. 10. The input device circuitry 1086 and output device circuitry 1084 include one or more user interfaces designed to enable user interaction with the platform 1000 and/or peripheral component interfaces designed to enable peripheral component interaction with the platform 1000. Input device circuitry 1086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1084 may be included to show information or otherwise convey information, such as sensor readings, actuator position(s), or other like information. Data and/or graphics may be displayed on one or more user interface components of the output device circuitry 1084. Output device circuitry 1084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1000. The output device circuitry 1084 may also include speakers or other audio emitting devices, printer(s), and/or the like. In some embodiments, the sensor circuitry 1021 may be used as the input device circuitry 1086 (e.g., an image capture device, motion capture device, or the like) and one or more actuators 1022 may be used as the output device circuitry 1084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1024 may be coupled to the platform 1000 to power the platform 1000, which may be used in embodiments where the platform 1000 is not in a fixed location. The battery 1024 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1000 is mounted in a fixed location, the platform 1000 may have a power supply coupled to an electrical grid. In these embodiments, the platform 1000 may include power tee circuitry to provide for electrical power drawn from a network cable to provide both power supply and data connectivity to the platform 1000 using a single cable.

Power management integrated circuitry (PMIC) 1026 may be included in the platform 1000 to track the state of charge (SoCh) of the battery 1024, and to control charging of the platform 1000. The PMIC 1026 may be used to monitor other parameters of the battery 1024 to provide failure predictions, such as the state of health (SoH) and the state of function (SoF) of the battery 1024. The PMIC 1026 may include voltage regulators, surge protectors, power alarm detection circuitry. The power alarm detection circuitry may detect one or more of brown out (under-voltage) and surge (over-voltage) conditions. The PMIC 1026 may communicate the information on the battery 1024 to the processor circuitry 1002 over the interconnect 1006. The PMIC 1026 may also include an analog-to-digital (ADC) convertor that allows the processor circuitry 1002 to directly monitor the voltage of the battery 1024 or the current flow from the battery 1024. The battery parameters may be used to determine actions that the platform 1000 may perform, such as transmission frequency, mesh network operation, sensing frequency, and the like. As an example, the PMIC 1026 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX.

A power block 1028, or other power supply coupled to a grid, may be coupled with the PMIC 1026 to charge the battery 1024. In some examples, the power block 1028 may be replaced with a wireless power receiver to obtain the power wirelessly, for example, through a loop antenna in the platform 1000. A wireless battery charging circuit, such as an LTC4020 chip from Linear Technologies of Milpitas, California, among others, may be included in the PMIC 1026. The specific charging circuits chosen depend on the size of the battery 1024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 11:
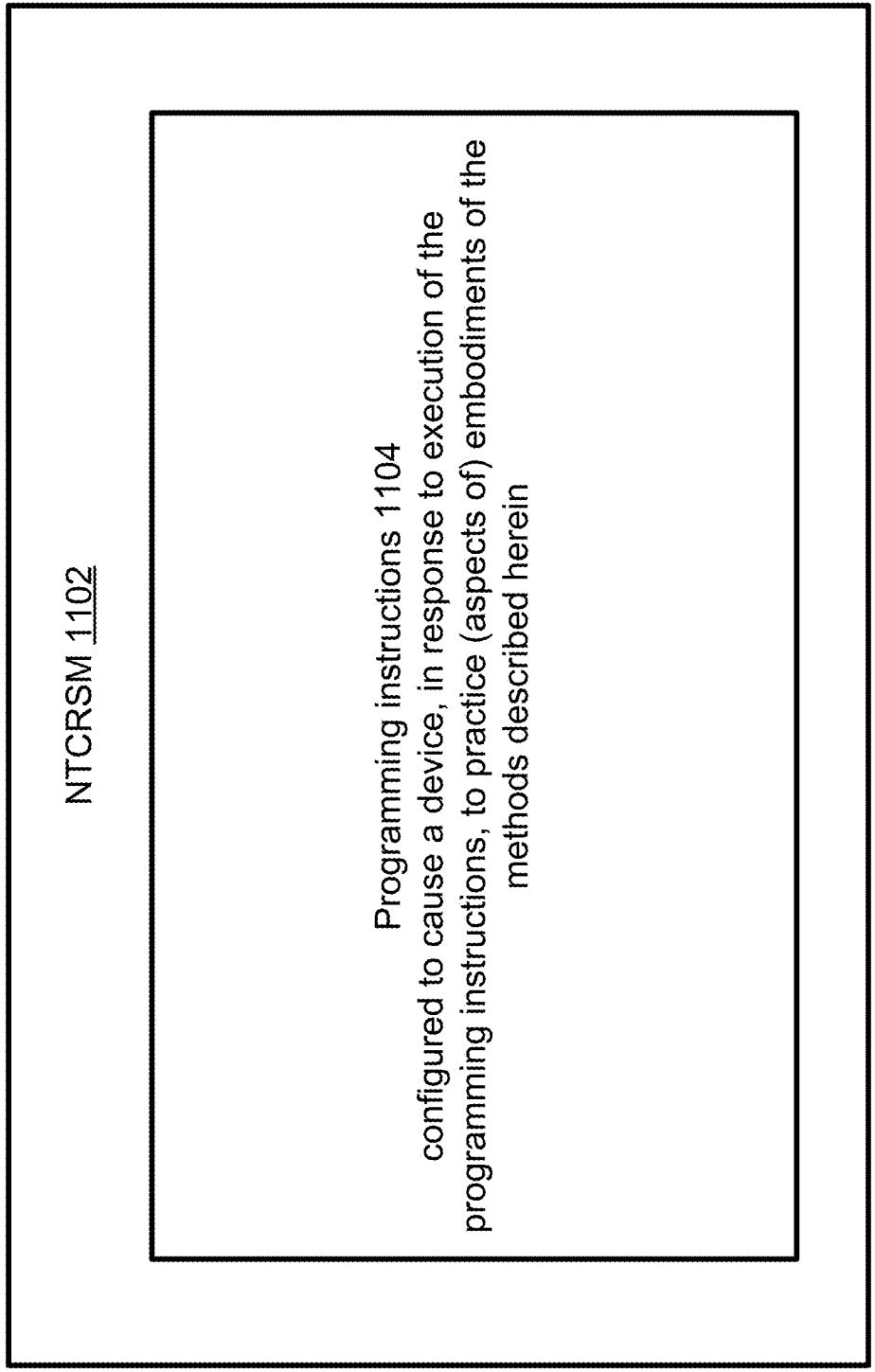
FIG. 11 illustrates an example non-transitory computer-readable storage media that may be suitable for use to store instructions (or data that creates the instructions) that cause an apparatus, in response to execution of the instructions by the apparatus, to practice selected aspects of the present disclosure.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 11 illustrates an example non-transitory computer-readable storage media (NTCRSM) that may be suitable for use to store instructions (or data that creates the instructions) that cause an apparatus (such as any of the devices/components/systems described with regard to FIGS. 1-10), in response to execution of the instructions by the apparatus, to practice selected aspects of the present disclosure. As shown, NTCRSM 1102 may include a number of programming instructions 1104 (or data to create the programming instructions). Programming instructions 1104 may be configured to enable a device (e.g., any of the devices/components/systems described with regard to FIGS. 1-10), in response to execution of the programming instructions, to perform various programming operations associated with operating system functions, one or more applications, and/or aspects of the present disclosure (including various programming operations associated with FIGS. 2-5).

In alternate embodiments, programming instructions 1104 (or data to create the instructions) may be disposed on multiple NTCRSM 1102. In alternate embodiments, programming instructions 1104 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1102 may be embodied by devices described for the storage circuitry 1008 and/or memory circuitry 1004 described with regard to FIG. 10. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code (such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1083, instructions 1082, 1070 discussed previously with regard to FIG. 10) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1000, partly on the system 1000, as a stand-alone software package, partly on the system 1000 and partly on a remote computer or entirely on the remote computer or server (e.g., system 900). In the latter scenario, the remote computer may be connected to the system 1000 through any type of network, including a local area network (LAN) or a wide area network (WAN), or the connection may be made to an external computer (for example, through the Internet using an Internet Service Provider).

3. Example Edge/Fog Systems and Implementations

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 9-12.

Figure 12:
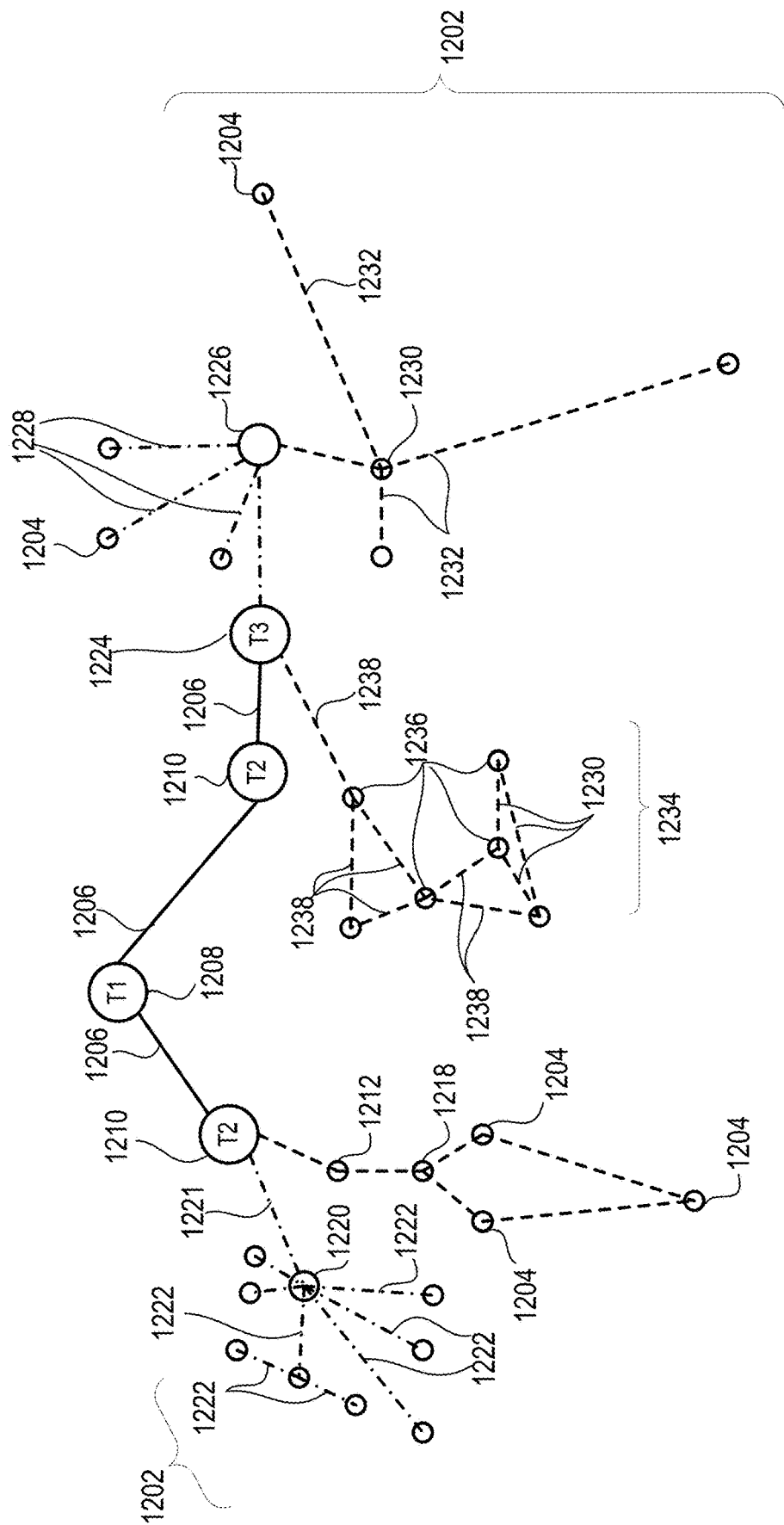
FIG. 12 illustrates an arrangement showing interconnections that may be present between a network and Internet of Things (IoT) networks, according to various embodiments.

FIG. 12 illustrates an arrangement 1200 showing interconnections that may be present between the Internet and IoT networks, in accordance with various embodiments. The interconnections may couple smaller networks 1202, down to the individual IoT device 1204, to the fiber backbone 1206 of the Internet 1200. To simplify the drawing, not every device 1204, or other object, is labeled.

In FIG. 12, top-level providers, which may be termed tier 1 providers 1208, are coupled by the fiber backbone of the Internet to other providers, such as secondary or tier 2 providers 1210. In one example, a tier 2 provider 1210 may couple to a tower 1212 of an LTE cellular network, for example, by further fiber links, by microwave communications 1214, or by other communications technologies. The tower 1212 may couple to a mesh network including IoT devices 1204 through an LTE communication link 1216, for example, through a central node 1218. The communications between the individual IoT devices 1204 may also be based on LTE or NR communication links 1216. In another example, a high-speed uplink 1221 may couple a tier 2 provider 1210 to a gateway (GW) 1220. A number of IoT devices 1204 may communicate with the GW 1220, and with each other through the GW 1220, for example, over BLE links 1222.

The fiber backbone 1206 may couple lower levels of service providers to the Internet, such as tier 3 providers 1224. A tier 3 provider 1224 may be considered a general Internet service provider (ISP), for example, purchasing access to the fiber backbone 1210 from a tier 2 provider 1210 and providing access to a corporate GW 1226 and other customers. From the corporate GW 1226, a wireless local area network (WLAN) can be used to communicate with IoT devices 1204 through Wi-Fi® links 1228. A Wi-Fi link 1228 may also be used to couple to a low power wide area (LPWA) GW 1230, which can communicate with IoT devices 1204 over LPWA links 1232, for example, compatible with the LoRaWan specification promulgated by the LoRa alliance.

The tier 3 provider 1224 may also provide access to a mesh network 1234 through a coordinator device 1236 that communicates with the tier 3 provider 1224 using any number of communications links, such as an LTE cellular link, an LPWA link, or a link 1238 based on the IEEE 802.15.4 standard, such as Zigbee®. Other coordinator devices 1236 may provide a chain of links that forms cluster tree of linked devices.

IoT devices 1204 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1204 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1204 may be biotic devices such as monitoring implants, biosensors, biochips, and the like. In other embodiments, an IoT device 1204 may be a computer device that is embedded in a computer system and coupled with communications circuitry of the computer system. In such embodiments, the IoT device 1204 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 1204 may include one or more memory devices and one or more processors to capture and store/record data. Each of the IoT devices 1204 may include appropriate communications circuitry (e.g., transceiver(s), modem, antenna elements, etc.) to communicate (e.g., transmit and receive) captured and stored/recorded data. Further, each IoT device 1204 may include other transceivers for communications using additional protocols and frequencies. The wireless communications protocols may be any suitable set of standardized rules or instructions implemented by the IoT devices 1204 to communicate with other devices, including instructions for packetizing/depacketizing data, instructions for modulating/demodulating signals, instructions for implementation of protocols stacks, and the like. For example, IoT devices 1204 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 1204, tower 1212, GW 1220, 1226, and 1230, coordinator device 1236, and so forth, may also be incorporated with the embodiments described herein, in particular, with references to FIGS. 1-5. In particular, the IoT devices 1204, tower 1212, GW 1220, 1226, and 1230, coordinator device 1236, and so forth, may correspond with the computing devices/systems discussed previously with regard to FIGS. 1 and 6-11.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 13:
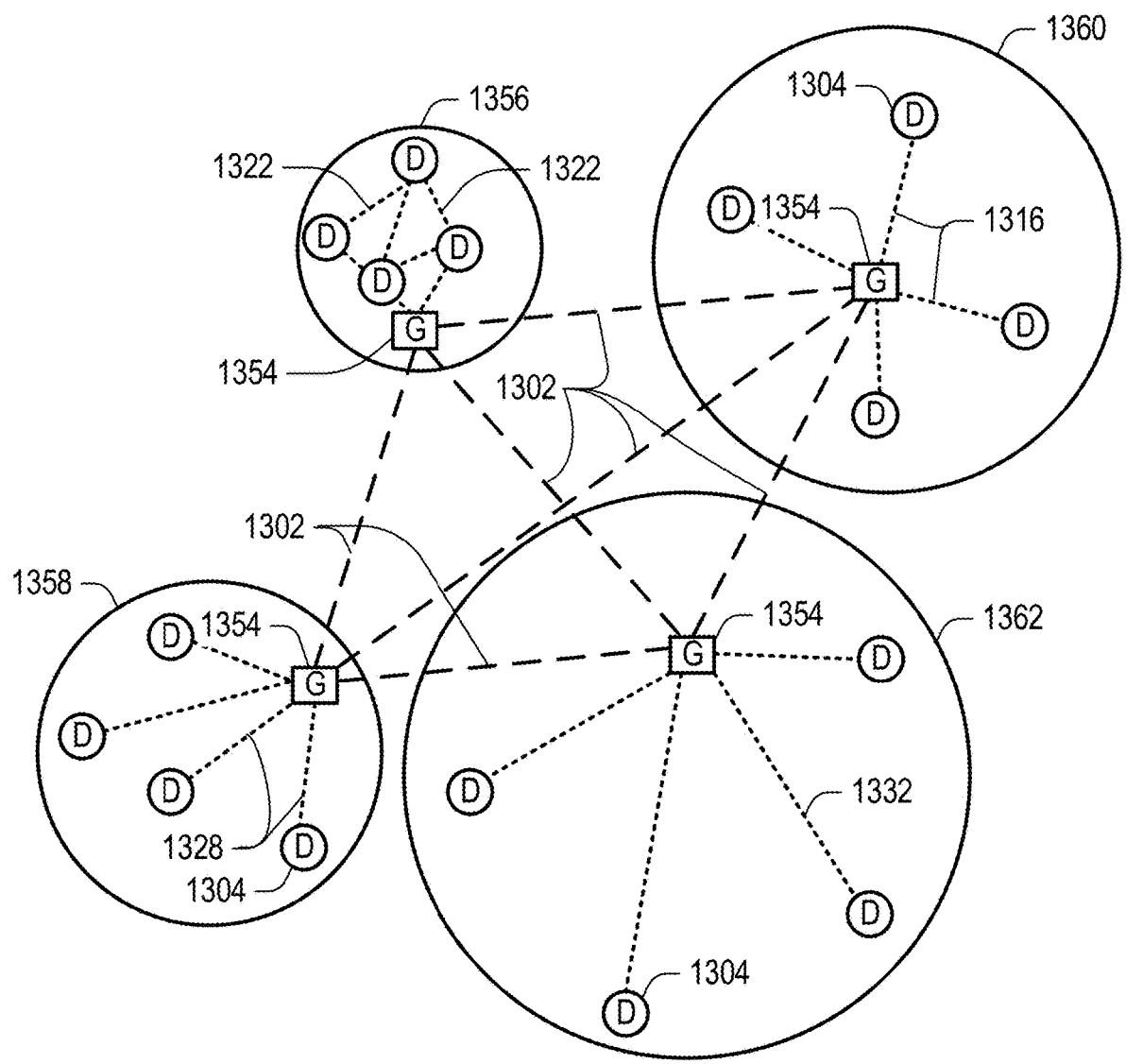
FIG. 13 illustrates an example domain topology according to various embodiments.

FIG. 13 illustrates an example domain topology 1300 that may be used for a number of IoT networks coupled through backbone links 1302 to GWs 1354, in accordance with various embodiments. To simplify the drawing, not every device 1304, or communications link 1316, 1322, 1328, or 1332 is labeled. The backbone links 1302 may include any number of wired or wireless technologies, and may be part of a local area network (LAN), a wide area network (WAN), or the Internet. Similar to FIG. 12, in embodiments, one or more of IoT devices 1304 (which may be the same or similar as IoT devices 1204 of FIG. 12), GWs 1354, and so forth, may be incorporated with embodiments described herein. In particular, the various devices shown by FIG. 13 may correspond with the systems, devices, etc. discussed previously with regard to FIGS. 1-11.

The network topology 1300 may include any number of types of IoT networks, such as a mesh network 1356 using BLE links 1322. Other IoT networks that may be present include a WLAN network 1358 using WiFi links 1328, a cellular network 1360 using cellular links 1316, and an LPWA network 1362 using LPWA links 1332. Each of these IoT networks may provide opportunities for new developments, as described herein. For example, communications between IoT devices 1304, such as over the backbone links 1302, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1306 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1358 uses systems that perform standards conversion to provide multi-standard connectivity, enabling IoT devices 1304 using different protocols to communicate. Further systems may provide seamless interconnectivity across a multi-standard infrastructure comprising visible Internet resources and hidden Internet resources. Communications in the cellular network 1360 may be enhanced by systems that offload data, extend communications to more remote devices, or both. The LPWA network 1362 may include systems that perform non-Internet protocol (IP) to IP interconnections, addressing, and routing.

Figure 14:
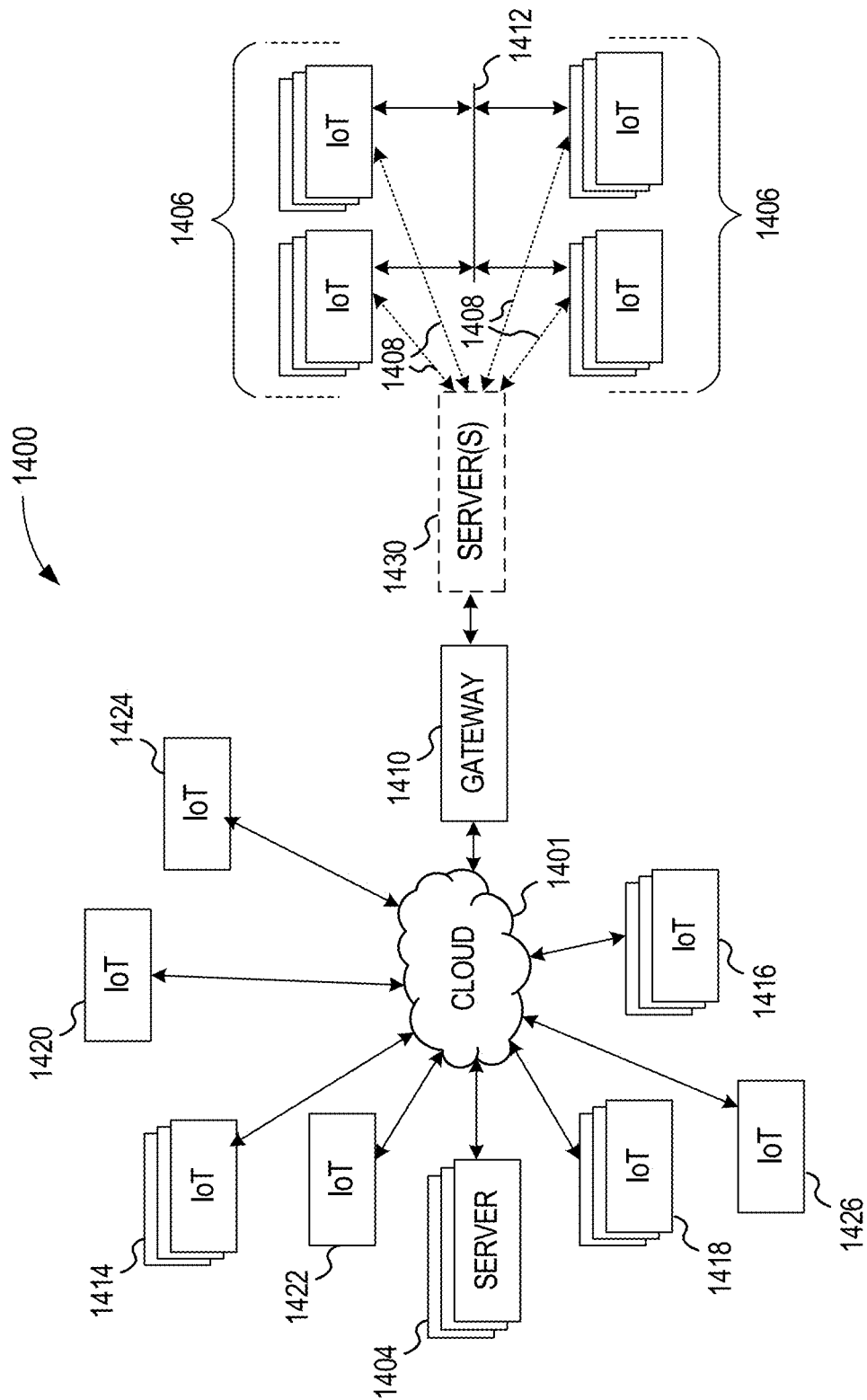
FIG. 14 illustrates an example cloud computing network or cloud in communication with a number of IoT devices according to various embodiments.

FIG. 14 illustrates an arrangement 1400 of example cloud computing network, or cloud 1401, in communication with a number of Internet of Things (IoT) devices, in accordance with various embodiments. The cloud 1401 may represent the Internet, one or more cellular networks, a local area network (LAN) or a wide area network (WAN) including proprietary and/or enterprise networks for a company or organization, or combinations thereof. Cloud 1401 may correspond to cloud 1001 of FIG. 10. Components used for such communications system can depend at least in part upon the type of network and/or environment selected. Protocols and components for communicating via such networks are well known and will not be discussed herein in detail. However, it should be appreciated that cloud 1401 may be associated with network operator who owns or controls equipment and other elements necessary to provide network-related services, such as one or more base stations or access points, and one or more servers for routing digital data or telephone calls (for example, a core network or backbone network).

The IoT devices in FIG. 14 may be the same or similar to the IoT devices 1204 of FIG. 12 and the IoT UEs 101x of FIG. 1, and/or the edge compute nodes 2101 and data collector nodes 2102 of FIGS. 2-5. In addition, the various devices shown by FIG. 14 may correspond with the systems, devices, etc. discussed previously with regard to FIGS. 1-11. The IoT devices may include any number of different types of devices, grouped in various combinations, such as IoT group 1406 that may include IoT devices that provide one or more services for a particular user, customer, organizations, etc. A service provider may deploy the IoT devices in the IoT group 1406 to a particular area (e.g., a geolocation, building, etc.) in order to provide the one or more services. In one example, the IoT group 306 may be a traffic control group where the IoT devices in the IoT group 1406 may include stoplights, traffic flow monitors, cameras, weather sensors, and the like, to provide traffic control and traffic analytics services for a particular municipality or other like entity. Similar to FIGS. 12-10, in embodiments, one or more of IoT devices 1414-1424, GW 1410, and so forth, may be incorporated with the various embodiments described herein, in particular, with references to FIGS. 1-6. For example, in some embodiments, the IoT group 1406, or any of the IoT groups discussed herein, may include the components, devices, systems discussed with regard to FIGS. 1-6.

The IoT group 1406, or other subgroups, may be in communication with the cloud 1401 through wireless links 1408, such as LPWA links, and the like. Further, a wired or wireless sub-network 1412 may allow the IoT devices to communicate with each other, such as through a local area network, a wireless local area network, and the like. The IoT devices may use another device, such as a GW 1410 to communicate with the cloud 1401. Other groups of IoT devices may include remote weather stations 1414, local information terminals 1416, alarm systems 1418, automated teller machines 1420, alarm panels 1422, or moving vehicles, such as emergency vehicles 1424 or other vehicles 1426, among many others. Each of these IoT devices may be in communication with other IoT devices, with servers 1404, or both. In some embodiments, the servers 1404 correspond with the remote server(s) 130 discussed previously, and any of the aforementioned vehicles may correspond with UEs 101 discussed previously.

As can be seen from FIG. 14, a large number of IoT devices may be communicating through the cloud 1401. This may allow different IoT devices to request or provide information to other devices autonomously. For example, the IoT group 1406 may request a current weather forecast from a group of remote weather stations 1414, which may provide the forecast without human intervention. Further, an emergency vehicle 1424 may be alerted by an automated teller machine 1420 that a burglary is in progress. As the emergency vehicle 1424 proceeds towards the automated teller machine 1420, it may access the traffic control group 1406 to request clearance to the location, for example, by lights turning red to block cross traffic at an intersection in sufficient time for the emergency vehicle 1424 to have unimpeded access to the intersection.

In another example, the IoT group 1406 may be an industrial control group (also referred to as a "connected factory", an "industry 4.0" group, and the like) where the IoT devices in the IoT group 1406 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1406 may communicate with the servers 1404 via GW 1410, server(s) 1430, and cloud 1401 to provide captured data, which may be used to provide performance monitoring and analytics to the manufacturer or factory operator. Additionally, where the GW 1410 or one or more of the server(s) 1430 is a MEC server 201, the IoT group 1406 may communicate with the GW 1410 and/or one or more of the server(s) 1430 for distributed ML according to the various embodiments discussed herein. Furthermore, the IoT devices in the IoT group 1406 may communicate among each other, and/or with other IoT devices of other IoT groups, to make decisions on their own and to perform their tasks as autonomously as possible.

Clusters of IoT devices, such as the IoT groups depicted by FIG. 14, may be equipped to communicate with other IoT devices as well as with the cloud 1401. This may allow the IoT devices to form an ad-hoc network between the devices, allowing them to function as a single device, which may be termed a fog device. This is discussed further with respect to FIG. 12.

Figure 15:
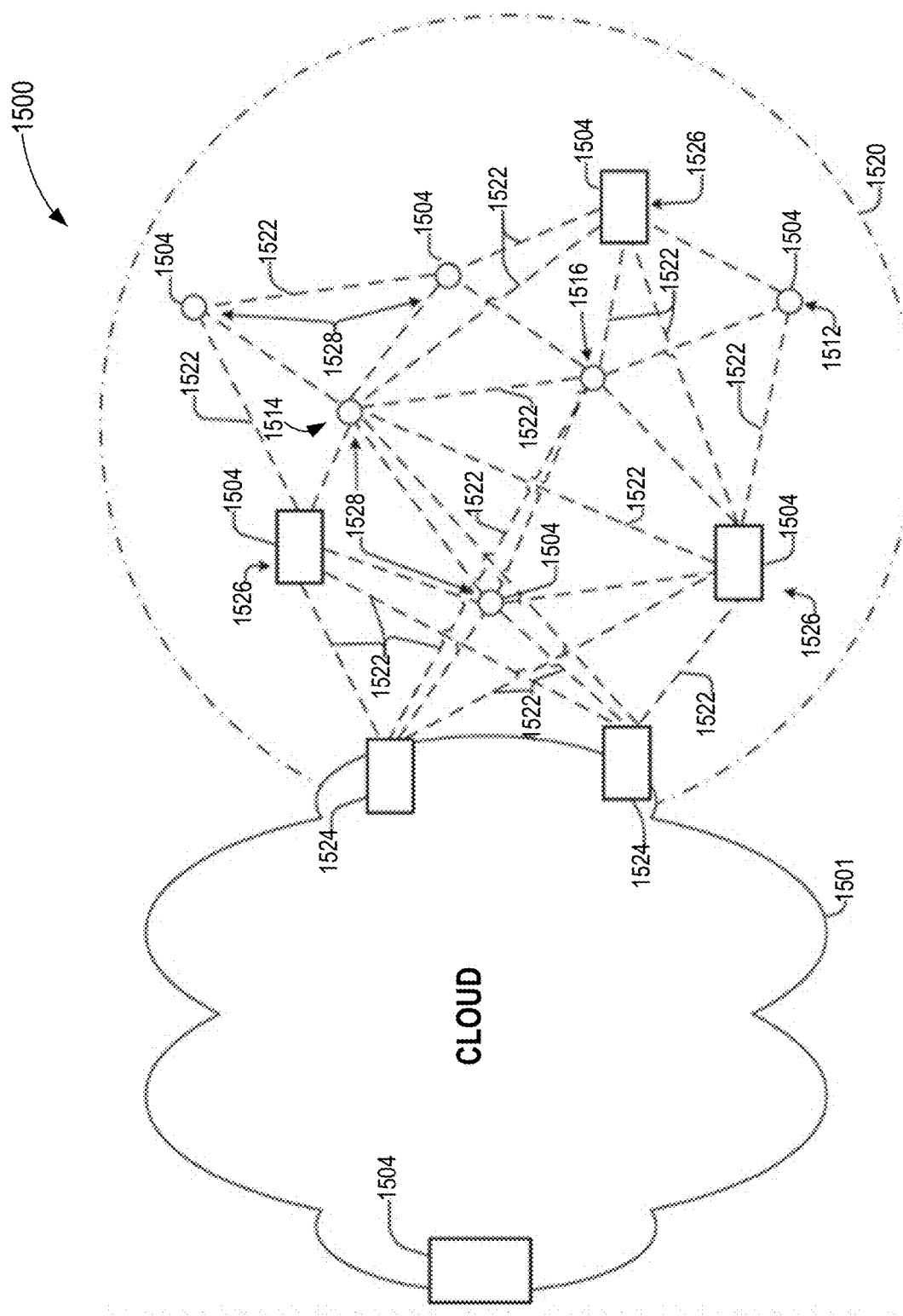
FIG. 15 illustrates an arrangement of a cloud computing network or cloud in communication with a mesh network of IoT devices or IoT fog according to various embodiments.

FIG. 15 illustrates an arrangement 1500 of a cloud computing network, or cloud 1501, in communication with a mesh network of IoT devices, which may be termed a fog device 1520 or fog 1520, operating at the edge of the cloud 1501, in accordance with various embodiments. Cloud 1501 may be the same or similar to cloud 1001 of FIG. 10 and cloud 1401 of FIG. 14. In this example, the fog 1520 is a group of IoT devices at an intersection (e.g., and may include one or more IoT groups 1406 of FIG. 14). The fog 1520 may be established in accordance with specifications released by the OpenFog Consortium (OFC), the Open Connectivity Foundation™ (OCF), among others. In some embodiments, the fog 1520 may be a tangle as defined by the IOTA foundation. Additionally, each of the IoT devices in the fog 1520 may correspond with the IoT UEs 101*x*, edge compute nodes 2101, data collector nodes 2102, etc. discussed previously with regard to FIGS. 1-5.

In embodiments, fog computing systems, such as fog 1520, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1501 to Things (e.g., IoT devices 1504).

Fog computing systems may be used to perform low-latency computation/aggregation on the data while routing it to an edge cloud computing service (e.g., MEC server 201 in FIG. 2) and/or a central cloud computing service (e.g., server(s) 130 in FIG. 2) for performing heavy computations or computationally burdensome tasks. On the other hand, edge cloud computing consolidates human-operated, voluntary resources, as a cloud. These voluntary resource may include, inter-alia, UEs 101, desktop PCs, tablets, smartphones, nano data centers, and the like. In various implementations, resources in the edge cloud may be in one to two-hop proximity to the IoT devices 1504 (e.g., UEs 101*x* in FIG. 1), which may result in reducing overhead related to processing data and may reduce network delay.

In some embodiments, the fog 1520 may be a consolidation of IoT devices 1504 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog 1520 may operate at the edge of the cloud 1501. The fog 1520 operating at the edge of the cloud 1501 may overlap or be subsumed into an edge network of the cloud 1501. The edge network of the cloud 1501 may overlap with the fog 1520, or become a part of the fog 1520. Furthermore, the fog 1520 may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the UEs 101 of FIG. 1.

Data may be captured, stored/recorded, and communicated among the IoT devices 1504 (or, for example, among the UEs 101 that have direct links 105 with one another as shown by FIG. 1). Analysis of the traffic flow and control schemes may be implemented by aggregators 1526 that are in communication with the IoT devices 1504 (or UEs 101) and each other through a mesh network. The aggregators 1526 may be a type of IoT device 1504 and/or network appliance. In the example of FIG. 1, the aggregators may be (R)AN nodes 111, 106, or one or more designated UEs 101. Data may be uploaded to the cloud 1501 (e.g., server(s) 130 in FIG. 2) via the aggregator, and commands can be received from the cloud 1501 through GWs 1524 that are in communication with the IoT devices 1504 and the aggregators 1526 through the mesh network. Unlike the traditional cloud computing model, in some implementations, the cloud 1501 may have little or no computational capabilities and only serves as a repository for archiving data recorded and processed by the fog 1520. In these implementations, the cloud 1501 centralized data storage system and provides reliability and access to data by the computing resources in the fog 1520 and/or edge devices. Being at the core of the architecture, the Data Store of the cloud 1501 is accessible by both Edge and Fog layers of the aforementioned edge-fog network.

Similar to FIGS. 12-14, in embodiments, one or more of IoT devices 1504, aggregators 1526, and so forth, may be incorporated with the various embodiments described herein, in particular, with references to FIGS. 1-11. For example, and with reference to FIG. 1, the links 105, 103 that are enabled by use of the communication technology may allow the UEs 101 to form a cloud network or fog 1520 for collaborating. Examples of UE 101 collaboration include performing computations for partial gradients as discussed herein. Clusters of the UEs 101 are equipped to communicate with one another, as well as with stationary infrastructure equipment 111, 900 to form ad-hoc networks allowing the UEs 101 to function as a fog 1520.

Any number of communications links may be used in the fog 1520. Shorter-range links 1522, for example, compatible with IEEE 802.15.4 may provide local communications between IoT devices that are proximate to one another or other devices. Longer-range links 1522, for example, compatible with LPWA standards, may provide communications between the IoT devices and the GWs 1524. To simplify the diagram, not every communications link 1522 is labeled with a reference number.

The fog 1520 may be considered to be a massively interconnected network wherein a number of IoT devices are in communications with each other, for example, by the communication links 1522. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1524. In these networks, the number of interconnections may provide substantial redundancy, allowing communications to be maintained, even with the loss of a number of IoT devices.

Not all of the IoT devices may be permanent members of the fog 1520. In the example of FIG. 15, three transient IoT devices have joined the fog 1520, a first mobile device 1512, a second mobile device 1514, and a third mobile device 1516. The fog 1520 may be presented to clients in the cloud 1501, such as the server 1534, as a single device located at the edge of the cloud 1501. In this example, the control communications to specific resources in the fog 1520 may occur without identifying any specific IoT device 1504 within the fog 1520. Accordingly, if any IoT device 1504 fails, other IoT devices 1504 may be able to discover and control a resource. For example, the IoT devices 1504 may be wired so as to allow any one of the IoT devices 1504 to control measurements, inputs, outputs, etc., for the other IoT devices 1504. The aggregators 1526 may also provide redundancy in the control of the IoT devices 1504 and other functions of the fog 1520.

In some examples, the IoT devices may be configured using an imperative programming style, e.g., with each IoT device having a specific function and communication partners. However, the IoT devices forming the fog 1520 may be configured in a declarative programming style, allowing the IoT devices to reconfigure their operations and communications, such as to determine needed resources in response to conditions, queries, and device failures. This may be performed as transient IoT devices, such as the mobile devices 1512, 1514, 1516, join the fog 1520. As transient or mobile IoT devices enter or leave the fog 1520, the fog 1520 may reconfigure itself to include those devices. This may be performed by forming a temporary group of the mobile devices 1512 and 1514 and the third mobile device 1516 to control or otherwise communicate with the IoT devices 1504. If one or both of the devices 1512, 1514 are autonomous, the temporary group may provide instructions to the devices 1512, 1514. As the transient devices 1512, 1514, and 1516, leave the vicinity of the fog 1520, it may reconfigure itself to eliminate those IoT devices 1504 from the network. The fog 1520 may also divide itself into functional units, such as the IoT devices 1504 and other IoT devices proximate to a particular area or geographic feature, or other IoT devices that perform a particular function. This type of combination may enable the formation of larger IoT constructs using resources from the fog 1520.

As illustrated by the fog 1520, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

4. Examples

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes an apparatus for providing distributed machine learning (ML) services in a heterogeneous computing environment, the apparatus comprising: processor circuitry arranged to partition an encoded training dataset into a set of training data partitions, and assign each training data partition of the set of training data partitions to corresponding compute nodes of a plurality of heterogeneous compute nodes of the heterogeneous computing environment available to perform computations for a distributed ML training process, wherein a number of data points included in each training data partition is based on operational parameters of the corresponding heterogeneous compute nodes; and communication circuitry communicatively coupled with the processor circuitry, the communication circuitry arranged to transmit each training data partition to the corresponding heterogeneous compute nodes, and receive computed partial gradients from a subset of the corresponding heterogeneous compute nodes, and wherein the processor circuitry is arranged to determine updated ML training parameters based on an aggregation of the received computed partial gradients, and wherein the communication circuitry is arranged to transmit the updated ML training parameters to the corresponding heterogeneous compute nodes.

Example 2 includes the apparatus of example 1 and/or some other example(s) herein, further comprising: encoding circuitry coupled with the processor circuitry, the encoding circuitry is arranged to encode a raw dataset into the encoded training dataset with a number of extra data points based on a coding redundancy value.

Example 2.5 includes the apparatus of example 2 and/or some other example(s) herein, wherein the number of extra data points is a same number of data points as a number of data points in the raw dataset, or the number of extra data points is greater than the number of data points in the raw dataset Example 3 includes the apparatus of example 2 and/or some other example(s) herein, wherein the processor circuitry is arranged to determine the coding redundancy value based on the operational parameters and a load allocation criterion.

Example 4 includes the apparatus of example 3 and/or some other example(s) herein, wherein the load allocation criterion is based on a minimax criterion, the minimax criterion being a value that maximizes a number of partial gradients to be received from each heterogeneous compute node while minimizing an epoch time.

Example 4.5 includes the apparatus of example 3 and/or some other example(s) herein, wherein the load allocation criterion is based on a desired computation time for computation of the partial gradients, wherein the computation time at each of the corresponding heterogeneous compute nodes is based on one or more deterministic components of respective operational parameters of the corresponding heterogeneous compute nodes and one or more stochastic components of the respective operational parameters.

Example 5 includes the apparatus of examples 2-4 and/or some other example(s) herein, wherein the encoding circuitry is arranged to encode the raw dataset using a random linear encoder, wherein the encoding circuitry is arranged to operate the random linear encoder to select each element of a random generator matrix independently from a normal distribution or from a Bernoulli distribution, and wherein the random generator matrix has c number of rows and m number of columns such that any m subset of c rows is a near-orthogonal m×m matrix, where $c > m \geq 1$.

Example 5.5 includes the apparatus of examples 2-5 and/or some other example(s) herein, wherein the coding redundancy value is equal to a number of training data partitions in the set of training data partitions.

Example 6 includes the apparatus of examples 1-5.5 and/or some other example(s) herein, wherein the operational parameters of the corresponding heterogeneous compute nodes include network conditions experienced by the corresponding heterogeneous compute nodes and compute node capabilities of the corresponding heterogeneous compute nodes, and wherein the communication circuitry is arranged to receive, from the corresponding heterogeneous compute nodes, an indication of the operational parameters of the corresponding heterogeneous compute nodes.

Example 7 includes the apparatus of example 6 and/or some other example(s) herein, wherein the compute node capabilities include one or more of a processor speed of the corresponding heterogeneous compute nodes, memory utilization of the corresponding heterogeneous compute nodes, memory or storage size of the corresponding heterogeneous compute nodes, link adaptation capabilities of the corresponding heterogeneous compute nodes, available battery power of the corresponding heterogeneous compute nodes, a battery power budget of the corresponding heterogeneous compute nodes, an average computation time per workload, and an achievable data rate per channel usage of the corresponding compute heterogeneous nodes.

Example 8 includes the apparatus of examples 1-7 and/or some other example(s) herein, wherein the apparatus is a System-On-Chip (SoC) or a Multi-Chip Package (MCP) in a Multi-access Edge Computing (MEC) server.

Example 9 includes an apparatus for providing distributed machine learning (ML) services in a heterogeneous computing environment, the apparatus comprising: processor circuitry arranged to determine, for each compute node of a plurality of heterogeneous compute nodes of the heterogeneous computing environment available to perform computations for a distributed ML training process, a coding redundancy indicating a number of encoded data points, which are generated from uncoded data available at each compute node, to be included in an encoded training data partition based on operational parameters of each heterogeneous compute node; and communication circuitry communicatively coupled with the processor circuitry, the communication circuitry arranged to transmit an indication of the number of data points and the coding redundancy to each heterogeneous compute node, and receive encoded training data partitions from a set of the plurality of heterogeneous compute nodes, and receive first partial gradients based on the uncoded data from the set of the plurality of compute nodes, and wherein the processor circuitry is arranged to determine second partial gradients based on the encoded training data partitions, and determine updated ML training parameters based on an aggregation of the first partial gradients with the second partial gradients, and the communication circuitry is arranged to transmit the updated ML training parameters and the aggregated partial gradients to corresponding heterogeneous compute nodes.

Example 10 includes the apparatus of example 9 and/or some other example(s) herein, wherein the processor circuitry is arranged to determine the coding redundancy based on the operational parameters and a load allocation criterion.

Example 11 includes the apparatus of example 10 and/or some other example(s) herein, wherein the load allocation criterion is based on a minimax criterion, the minimax criterion being a value that maximizes a number of partial gradients to be received from each compute node while minimizing a desired epoch time, wherein the desired epoch time is based on a computation time for computation of the partial gradients at each heterogeneous compute node.

Example 11.5 includes the apparatus of example 11 and/or some other example(s) herein, wherein, the computation time being based on one or more deterministic components of the operational parameters of each heterogeneous compute node and one or more stochastic components of the operational parameters of each heterogeneous compute node.

Example 12 includes the apparatus of examples 10-11 and/or some other example(s) herein, wherein the processor circuitry is arranged to determine the coding redundancy based on a desired number of encoded data points to be accepted for determination of the second partial gradients.

Example 13 includes the apparatus of examples 9-12 and/or some other example(s) herein, wherein the communication circuitry is arranged to transmit a probability value with the indication of the number of data points and the coding redundancy to each compute node, wherein the probability value indicates a probability that the first partial gradient will be received within a predetermined epoch time, and the probability value is to weight the uncoded data available at each compute node prior to the uncoded data being encoded.

Example 14 includes the apparatus of examples 10-13 and/or some other example(s) herein, wherein the number of data points to be included in the encoded training data partition as indicated by the coding redundancy is a fraction of a total number of uncoded data points distributed across all computing nodes of the plurality of heterogeneous compute nodes.

Example 15 includes the apparatus of examples 9-14 and/or some other example(s) herein, wherein the operational parameters of the corresponding compute nodes include network conditions experienced by the corresponding compute nodes and compute node capabilities of the corresponding compute nodes, and the communication circuitry is arranged to receive, from the corresponding compute nodes, an indication of the operational parameters of the corresponding compute nodes.

Example 16 includes the apparatus of example 15 and/or some other example(s) herein, wherein the compute node capabilities include one or more of a processor speed, memory utilization, memory or storage size, link adaptation capabilities, available battery power, a battery power budget, an average computation time per workload, and an achievable data rate per channel usage.

Example 16 includes the apparatus of examples 9-16.5 and/or some other example(s) herein, wherein the apparatus is a System-On-Chip (SoC) or a Multi-Chip Package (MCP) in a Multi-access Edge Computing (MEC) server.

Example 17 includes at least one computer-readable storage medium (CRSM) comprising data, the data to create, manufacture, or produce instructions, wherein execution of the instructions is to cause an edge compute node of a heterogeneous computing environment to: identify a training dataset partition on which to perform computations of a distributed machine learning (ML) training process, wherein a number of data points included in the training data partition is based on operational parameters of the edge compute node, and the training data partition is among a plurality of training data partitions; perform the computations on the data points in the training dataset partition to obtain a partial gradient; send the computed partial gradient to a master node in the heterogeneous computing environment.

Example 18 includes the CRSM of example 17 and/or some other example(s) herein, wherein execution of the instructions is to cause the edge compute node to: obtain, from the master node, updated ML training parameters based on an aggregation of a plurality of computed partial gradients, wherein each computed partial gradient of the plurality of computed partial gradients are based on a corresponding one of the plurality of training data partitions; and perform the computations on the data points in the training dataset partition to obtain a partial gradient.

Example 19 includes the CRSM of examples 17-18 and/or some other example(s) herein, wherein execution of the instructions is to cause the edge compute node to: obtain, from the master node, the training data partition and an indication of the computations of the distributed ML training process to be performed on the data points in the training data partition.

Example 20 includes the CRSM of examples 17-18 and/or some other example(s) herein, wherein the training data partition is locally accessible by the edge compute node, and execution of the instructions is to cause the edge compute node to: encode the data points of the training data partition and at least one extra data point based on a coding redundancy value to obtain an encoded dataset, wherein the coding redundancy value is based at least on the operational parameters of the edge compute node.

Example 21 includes the CRSM of example 20 and/or some other example(s) herein, wherein the coding redundancy value is also based on a load allocation criterion, wherein the load allocation criterion is based on a desired computation time for computation of the partial gradient.

Example 22 includes the CRSM of examples 20-21 and/or some other example(s) herein, wherein execution of the instructions is to cause the edge compute node to: compute the partial gradient based on a random generator matrix and a weight matrix, wherein the weight matrix is based on a probability that the edge compute node will be unable to provide the partial gradient to the master node within a desired period of time.

Example 23 includes the CRSM of examples 17-22 and/or some other example(s) herein, wherein execution of the instructions is to cause the edge compute node to: identify the operational parameters of the edge compute node, the operational parameters of the edge compute node at least including network conditions experienced by the edge compute node and computational capacity of the edge compute node; and send an indication of the identified operational parameters to the master node.

Example 24 includes the CRSM of example 23 and/or some other example(s) herein, wherein the operational parameters of the edge compute node also include one or more compute node capabilities of the edge compute node, wherein the compute node capabilities include one or more of a processor speed, memory utilization, memory or storage size, link adaptation capabilities, available battery power, a battery power budget, an average computation time per workload, and an achievable data rate per channel usage.

Example 25 includes the CRSM of examples 17-24 and/or some other example(s) herein, wherein the edge compute node is one of a desktop computer, a smartphone, a tablet computer, an Internet of Things (IoT) device, a remote sensor, a multi-access edge computing (MEC) server, and a Radio Access Network (RAN) node.

Example 26 includes a method for providing distributed machine learning (ML) services in a heterogeneous computing environment, the method comprising: partitioning, by a master node, an encoded training dataset into a set of training data partitions; assigning, by the master node, each training data partition of the set of training data partitions to corresponding compute nodes of a plurality of heterogeneous compute nodes of the heterogeneous computing environment available to perform computations for a distributed ML training process, wherein a number of data points included in each training data partition is based on operational parameters of the corresponding heterogeneous compute nodes; transmitting, by the master node, each training data partition to the corresponding heterogeneous compute nodes; receiving, by the master node, computed partial gradients from a subset of the corresponding heterogeneous compute nodes; determining, by the master node, updated ML training parameters based on an aggregation of the received computed partial gradients; and transmitting, by the master node, the updated ML training parameters to the corresponding heterogeneous compute nodes.

Example 27 includes the method of example 26 and/or some other example(s) herein, further comprising: encoding, by the master node, a raw dataset into the encoded training dataset with a number of extra data points based on a coding redundancy value, wherein the number of extra data points is a same number of data points as a number of data points in the raw dataset, or the number of extra data points is greater than the number of data points in the raw dataset.

Example 28 includes the method of example 27 and/or some other example(s) herein, further comprising: determining, by the master node, the coding redundancy value based on the operational parameters and a load allocation criterion.

Example 29 includes the method of example 28 and/or some other example(s) herein, wherein the load allocation criterion is based on a minimax criterion, the minimax criterion being a value that maximizes a number of partial gradients to be received from each heterogeneous compute node while minimizing an epoch time.

Example 29.5 includes the method of example 28 and/or some other example(s) herein, wherein the load allocation criterion is based on a desired computation time for computation of the partial gradients, wherein the computation time at each of the corresponding heterogeneous compute nodes is based on one or more deterministic components of respective operational parameters of the corresponding heterogeneous compute nodes and one or more stochastic components of the respective operational parameters.

Example 30 includes the method of examples 27-29.5 and/or some other example(s) herein, further comprising:

encoding, by the master node, the raw dataset using a random linear encoder, including operating, by the master node, the random linear encoder to select each element of a random generator matrix independently from a normal distribution or from a Bernoulli distribution, and wherein the random generator matrix has c number of rows and m number of columns such that any m subset of c rows is a near-orthogonal m×m matrix, where c>m≥1.

Example 31 includes the method of examples 26-30 and/or some other example(s) herein, wherein the operational parameters of the corresponding heterogeneous compute nodes include network conditions experienced by the corresponding heterogeneous compute nodes and compute node capabilities of the corresponding heterogeneous compute nodes, and the method comprises receiving, by the master node from the corresponding heterogeneous compute nodes, an indication of the operational parameters of the corresponding heterogeneous compute nodes.

Example 32 includes the method of example 31 and/or some other example(s) herein, wherein the compute node capabilities include one or more of a processor speed of the corresponding heterogeneous compute nodes, memory utilization of the corresponding heterogeneous compute nodes, memory or storage size of the corresponding heterogeneous compute nodes, link adaptation capabilities of the corresponding heterogeneous compute nodes, available battery power of the corresponding heterogeneous compute nodes, a battery power budget of the corresponding heterogeneous compute nodes, an average computation time per workload, and an achievable data rate per channel usage of the corresponding compute heterogeneous nodes.

Example 33 includes the method of examples 26-32 and/or some other example(s) herein, wherein the plurality of heterogeneous compute nodes comprise one or more desktop computers, one or more smartphones, one or more tablet computers, one or more Internet of Things (IoT) devices, one or more remote sensors, one or more multi-access edge computing (MEC) servers, and/or one or more Radio Access Network (RAN) nodes; and the master node comprises one or more MEC servers or a cluster of cloud computing resources provided by a cloud computing service.

Example 34 includes a method for providing distributed machine learning (ML) services in a heterogeneous computing environment, the method comprising: determining, by a master node for each compute node of a plurality of heterogeneous compute nodes of the heterogeneous computing environment available to perform computations for a distributed ML training process, a coding redundancy indicating a number of encoded data points, which are generated from uncoded data available at each compute node, to be included in an encoded training data partition based on operational parameters of each heterogeneous compute node; transmitting, by the master node, an indication of the number of data points and the coding redundancy to each heterogeneous compute node; receiving, by the master node, encoded training data partitions from a set of the plurality of heterogeneous compute nodes; determining, by the master node, second partial gradients based on the encoded training data partitions; receiving, by the master node, first partial gradients based on the uncoded data partitions from the set of the plurality of compute nodes; determining, by the master node, updated ML training parameters based on an aggregation of the first partial gradients with the second partial gradients; and transmitting, by the master node, the updated ML training parameters and the aggregated partial gradients to corresponding heterogeneous compute nodes.

Example 35 includes the method of example 34 and/or some other example(s) herein, wherein the method comprises determining, by the master node, the coding redundancy based on the operational parameters and a load allocation criterion.

Example 36 includes the method of example 35 and/or some other example(s) herein, wherein the load allocation criterion is based on a minimax criterion, the minimax criterion being a value that maximizes a number of partial gradients to be received from each compute node while minimizing a desired epoch time, wherein the desired epoch time is based on a computation time for computation of the partial gradients at each heterogeneous compute node, the computation time being based on one or more deterministic components of the operational parameters of each heterogeneous compute node and one or more stochastic components of the operational parameters of each heterogeneous compute node.

Example 37 includes the method of example 35 and/or some other example(s) herein, wherein the method comprises determining, by the master node, the coding redundancy based on a desired number of encoded data points to be accepted for determination of the second partial gradients.

Example 38 includes the method of example 34 and/or some other example(s) herein, wherein the method comprises transmitting, by the master node, a probability value with the indication of the number of data points and the coding redundancy to each compute node, wherein the probability value indicates a probability that the first partial gradient will be received within a predetermined epoch time, and the probability value is to weight the uncoded data available at each compute node prior to the uncoded data being encoded.

Example 39 includes the method of example 35 and/or some other example(s) herein, wherein the number of data points to be included in the encoded training data partition indicated by the coding redundancy is a fraction of a total number of uncoded data points distributed across all computing nodes of the plurality of heterogeneous compute nodes.

Example 40 includes the method of example 34 and/or some other example(s) herein, wherein the operational parameters of the corresponding compute nodes include network conditions experienced by the corresponding compute nodes and compute node capabilities of the corresponding compute nodes, and wherein the method comprises receiving, by the master node from the corresponding compute nodes, an indication of the operational parameters of the corresponding compute nodes.

Example 40.5 includes the method of example 40 and/or some other example(s) herein, wherein the compute node capabilities include one or more of a processor speed, memory utilization, memory or storage size, link adaptation capabilities, available battery power, a battery power budget, an average computation time per workload, and an achievable data rate per channel usage.

Example 41 includes the method of examples 34-40.5 and/or some other example(s) herein, wherein the plurality of heterogeneous compute nodes comprise one or more desktop computers, one or more smartphones, one or more tablet computers, one or more Internet of Things (IoT) devices, one or more remote sensors, one or more multi-access edge computing (MEC) servers, and/or one or more Radio Access Network (RAN) nodes; and the master node comprises one or more MEC servers or a cluster of cloud computing resources provided by a cloud computing service.

Example 42 includes a method for providing distributed machine learning (ML) computations in a heterogeneous computing environment, the method comprising: identifying, by an edge compute node, a training dataset partition on which to perform computations of a distributed machine learning (ML) training process, wherein a number of data points included in the training data partition is based on operational parameters of the edge compute node, and the training data partition is among a plurality of training data partitions; performing, by the edge compute node, the computations on the data points in the training dataset partition to obtain a partial gradient; and transmitting, by the edge compute node, the computed partial gradient to a master node in the heterogeneous computing environment.

Example 43 includes the method of example 42 and/or some other example(s) herein, wherein the method comprises: obtaining, by the edge compute node from the master node, updated ML training parameters based on an aggregation of a plurality of computed partial gradients, wherein each computed partial gradient of the plurality of computed partial gradients are based on a corresponding one of the plurality of training data partitions; and performing, by the edge compute node from the master node, the computations on the data points in the training dataset partition to obtain a partial gradient.

Example 44 includes the method of example 42 and/or some other example(s) herein, wherein the method comprises: obtaining, by the edge compute node from the master node from the master node, the training data partition and an indication of the computations of the distributed ML training process to be performed on the data points in the training data partition.

Example 45 includes the method of example 42 and/or some other example(s) herein, wherein the training data partition is locally accessible by the edge compute node, and the method comprises: encoding, by the edge compute node from the master node, the data points of the training data partition and at least one extra data point based on a coding redundancy value to obtain an encoded dataset, wherein the coding redundancy value is based at least on the operational parameters of the edge compute node.

Example 46 includes the method of example 45 and/or some other example(s) herein, wherein the coding redundancy value is also based on a load allocation criterion, and the load allocation criterion is based on a desired computation time for computation of the partial gradient.

Example 47 includes the method of example 45 and/or some other example(s) herein, wherein the method comprises: computing, by the edge compute node from the master node, the partial gradient based on a random generator matrix and a weight matrix, wherein the weight matrix is based on a probability that the edge compute node will be unable to provide the partial gradient to the master node within a desired period of time.

Example 48 includes the method of example 42 and/or some other example(s) herein, wherein the method comprises: identifying, by the edge compute node from the master node, the operational parameters of the edge compute node, the operational parameters of the edge compute node at least including network conditions experienced by the edge compute node and computational capacity of the edge compute node; and transmitting, by the edge compute node from the master node, an indication of the identified operational parameters to the master node.

Example 49 includes the method of example 48 and/or some other example(s) herein, wherein the operational parameters of the edge compute node also include one or more compute node capabilities of the edge compute node, wherein the compute node capabilities include one or more of a processor speed, memory utilization, memory or storage size, link adaptation capabilities, available battery power, a battery power budget, an average computation time per workload, and an achievable data rate per channel usage.

Example 50 includes the method of examples 42-49 and/or some other example(s) herein, wherein the edge compute node is one of a desktop computer, a smartphone, a tablet computer, an Internet of Things (IoT) device, a remote sensor, a multi-access edge computing (MEC) server, and a Radio Access Network (RAN) node, and the master node comprises one or more MEC servers or a cluster of cloud computing resources provided by a cloud computing service.

Example 51 may include an apparatus comprising means to perform one or more elements of a method described in or related to any of examples 1-50, or any other method or process described in the present disclosure.

Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described in the present disclosure.

Example 53 may include an apparatus comprising logic, modules, or circuitry to perform one or more elements of a method described in or related to any of examples 1-50, or any other method or process described in the present disclosure.

Example 54 includes a method, technique, or process as described in or related to any of examples 1-50, or portions or parts thereof, or otherwise described in the present disclosure.

Example 55 includes an apparatus comprising: one or more processors and one or more computer-readable media comprising instructions that, when executed by the one or more processors, cause the one or more processors to perform the method, techniques, or process as described in or related to any of examples 1-50, or portions thereof, or otherwise described in the present disclosure. The one or more computer-readable media may be one transitory or non-transitory computer-readable media.

Example 56 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-50, or portions thereof, or otherwise described in the present disclosure.

Example 57 includes a signal as described in or related to any of examples 1-50, or portions or parts thereof, or otherwise described in the present disclosure.

Example 58 includes a signal in a wireless network as shown and described in the present disclosure, or otherwise described in the present disclosure.

Example 59 includes a method of communicating in a wireless network as shown and described in the present disclosure.

Example 60 includes a system for providing wireless communication as shown and described in the present disclosure.

Example 61 includes a device for providing wireless communication as shown and described in the present disclosure.

Example 62 includes a packet, frame, segment, protocol data unit (PDU), or message as described in or related to any of examples 1-50, or portions or parts thereof, or otherwise described in the present disclosure.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a multi-access edge applications As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to a distinct component of an architecture or device, or information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

The terms "master" and "slave" as used herein at least in some embodiments refers to a model of asymmetric communication or control where one device, process, element, or entity (the "master") controls one or more other device, process, element, or entity (the "slaves"). The terms "master" and "slave" are used in this disclosure only for their technical meaning. The term "master" or "grandmaster" may be substituted with any of the following terms "main", "source", "primary", "initiator", "requestor", "transmitter", "host", "maestro", "controller", "provider", "producer", "client", "source", "mix", "parent", "chief", "manager", "reference" (e.g., as in "reference clock" or the like), and/or the like. Additionally, the term "slave" may be substituted with any of the following terms "receiver", "secondary", "subordinate", "replica", target", "responder", "device", "performer", "agent", "standby", "consumer", "peripheral", "follower", "server", "child", "helper", "worker", "node", and/or the like.

The corresponding structures, material, acts, and equivalents of all means or steps plus function elements in the claims below are intended to include any structure, material or act for performing the function in combination with other claimed elements are specifically claimed. The embodiments were chosen and described in order to best explain the principles of the disclosure and the practical application, and to enable others of ordinary skill in the art to understand the disclosure for embodiments with various modifications as are suited to the particular use contemplated. The detailed description has been presented for purposes of illustration, but is not intended to be exhaustive or limited to the embodiments in the form disclosed. Modifications and variations will be apparent to those of ordinary skill without departing from the scope and spirit of the disclosure. Modifications and variations are possible in light of the above teachings or may be acquired from practice of various embodiments. It should be understood that there is no intent to limit the concepts of the present disclosure to the particular forms disclosed, and the intention is to cover all modifications, equivalents, and alternatives consistent with the present disclosure and the appended claims.

The invention claimed is:

1. An apparatus to provide distributed machine learning (ML) services in a heterogeneous computing environment, the apparatus comprising processor circuitry to:
receive computed partial gradients sent by respective ones of a plurality of heterogeneous compute nodes of the heterogeneous computing environment, each of the computed partial gradients associated with computations including distributed ML, by a corresponding one of the plurality of heterogenous compute nodes, on a training data partition that represents a partition of an encoded training dataset, and that is further based on operational parameters of said corresponding one of the plurality of heterogeneous compute nodes;
determine updated ML training parameters for the plurality of heterogeneous compute nodes based on an aggregation of the computed partial gradients; and
send the updated ML training parameters for transmission by a wireless communication circuitry to corresponding ones of the plurality of heterogeneous compute nodes.

2. The apparatus of claim 1, wherein the processor circuitry is further to partition the encoded training dataset into a set of training data partitions, each of the training data partitions corresponding to the training data partition that is subjected to computations by a corresponding one of the plurality of heterogeneous compute nodes.

3. The apparatus of claim 1, further including the wireless communication circuitry, wherein the wireless communication circuitry is communicatively coupled with the processor circuitry and is configured to:
transmit the training data partitions to corresponding ones of the plurality of heterogenous compute nodes;
receive the computed partial gradients from corresponding ones of the plurality of heterogenous compute nodes;
send the computed partial gradients to the processor circuitry;
receive the updated ML training parameters from the processor circuitry; and
transmit the updated ML training parameters to corresponding ones of the heterogenous compute nodes.

4. The apparatus of claim 3, wherein the operational parameters include network conditions experienced by, and compute node capabilities of, said corresponding one of the plurality of heterogeneous compute nodes, and wherein the wireless communication circuitry is to receive, from respective ones of the plurality of heterogeneous compute nodes, an indication of the operational parameters of said respective ones of the heterogenous compute node.

5. The apparatus of claim 4, wherein the compute node capabilities of said corresponding one or more of the heterogeneous nodes includes at least one of processor speed, memory utilization, memory or storage size, link adaptation capabilities, available battery power, a battery power budget, an average computation time per workload, or an achievable data rate per channel usage.

6. The apparatus of claim 1, further comprising encoding circuitry coupled with the processor circuitry, the encoding circuitry to encode a raw dataset into the encoded training dataset with a number of extra data points based on a coding redundancy value, wherein the number of extra data points is a same number of data points as a number of data points in the raw dataset, or the number of extra data points is greater than the number of data points in the raw dataset.

7. The apparatus of claim 6, wherein the processor circuitry is to determine the coding redundancy value based on the operational parameters and a load allocation criterion.

8. The apparatus of claim 7, wherein the load allocation criterion is based on a minimax criterion, the minimax criterion being a value that maximizes a number of partial gradients to be received from each heterogeneous compute node while minimizing an epoch time.

9. The apparatus of claim 6, wherein the encoding circuitry is to encode the raw dataset using a random linear encoder, wherein the encoding circuitry is to operate the random linear encoder to select each element of a random generator matrix independently from a normal distribution or from a Bernoulli distribution, and wherein the random generator matrix has c number of rows and m number of columns such that any m subset of c rows is a near orthogonal m×m matrix, where c>m>1.

10. The apparatus of claim 1, wherein the apparatus is a System-On-Chip (SoC) or a Multi-Chip Package (MCP) in a Multi-access Edge Computing (MEC) server.

11. An apparatus to provide distributed machine learning (ML) services in a heterogeneous computing environment, the apparatus comprising processor circuitry to:
receive, from respective ones of a plurality of heterogeneous compute nodes of the heterogeneous computing environment, encoded training data partitions and first partial gradients, wherein:
each of the encoded training partitions includes encoded data points generated, based on operational parameters of a corresponding one of the plurality of heterogeneous compute nodes, and from uncoded data available at said corresponding one of the plurality of heterogeneous compute nodes; and
each of the first partial gradients is based on the uncoded data on which distributed ML computations are performed at a corresponding one of the plurality of heterogeneous compute nodes; and
determine second partial gradients based on the encoded training data partitions;
determine updated ML training parameters for the plurality of heterogeneous compute nodes based on an aggregation of the first partial gradients with the second partial gradients; and
send the updated ML training parameters for transmission by a wireless communication circuitry to corresponding ones of the plurality of heterogeneous compute nodes.

12. The apparatus of claim 11, wherein the processor circuitry is further to determine, for each of the plurality of heterogeneous compute nodes, a coding redundancy that is based on a number of the encoded data points.

13. The apparatus of claim 12, wherein the processor circuitry is to determine the coding redundancy based on the operational parameters and a load allocation criterion.

14. The apparatus of claim 13, wherein the load allocation criterion is based on a minimax criterion, the minimax criterion being a value that maximizes a number of partial gradients to be received from each of the plurality of heterogeneous compute nodes while minimizing a desired epoch time, wherein the desired epoch time is based on a computation time for computation of the partial gradients at each of the plurality of heterogeneous compute nodes, the computation time being based on one or more deterministic components of the operational parameters of each of the plurality of heterogeneous compute nodes and on one or more stochastic components of the operational parameters of each of the plurality of heterogeneous compute nodes.

15. The apparatus of claim 13, wherein the processor circuitry is to determine the coding redundancy based on a desired number of the encoded data points.

16. The apparatus of claim 12, wherein the number of data points in the encoded training data partition is a fraction of a total number of uncoded data points distributed across the plurality of heterogeneous compute nodes.

17. The apparatus of claim 11, further including a wireless communication circuitry communicatively coupled with the processor circuitry, the communication circuitry to:
transmit the coding redundancy and the number of the encoded data points to each corresponding one of the plurality of heterogeneous compute nodes;
receive, from the plurality of heterogeneous compute nodes, the encoded training data partitions and the first partial gradients;
send the encoded training data partitions and the first partial gradients to the processor circuitry; and
receive the updated ML training parameters from the processor circuitry; and
transmit the updated ML training parameters to corresponding ones of the heterogenous compute nodes.

18. The apparatus of claim 17, wherein the communication circuitry is further to transmit to each of the plurality of heterogeneous compute nodes a probability value indicating a probability that the first partial gradient will be received within a predetermined epoch time, the probability value further to be used by a corresponding one of the plurality of heterogeneous compute nodes to weigh the uncoded data prior to encoding the uncoded data.

19. The apparatus of claim 11, wherein the operational parameters include network conditions experienced by, and compute node capabilities of, said corresponding one of the plurality of heterogeneous compute nodes, and wherein the wireless communication circuitry is to receive, from respective ones of the plurality of heterogeneous compute nodes, an indication of the operational parameters of said respective ones of the heterogenous compute node.

20. The apparatus of claim 11, wherein the apparatus is a System-On-Chip (SoC) or a Multi-Chip Package (MCP) in a Multi-access Edge Computing (MEC) server.

21. An apparatus of an edge compute node of a heterogeneous computing environment to, the apparatus including a processor circuitry to:
identify a training dataset partition on which to perform computations of a distributed machine learning (ML) training process, wherein a number of data points included in the training data partition is based on operational parameters of the edge compute node, and the training dataset partition is among a plurality of training data partitions;
perform the computations on the data points in the training dataset partition to obtain a partial gradient; and
send the computed partial gradient to a master node in the heterogeneous computing environment.

22. The apparatus of claim 21, the processor circuitry to:
obtain, from the master node, updated ML training parameters based on an aggregation of a plurality of computed partial gradients, wherein each computed partial gradient of the plurality of computed partial gradients are based on a corresponding one of the plurality of training data partitions; and
perform the computations on the data points in the training dataset partition to obtain a partial gradient.

23. The apparatus of claim 21, the processor circuitry to obtain, from the master node, the training data partition and an indication of the computations of the distributed ML training process to be performed on the data points in the training data partition.

24. The apparatus of claim 21, wherein the training data partition is locally accessible by the edge compute node, the processor circuitry to encode the data points of the training data partition and at least one extra data point based on a coding redundancy value to obtain an encoded dataset, wherein the coding redundancy value is based at least on the operational parameters of the edge compute node.

25. The apparatus of claim 24, wherein the coding redundancy value is also based on a load allocation criterion, wherein the load allocation criterion is based on a desired computation time for computation of the partial gradient.

* * * * *